(12) United States Patent
Lyle et al.

(10) Patent No.: US 10,119,247 B2
(45) Date of Patent: *Nov. 6, 2018

(54) WORKING MACHINE

(71) Applicant: J. C. Bamford Excavators Limited, Uttoxeter (GB)

(72) Inventors: Jonathan Lyle, Uttoxeter (GB); Peter Jowett, Uttoxeter (GB); John Griffin, Uttoxeter (GB); David Price, Uttoxeter (GB); Nicholas Roberts, Uttoxeter (GB); Ryan Page, Uttoxeter (GB); Ian Carswell, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,433

(22) Filed: Oct. 29, 2015

(65) Prior Publication Data

US 2016/0122973 A1 May 5, 2016

(30) Foreign Application Priority Data

Oct. 29, 2014 (GB) .................... 1419271.0

(51) Int. Cl.
*E02F 9/08* (2006.01)
*E02F 9/16* (2006.01)
(Continued)

(52) U.S. Cl.
CPC .............. *E02F 9/08* (2013.01); *B62D 33/063* (2013.01); *E02F 3/301* (2013.01); *E02F 9/16* (2013.01);
(Continued)

(58) Field of Classification Search
CPC .... E02F 9/08; E02F 9/16; B66C 13/52; B66C 13/54; B62D 33/06; B62D 33/0617; B62D 33/063

See application file for complete search history.

(56) References Cited

U.S. PATENT DOCUMENTS 3,963,132 A * 6/1976 Dufour .............. B62D 33/0633
414/719
4,000,784 A 1/1977 Morrow, Sr. et al.
(Continued)

FOREIGN PATENT DOCUMENTS

CN 201169791 Y 12/2008
DE 3722215 C1 9/1988
(Continued)

OTHER PUBLICATIONS

Search Report for GB Patent Application No. 1419272.8, dated Mar. 27, 2015.
(Continued)

*Primary Examiner* — Barry Gooden, Jr.
(74) *Attorney, Agent, or Firm* — Marshall, Gerstein & Borun LLP

(57) ABSTRACT

A working machine comprising: a base assembly including a ground engaging structure; an undercarriage connected to the ground engaging structure; a superstructure connected to the undercarriage; a working arm mounted to the superstructure; a connector connecting the undercarriage to the superstructure; and a drive arrangement located in the base assembly for moving the ground engaging structure to propel, in use, the working machine.

18 Claims, 35 Drawing Sheets

(51) Int. Cl.
  *E02F 9/18* (2006.01)
  *B62D 33/063* (2006.01)
  *E02F 3/30* (2006.01)
  *E02F 9/22* (2006.01)

(52) U.S. Cl.
  CPC ............... *E02F 9/166* (2013.01); *E02F 9/18* (2013.01); *E02F 9/2246* (2013.01)

(56) References Cited

U.S. PATENT DOCUMENTS

| | | | | |
|---|---|---|---|---|
| 4,128,180 | A | * | 12/1978 | Mellious ................ E02F 3/964 180/68.6 |
| 4,728,251 | A | * | 3/1988 | Takashima ................ E02F 3/32 414/694 |
| 4,836,740 | A | | 6/1989 | Wagner |
| 4,944,649 | A | | 7/1990 | Stralow |
| 5,097,608 | A | * | 3/1992 | Theurer ................ E01B 27/026 104/279 |
| 5,108,253 | A | * | 4/1992 | Kobayashi ............. E02F 3/325 414/694 |
| 5,195,863 | A | | 3/1993 | De Pingon |
| 5,822,892 | A | * | 10/1998 | Ohbatake ................ E02F 3/301 37/397 |
| 5,848,664 | A | | 12/1998 | Kaspar |
| 6,071,066 | A | * | 6/2000 | Braud ..................... E02F 3/286 180/297 |
| 6,158,525 | A | | 12/2000 | Inoue |
| 6,173,513 | B1 | | 1/2001 | Akimoto |
| 6,189,641 | B1 | | 2/2001 | Azuma |
| D462,973 | S | * | 9/2002 | Tamaru ..................... D15/25 |
| 6,481,748 | B1 | | 11/2002 | Okuda et al. |
| D487,100 | S | * | 2/2004 | Tokach ..................... D15/30 |
| 6,729,831 | B1 | * | 5/2004 | Kawamura ............. E02F 3/301 414/694 |
| 6,804,903 | B1 | * | 10/2004 | Cooper .................. E02F 3/964 37/352 |
| 6,990,757 | B2 | * | 1/2006 | Takemura ............. E02F 9/0866 180/89.1 |
| 7,413,397 | B2 | * | 8/2008 | Muramoto ............ E02F 9/0891 180/68.4 |
| 7,730,648 | B2 | * | 6/2010 | Fukaya ................... E02F 3/964 37/418 |
| D684,598 | S | * | 6/2013 | Hagura ..................... D15/24 |
| D692,924 | S | * | 11/2013 | Hatanaka ..................... D15/24 |
| D750,672 | S | * | 3/2016 | Payne ..................... D15/25 |
| D754,214 | S | * | 4/2016 | Payne ..................... D15/31 |
| 9,828,049 | B2 | * | 11/2017 | Lyle ....................... E02F 9/121 |
| 9,845,587 | B2 | * | 12/2017 | Huissoon ................ E02F 3/32 |
| 9,850,640 | B2 | * | 12/2017 | Lyle ........................ E02F 9/08 |
| 2002/0139597 | A1 | | 10/2002 | Kinoshita et al. |
| 2002/0154984 | A1 | | 10/2002 | Schaeff |
| 2003/0168421 | A1 | * | 9/2003 | Davis ..................... B66C 23/72 212/302 |
| 2003/0226293 | A1 | | 12/2003 | Takemura et al. |
| 2004/0188168 | A1 | | 9/2004 | Aumann |
| 2005/0034336 | A1 | | 2/2005 | Takemura et al. |
| 2007/0090650 | A1 | * | 4/2007 | Komiyama ........... E02F 9/0866 290/40 C |
| 2007/0131437 | A1 | | 6/2007 | Sewell |
| 2007/0169967 | A1 | * | 7/2007 | Brindle .................. B62D 55/10 180/9.1 |
| 2007/0235241 | A1 | | 10/2007 | Udagawa et al. |
| 2007/0240928 | A1 | | 10/2007 | Coltson et al. |
| 2008/0024006 | A1 | * | 1/2008 | Brindle ................ B62D 21/186 305/199 |
| 2008/0296083 | A1 | * | 12/2008 | Krieger .................. F15B 11/17 180/403 |
| 2009/0038186 | A1 | * | 2/2009 | Osswald ................ B62D 21/14 37/413 |
| 2009/0066046 | A1 | | 3/2009 | Takemura et al. |
| 2009/0115223 | A1 | * | 5/2009 | Tsukamoto ......... B62D 33/0617 296/190.04 |
| 2011/0257816 | A1 | * | 10/2011 | Song ....................... G08C 17/00 701/2 |
| 2012/0242142 | A1 | * | 9/2012 | Kautsch ................. B62D 55/02 305/142 |
| 2012/0310492 | A1 | * | 12/2012 | Karasawa ............. E02F 9/2253 701/50 |
| 2013/0133319 | A1 | * | 5/2013 | Lacher .................. E02F 9/2253 60/327 |
| 2013/0149095 | A1 | | 6/2013 | Huissoon |
| 2013/0285413 | A1 | * | 10/2013 | Takeoka ................. B62D 25/07 296/190.08 |
| 2014/0011638 | A1 | | 1/2014 | Iwaki |
| 2014/0034403 | A1 | | 2/2014 | Tokuda |
| 2014/0263606 | A1 | | 9/2014 | Vasichek |
| 2015/0130219 | A1 | * | 5/2015 | Uchida ..................... E02F 9/16 296/190.01 |
| 2015/0299988 | A1 | * | 10/2015 | Abe ..................... B60R 25/2063 180/315 |
| 2015/0368876 | A1 | * | 12/2015 | Nakagaki ................ E02F 3/438 701/50 |
| 2016/0114721 | A1 | * | 4/2016 | Abe ......................... E02F 9/26 296/190.01 |
| 2016/0122971 | A1 | * | 5/2016 | Lyle ......................... E02F 9/08 414/687 |
| 2016/0122972 | A1 | * | 5/2016 | Price ....................... B60K 8/00 180/312 |
| 2018/0106017 | A1 | * | 4/2018 | Huissoon ................ E02F 3/308 |

FOREIGN PATENT DOCUMENTS

| | | |
|---|---|---|
| DE | 103 14 381 A1 | 10/2003 |
| EP | 0 282 138 A2 | 9/1988 |
| EP | 1 260 637 A1 | 11/2002 |
| EP | 1 455 119 A2 | 9/2004 |
| EP | 1 462 579 A1 | 9/2004 |
| EP | 1 507 043 A2 | 2/2005 |
| EP | 1 595 734 A1 | 11/2005 |
| EP | 1 930 190 A1 | 6/2008 |
| EP | 1 997 964 A2 | 12/2008 |
| EP | 2 088 249 A1 | 8/2009 |
| EP | 2 243 651 A1 | 10/2010 |
| EP | 2 466 016 A1 | 6/2012 |
| EP | 2 594 828 A1 | 5/2013 |
| EP | 2 639 362 A1 | 9/2013 |
| EP | 2 863 027 A1 | 4/2015 |
| GB | 1 529 247 A | 10/1978 |
| GB | 2 257 414 A | 1/1993 |
| JP | 60-59239 | 9/1983 |
| JP | 61-18524 | 1/1986 |
| JP | 10-317427 | 12/1998 |
| JP | 11-303142 | 11/1999 |
| JP | 2000-080676 A | 3/2000 |
| JP | 2000-080679 A | 3/2000 |
| JP | 2003-41627 | 2/2003 |
| JP | 2003-28560 | 10/2003 |
| JP | 2005-036447 A | 2/2005 |
| JP | 2010-52894 | 3/2010 |
| JP | 2011-012512 A | 1/2011 |
| JP | 2013117145 A | 6/2013 |
| JP | 2013-241809 A | 12/2013 |
| JP | 2014-125868 A | 7/2014 |
| WO | WO-99/02789 A1 | 1/1999 |
| WO | WO-01/27397 A1 | 4/2001 |
| WO | WO-2006/109571 A1 | 10/2006 |
| WO | WO-2009/020509 A1 | 2/2009 |
| WO | WO-2013/027873 A1 | 2/2013 |
| WO | WO-2013/084597 A1 | 6/2013 |
| WO | WO-2013/102073 A1 | 7/2013 |
| WO | WO-2014/039041 A1 | 3/2014 |
| WO | WO-2014/098652 A1 | 6/2014 |
| WO | WO-2014/168469 A2 | 10/2014 |

OTHER PUBLICATIONS

Extended European Search Report for European Patent Application No. 15 19 2201, dated Mar. 2, 2016.

(56) References Cited

OTHER PUBLICATIONS

Search Report for GB Patent Application No. 1419278.5, dated Feb. 10, 2015.
Extended European Search Report for EP Patent Application No. 15 19 2198, dated Apr. 28, 2016.
Search Report for GB Patent Application No. 1419276.9, dated Apr. 27, 2015.
Extended European Search Report for European Patent Application No. 15 19 2193 dated, Apr. 4, 2016.
Search Report for GB Patent Application No. 1419273.6, dated Mar. 13, 2015.
Extended European Search Report for European Patent Application No. 15 19 2196, dated Apr. 5, 2016.
Search Report for GB Patent Application No. 1419274.4, dated Feb. 27, 2015.
Extended European Search Report for European Patent Application No. 15 19 2200, dated Apr. 15, 2016.
Search Report for GB Patent Application No. 1419277.7, dated Feb. 27, 2015.
Extended European Search Report for European Patent Application No. 15 19 2197, dated Apr. 21, 2016.
Search Report for GB Patent Application No. 1 419 275.1, dated Apr. 17, 2015.
Search Report for GB 1419271.0, dated Mar. 24, 2015.

* cited by examiner

WORKING MACHINE

FIELD OF THE INVENTION

The present invention relates to a working machine.

BACKGROUND OF THE INVENTION

Various types of working machines are known. Such machines are used typically for soil-shifting operations (e.g. trenching, grading, and loading) and materials handling (e.g. depositing aggregate in trenches, lifting materials and placing them on an elevated platform).

Such machines are typically manufactured from a set of subassemblies designed specifically for one type of machine, although certain components such as engines, gearboxes, hydraulic pumps and undercarriages may be shared across different machine types.

Examples of known machines include the following:

Slew excavators comprise a superstructure rotatable in an unlimited fashion relative to an undercarriage. The superstructure includes a working arm arrangement for manipulating an attachment, such as a bucket, to perform working operations of the type listed above, a prime mover, such as a diesel IC engine, a hydraulic pump, and an operator cab. The prime mover drives the hydraulic pump, in order to provide pressurized fluid to operate the working arm arrangement, and also to power one or more hydraulic motors located in the undercarriage that are used to selectively drive either two endless tracks or four wheels (or eight wheels in a dual wheel configuration) for propelling the excavator.

A slew ring rotatably connects the superstructure and undercarriage, and a central rotary joint arrangement enables hydraulic fluid to pass from the pump in the superstructure to the hydraulic motor, and return to the superstructure, irrespective of the relative positions of the superstructure and undercarriage. If the slew excavator uses tracks for propulsion, steering is effected by differentially driving the tracks on opposing sides of the undercarriage. If the slew excavator uses wheels for propulsion, a steering arrangement is used for either two or four wheels, and separate hydraulic control is required for this in the undercarriage.

Slew excavators are available in a wide range of sizes. Micro, mini and midi excavators span an operating weight range from around 750 kg up to around 12,000 kg and are notable for typically having a working arm arrangement that is capable of pivoting about a substantially vertical axis relative to the superstructure by using a "kingpost" interface to the superstructure. Generally, mini and midi excavators have a weight of above around 1,200 kg. Large excavators, whose operating weight exceeds around 12,000 kg are often referred to as 'A frame' excavators and typically have a working arm arrangement that is fixed about a vertical axis, and can therefore only slew together with the superstructure. This is a function of the fact that the smaller excavators are expected to operate in more confined spaces and the ability to slew about two mutually offset axes in order to, for example, trench close to an obstacle such as a wall is therefore more desirable for micro, mini and midi excavators.

The working arm arrangement generally includes a boom pivotally connected to a dipper. There are several types of booms available including: a triple articulated boom which has two pivotally connected sections; and a mono boom that is often made from a single generally curved structure. A dipper is pivotally connected to the boom and a mount for an attachment, e.g. a bucket, is provided on the dipper. Hydraulic cylinders are provided to move the boom, dipper and mount relative to each other so as to perform a desired working operation.

Tracked excavators are not able to travel under their own propulsion for significant distances due to a low maximum speed and the damage their metal tracks cause to paved roads. However their tracks enhance the stability of the excavator. Wheeled excavators are capable of "roading" at higher speeds (typically up to 40 kph), and without appreciably damaging paved road surfaces. However, the working arm assembly inevitably extends forward of the superstructure during roading, which can impair ride quality, and forward visibility. When performing working operations the pneumatic tires provide a less stable platform than tracks, so additional stabilizer legs can be deployed for stability.

Since the prime mover, hydraulic pump, hydraulic reservoir etc. are located in the superstructure, the center of gravity of all types of slew excavator is relatively high. Whilst these components can be positioned to act as a counterbalance to forces induced during working operations, packaging constraints may force such positioning to be sub-optimal, and may also restrict sight-lines over the rear of the machine, for example.

Excavators are generally used for operations such as digging. However, if it is desired to perform an operation such as loading, an alternative type of machine must be used. Machines capable of loading operations are known and have various formats. In one format, commonly referred to as a "telescopic handler" or "telehandler", the superstructure and undercarriage are fixed relative to each other and a central working arm in the form of a two or more part telescopic boom extends fore-aft of the machine. The boom pivots about a horizontal axis towards the aft end of the machine, an attachment is releasably mounted to a fore end of the boom, and is pivotable about a second distinct horizontal axis. Commonly used attachments include pallet forks and shovels. Telehandlers may be used for general loading operations (e.g. transferring aggregate from a storage pile to a required location on a construction site) and lifting operations, such as lifting building materials on to an elevated platform.

Telehandlers typically have four wheels on two axles for propulsion, with one or both axles being steerable and driven. A prime mover (typically a diesel IC engine) may be located in a pod offset to one side of the machine between front and rear wheels and is connected to the wheels by a hydrostatic or mechanical transmission. An operator cab is often located on the other side of the boom to the prime mover, and is relatively low between the wheels. Depending upon its intended application, the machine may be provided with deployable stabilizer legs.

A subset of telehandlers mount the cab and boom on a rotatable superstructure in order to combine lifting with slewing operations, at the expense of additional weight and greater height. As these machines are used principally for lifting, instead of loading, they have a longer wheelbase than conventional telehandlers to accommodate a longer boom, impacting maneuverability. Further, as sight-lines towards the ground close to the machine are less critical for lifting than for excavating, these are consequently quite poor.

For some lifting operations, particularly those of heavy load, it is more appropriate to use a crane than a telehandler. Mobile cranes are generally provided on a wheeled or tracked base. A boom, often a telescopic boom, is pivotally mounted to the base. Hoists, wire ropes or chains and sheaves are connected to the boom and used for moving materials from one location to another. The safety regulations for cranes are often stricter than the safety regulations for telehandlers.

In alternative working operations a worker may need to access an elevated work area, in such cases a mobile elevated work platform (MEWP) may be used. A MEWP generally has a wheeled base with a working arm connected thereto. The working arm carries a platform for a worker. The working arm may be for example, a scissor lift or an extensible or articulating boom. Since use of an MEWP involves working at an elevated level, there are again different technical and safety requirements imposed on an MEWP compared to those of the previously described working machines.

A yet further alternative working machine is a dump truck (also known as a dumper truck). A dump truck is often used for transporting material from one location to another (e.g. a multiplicity of loads from an excavator bucket). A dump truck has a dump body or a box bed that is pivotable to permit contents of the dump body to be unloaded. A tipping mechanism that is generally actuated by one or more hydraulic cylinders, and in some cases a cylinder and lever arrangement, is used to tip the dump body.

The cost to develop different machines such as those above for different working applications is significant. Further, the cost and delay to switch a production line from one type of machine to another is also significant. In addition, large assemblies for these machines may be manufactured in one location and then shipped a significant distance to a second location for assembly. The shipping cost may high be due to the bulk of the assemblies and the shape thereof, making packing thereof for transport inefficient.

It is further desirable that working machines become more efficient in operation, in terms of the amount of working operations undertaken for a given amount of fuel used. This may be a function of the fuel efficiency of the prime mover, transmission, driveline and hydraulic system, as well as being due to secondary factors such as poor visibility meaning that an operator needs to reposition the working machine unnecessarily frequently so as to view the working operation, or carrying out an operation much more slowly, thereby compromising efficiency.

The present applicant has also recognized that one area where efficiency of machines having a hydrostatic drive can be improved is in the control of the engine throttle.

Conventionally, a hand throttle is used when excavating and the vehicle is static. The working machine engine is set to a relatively high speed (e.g. 2000 rpm) such that sufficient hydraulic fluid at a high pressure is supplied to the hydraulic rams from the hydraulic pump for performing working operation quickly and with sufficient power. However, if a working machine is to be repositioned in the course of a working operation, the hand throttle should be reduced to zero, and the foot throttle used to more finely control engine speed so that the hydraulic pump supplying fluid to the hydrostatic drive does not result in too rapid, sudden maneuvers which may be unsafe if the drive is engaged at a high engine speed. After repositioning the engine speed then needs to be reset to the desired engine speed for working operations. This delays such working operations and is therefore inefficient and undesirable.

SUMMARY OF THE INVENTION

A first aspect of the invention provides a working machine comprising a base assembly including a ground engaging structure; an undercarriage connected to the ground engaging structure; a superstructure connected to the undercarriage; a working arm mounted to the superstructure; a connector connecting the undercarriage to the superstructure; and a drive arrangement located in the base assembly for moving the ground engaging structure to propel, in use, the working machine.

In one embodiment, the majority of the drive arrangement is positioned below a level coincident with a lower extent of the superstructure.

In one embodiment, the base assembly comprises an electronic control unit (ECU) for controlling the drive arrangement and/or the ground engaging structure.

In one embodiment, the ECU is configured to, in use, control superstructure functions. The ECU may be easily programmed or "flashed" to alter the superstructure functions, dependent upon the superstructure to be fitted.

In one embodiment, the ECU controls hydraulic functionality of the superstructure.

In one embodiment, the ECU controls operation of the working arm.

In one embodiment, an ECU is provided in the superstructure. Such an ECU may be programmed with the control functionality for some or all of the superstructure functions. The ECU in the superstructure may communicate with the ECU in the base assembly in order to perform certain functions.

In one embodiment, the drive arrangement includes a prime mover and a transmission.

In one embodiment, the transmission comprises a hydraulic pump and a hydraulic motor.

In one embodiment, a heat exchanger and cooling fan are mounted adjacent the prime mover and arranged such that an axis of rotation of the fan is substantially parallel to a fore-aft direction of the working machine.

Advantageously, this improves packaging and cooling of machine.

In one embodiment, a majority of the prime mover is positioned below a level coincident with an upper extent of the wheels.

Advantageously, the visibility is further improved by housing the prime mover and transmission within the undercarriage and positioning the majority of the prime mover below a level coincident with an upper extent of the wheels. Often in conventional working machines the prime mover is housed in the superstructure, but this creates a barrier to sight for an operator of the working machine. Moving the prime mover to a lower position on the working machine moves the or part of the prime mover away from the line of sight of an operator.

In one embodiment, the prime mover is positioned between the front and rear axles.

Advantageously, this improves packaging of the working machine.

In one embodiment, the prime mover is mounted in a transverse direction to a fore-aft direction of the working machine.

In one embodiment, the prime mover is mounted substantially perpendicular to the fore-aft direction of the working machine.

In one embodiment, the prime mover is a reciprocating engine including pistons and the engine is mounted such that the pistons have an upright orientation.

In one embodiment, the working machine comprises a fuel tank positioned on one side of an axis extending in a fore-aft direction of the working machine and the prime mover is positioned on the other side of an axis extending in the fore-aft direction of the working machine.

In one embodiment, the working machine comprises a hydraulic fluid tank positioned on one side of an axis extending in a fore-aft direction of the working machine and the prime mover is positioned on the other side of the axis extending in the fore-aft direction of the working machine.

In one embodiment, the connector is a rotary connector to permit rotation of the superstructure relative to the undercarriage.

In one embodiment, the rotary connector is a slew ring.

In one embodiment, the superstructure can rotate relative to the undercarriage by at least 180°.

In one embodiment, the superstructure is rotatable relative to the undercarriage using an electric motor.

In one embodiment, the superstructure is rotatable relative to the undercarriage using a hydraulic motor.

In one embodiment, the rotary connector between the superstructure and the undercarriage includes a rotary joint arrangement configured to permit electrical signals and/or hydraulic fluid to be routed to the superstructure independently of the position of the superstructure relative to the undercarriage.

In one embodiment, the working arm is mounted to the superstructure using a kingpost arrangement in order to pivot relative to the superstructure about a vertical axis. The working arm may be a working arm of an excavator (a boom) to be operated in conjunction with a dipper arm having an attachment such as a bucket mounted thereon Provision of a working arm rotatable relative to the superstructure about a generally upright axis advantageously further improves the versatility of the working machine, and the visibility for a user during a wide range of operations. For example, when the machine is an excavator and is excavating near a linear barrier, e.g. a wall, the cab, superstructure and working arm can be rotated relative to each other such that the working arm is to the front of the machine but offset to one side, permitting digging close to the wall and the cab can be rotated towards the region to be dug to improve visibility of the excavating operation.

In one embodiment, a hydraulic ram is used to rotate the working arm relative to the superstructure about the generally upright axis.

In one embodiment, the working arm is hydraulically actuated and a control valve is provided in the superstructure for controlling fluid flow to the working arm.

In one embodiment, the working arm is rotatably mounted to the superstructure to be moveable up and down about a generally horizontal axis.

In one embodiment, the working machine comprises an operator's cab rotatably mounted on the superstructure, preferably rotatable by a rotary connection, wherein the superstructure is rotatable about a first generally upright axis and the operator's cab is rotatable about a second generally upright axis.

Advantageously, the cab and superstructure of the present invention can be rotated relative to each other for optimized working in confined working spaces and improved visibility. For example, when the working machine is driven on the road, the cab and superstructure can be rotated relative to each other so as to position the working arm to the rear of the working machine to give an operator an improved view of the road ahead.

In one embodiment, the axis of rotation of the cab with respect to the superstructure is coincident with the axis of rotation of the superstructure with respect to the undercarriage.

In one embodiment, the axis of rotation of the cab with respect to the superstructure is offset from the axis of rotation of the superstructure with respect to the undercarriage.

In one embodiment, the cab can rotate relative to the superstructure by at least 180°.

In one embodiment, the cab is rotatable relative to the superstructure using an electric motor.

In one embodiment, the cab is rotatable relative to the superstructure using a hydraulic motor.

In one embodiment, the rotary connection between the superstructure and the cab includes a mechanism for routing hoses and/or cables from the superstructure to the cab, the mechanism being configured to permit hoses and/or cables to be wound or unwound to account for the position of the cab relative to the superstructure.

In one embodiment, the working arm is mounted to the superstructure at a position that is at one end of the superstructure in a length direction and substantially central to the superstructure in a width direction.

The undercarriage may be longer in a fore-aft direction than the superstructure. The cab may have a width of between one third and two thirds of the distance between an outboard side of each of the wheels of the pair of wheels mounted to the front axle. The cab may have a width of between one third and one half of the distance between an outboard side of each of the wheels of the pair of wheels mounted to the front axle. The superstructure may have a width substantially equal to or less than the width of the undercarriage. The superstructure may have a length substantially equal to one half to three quarters of the length of the undercarriage.

In one embodiment, the line of sight angle over the right hand rear corner of the machine for an operator seated in the cab having a height of 185 cm is at least 30° below the horizontal, more preferably at least 45° below the horizontal.

In one embodiment, the working machine is at least a compact tail swing excavator, preferably wherein the working machine is a zero tail swing excavator.

In one embodiment, the ground engaging structure comprises a front axle and a rear axle and at least two wheels mounted to each of the front and rear axle.

In one embodiment, the front and rear axles are configured for at least two wheel steer.

In one embodiment, the front and rear axles are configured for four wheel steer.

In one embodiment, the working machine is configured for four wheel drive.

In one embodiment, the separation between the front and rear axles is within the range of 2.0 m to 3.5 m, more preferably within the range 2.0 m to 2.7 m.

In one embodiment, the drive arrangement is a hydrostatic drive arrangement.

In one embodiment, the transmission comprises a hydraulic pump driven by the prime mover, a first high speed hydraulic motor to be supplied with hydraulic fluid from the hydraulic pump to drive the first axle to permit the working machine to be driven at relatively high speeds, and a second relatively low speed motor to be supplied with hydraulic fluid from the hydraulic pump to drive the second axle at relatively low speeds.

This may be an efficient way of providing a high speed 2WD roading mode of operation and a lower speed higher traction 4WD site mode of operation.

In one embodiment, the high speed motor has a relatively high displacement per revolution, e.g. 0 to 255 cm3.

In one embodiment, the first hydraulic pump and first and second hydraulic motors are mounted in the undercarriage.

In one embodiment, the undercarriage is at least formed in part from sheet metal material to define a space enclosed on at least three sides.

In one embodiment, the undercarriage further comprises a mount for a first end of a linear actuator located within the space, such that the linear actuator is at least partially housed within the space.

In one embodiment, the linear actuator is configured to extend through an opening in a side of the undercarriage.

In one embodiment, the working machine comprises a linkage for connection to a working implement.

In one embodiment, the working implement is a stabilizer leg arrangement.

In one embodiment, the working implement is a dozer blade arrangement.

In one embodiment, the working implement is a three-point linkage.

In one embodiment, the working implement is connected to the undercarriage using a releasable interlocking mechanism.

In one embodiment, the connector is mounted substantially centrally to the undercarriage in a forward-rearward direction and in a lateral direction.

Positioning of the connector centrally to the undercarriage can advantageously further improve versatility of the base assembly because the connector permits features mounted to the superstructure, e.g. a cab to be positioned either centrally to the undercarriage or offset from the center by a certain degree dependent upon the machine functionality.

In one embodiment, the undercarriage comprises a main chassis and at least one subsidiary chassis.

In one embodiment, the main chassis comprises a mounting arrangement to mount a superstructure thereon and a mounting interface to mount the subsidiary chassis thereon.

In one embodiment, the subsidiary chassis further comprises an actuator to perform a work function.

In one embodiment, the actuator is housed within the subsidiary chassis.

In one embodiment, a side pod is mounted to the main chassis, the side pod comprising a drive arrangement including a prime mover.

In one embodiment, the main chassis further comprises the ECU.

In one embodiment, the main chassis or the subsidiary chassis comprises a mount for an axle.

In one embodiment, the working machine comprises a counterweight assembly, the counterweight assembly comprising a counterweight having a mass for counterbalancing the working arm, the counterweight comprising a mounting arrangement for the mounting of a heat exchanger thereon and defining an air flow path having an inlet and an outlet to permit air to flow through the heat exchanger when mounted thereon.

Advantageously, this provides a compact packaging of the heat exchanger. This arrangement may decrease the overall height of the working machine. Further, this arrangement minimizes the impact on visibility and may minimize the amount of machine overhang. It may additionally protect the heat exchanger from impact damage.

In one embodiment, a heat exchanger is mounted to the mounting arrangement.

In one embodiment, the mounting arrangement is configured such that the heat exchanger is enclosed on four sides.

Advantageously, this further provides protection of the heat exchanger unit from damage. Further, this may enhance air flow through the heat exchanger by virtue of convection effects.

In one embodiment, the counterweight is configured to define an air flow path in the form of a duct therethrough.

In one embodiment, a fan is mounted in conjunction with the heat exchanger.

In one embodiment, the counterweight assembly further comprises a grille, wherein the grille is mounted proximate an upper surface of the counterweight.

Advantageously, this may prevent any debris from falling into the duct.

In one embodiment, the mounting arrangement comprises a plurality of threaded bores.

In one embodiment, the counterweight is formed as a single unitary component, for example a cast iron or steel component.

In one embodiment, the heat exchanger is a condenser of an air conditioning system.

In one embodiment, wherein the fan is configured to drive air through the inlet, through the condenser to the outlet.

In one embodiment, the counterweight is mounted to the superstructure in a position opposite the working arm.

In one embodiment, the working arm is a telescopic boom.

In one embodiment, the working arm is a jib.

In one embodiment, the working arm is a scissor lift.

In one embodiment, wherein the working arm is a tipping platform, e.g. a dump body.

A second aspect of the invention provides a working machine comprising a base assembly including a ground engaging structure; an undercarriage connected to the ground engaging structure; a drive arrangement for moving the ground engaging structure to propel, in use, the base assembly and a connected superstructure, wherein the drive arrangement includes a prime mover and a transmission and the drive arrangement is housed within the undercarriage, the undercarriage comprising a main chassis and a subsidiary chassis, the main chassis comprising a connector for connecting the main chassis to a superstructure that mounts a working arm and a mounting interface to mount the subsidiary chassis thereon, wherein an electronic control unit (ECU) for controlling the drive arrangement and/or the ground engaging structure is housed in the main chassis.

It would be appreciated that any of the embodiments of the first aspect of the invention may be used in combination with the second aspect.

A third aspect of the invention provides a working machine comprising a base assembly including a ground engaging structure; an undercarriage connected to the ground engaging structure; a drive arrangement for moving the ground engaging structure to propel, in use, the base assembly and a connected superstructure, wherein the drive arrangement includes a prime mover and a transmission and the drive arrangement is housed within the undercarriage, the undercarriage comprising a main chassis and a subsidiary chassis, the main chassis comprising a connector for connecting the main chassis to a superstructure that mounts a working arm and a mounting interface to mount the subsidiary chassis thereon, wherein an electronic control unit (ECU) for controlling the drive arrangement and/or the ground engaging structure, the subsidiary chassis being at least formed in part from sheet metal material to define a space enclosed on at least three sides, the subsidiary chassis comprising a linear actuator, a mount for an axle and a mount for a first end of the linear actuator wherein the mount for the first end of the linear actuator is located within the space, such that the linear actuator is at least partially housed within the space.

It would be appreciated that any of the embodiments of the first aspect of the invention may be used in combination with the third aspect.

A fourth aspect of the invention provides a working machine comprising a ground engaging structure; an undercarriage connected to the ground engaging structure; a superstructure rotatably mounted to the undercarriage so as to be rotatable relative to the undercarriage about a first generally upright axis; an operator's cab rotatably mounted on the superstructure so as to be rotatable relative to the superstructure about a second generally upright axis; a working arm rotatably mounted to the superstructure so as to be moveable up and down about a generally horizontal axis; a counterweight assembly having a counterweight having a mass for counterbalancing the working arm, the counterweight comprising a mounting arrangement for the mounting of a heat exchanger thereon and defining an air flow path having an inlet and an outlet to permit air to flow through the heat exchanger when mounted thereon; and a drive arrangement for moving the ground engaging structure to propel the working machine, the drive arrangement including a prime mover and transmission; wherein the prime mover and transmission are housed within the undercarriage, and the prime mover is positioned below a level coincident with a lower extent of the superstructure.

It would be appreciated that any of the embodiments of the first aspect of the invention may be used in combination with the fourth aspect.

A fifth aspect of the invention provides a working machine comprising a ground engaging structure; an undercarriage connected to the ground engaging structure; a superstructure rotatably mounted to the undercarriage so as to be rotatable relative to the undercarriage about a first generally upright axis, wherein the undercarriage is at least formed in part from sheet metal to define an internal space enclosed on at least three sides, the undercarriage comprising a linear actuator, a mount for an axle and a mount for a first end of the linear actuator wherein the mount for the first end of the linear actuator is located within the space, such that the linear actuator is at least partially housed within the space; an operator's cab rotatably mounted on the superstructure so as to be rotatable relative to the superstructure about a second generally upright axis; a working arm rotatably mounted to the superstructure so as to be moveable up and down about a generally horizontal axis; a counterweight assembly having a counterweight having a mass for counterbalancing the working arm, the counterweight comprising a mounting arrangement for the mounting of a heat exchanger thereon and defining an air flow path having an inlet and an outlet to permit air to flow through the heat exchanger when mounted thereon; and a drive arrangement for moving the ground engaging structure to propel the working machine, the drive arrangement including a prime mover and transmission; wherein the prime mover and transmission are housed within the undercarriage, and the prime mover is positioned below a level coincident with a lower extent of the superstructure.

It would be appreciated that any of the embodiments of the first aspect of the invention may be used in combination with the fifth aspect.

A sixth aspect of the invention provides for a method of manufacturing a working machine, the working machine comprising a base assembly including a ground engaging structure; an undercarriage connected to the ground engaging structure; a drive arrangement for moving the ground engaging structure to propel, in use, the base assembly and a connected superstructure, wherein the drive arrangement includes a prime mover and a transmission and the drive arrangement is housed within the undercarriage, the method comprising the steps of: providing a substantially standard main chassis; connecting a first and/or second subsidiary chassis to the main chassis in order to form the undercarriage of the working machine; connecting a superstructure with the desired type of working arm to the base assembly.

In one embodiment, the superstructure is mounted to the undercarriage via the main chassis.

In one embodiment, an electronic control unit (ECU) for controlling the drive arrangement and/or the ground engaging structure is housed in the main chassis.

In one embodiment, the method comprises programming the ECU to operate the base assembly and/or superstructure and/or working arm in a manner suitable for the type of superstructure connected to the base assembly.

In one embodiment, the method comprises providing an auxiliary ECU in the superstructure configured to communicate with the ECU of the base assembly to control operation of the base assembly in a manner suitable for the type of superstructure connected to the base assembly.

In one embodiment, the first subsidiary chassis comprises suitable stabilizer legs or a dozer blade arrangement.

In one embodiment, the second subsidiary chassis comprises suitable stabilizer legs or a dozer blade arrangement.

In one embodiment, the working arm is one of an excavator arm, a telescopic arm, a crane arm, a jib, an extensible mast, and/or a scissor lift.

A seventh aspect of the invention provides a working machine comprising a base assembly including a ground engaging structure; an undercarriage connected to the ground engaging structure; a superstructure connected to the undercarriage; an excavator working arm mounted to the superstructure; a rotary connector connecting the undercarriage to the superstructure to permit the superstructure to slew relative to the undercarriage about a substantially vertical axis; and a drive arrangement comprising a prime mover located in the base assembly for moving the ground engaging structure to propel, in use, the working machine, wherein the working arm is slewable relative to the superstructure about a substantially vertical axis.

In one embodiment, the ground engaging structure comprises at least four wheels, with at least two preferably being steerable.

The working machine may be a midi excavator having an operating weight of between approx. 6 and 12 metric tons or it may be a mini excavator having an operating weight of between approx. 1.2 and 6 metric tons.

It would be appreciated that any of the embodiments of the first aspect of the invention may be used in combination with the seventh aspect.

BRIEF DESCRIPTION OF THE DRAWINGS

Embodiments of the invention will now be described, by way of example only, with reference to the accompanying drawings, in which.

DETAILED DESCRIPTION

General Format

Figure 1:
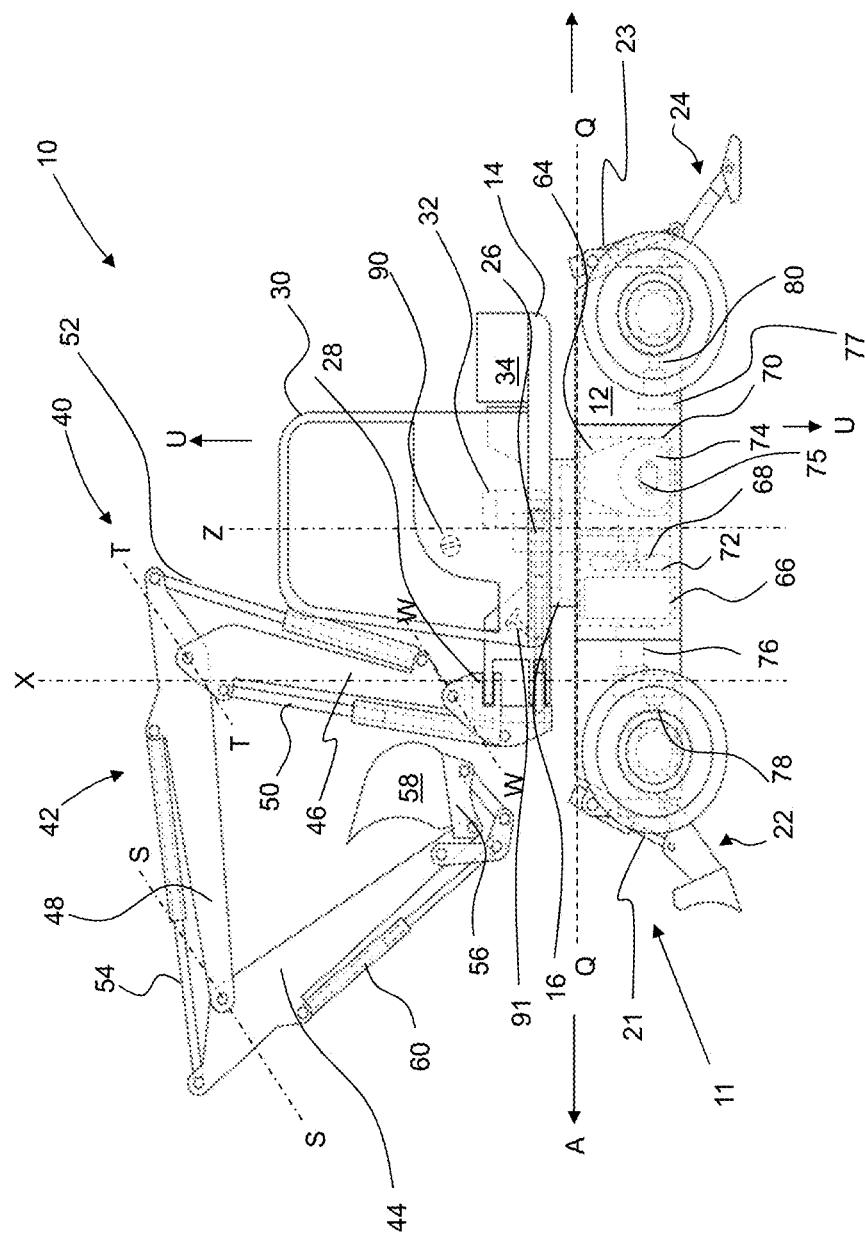
FIG. 1 is a side view of a working machine according to an embodiment of the present invention.
Figure 2:
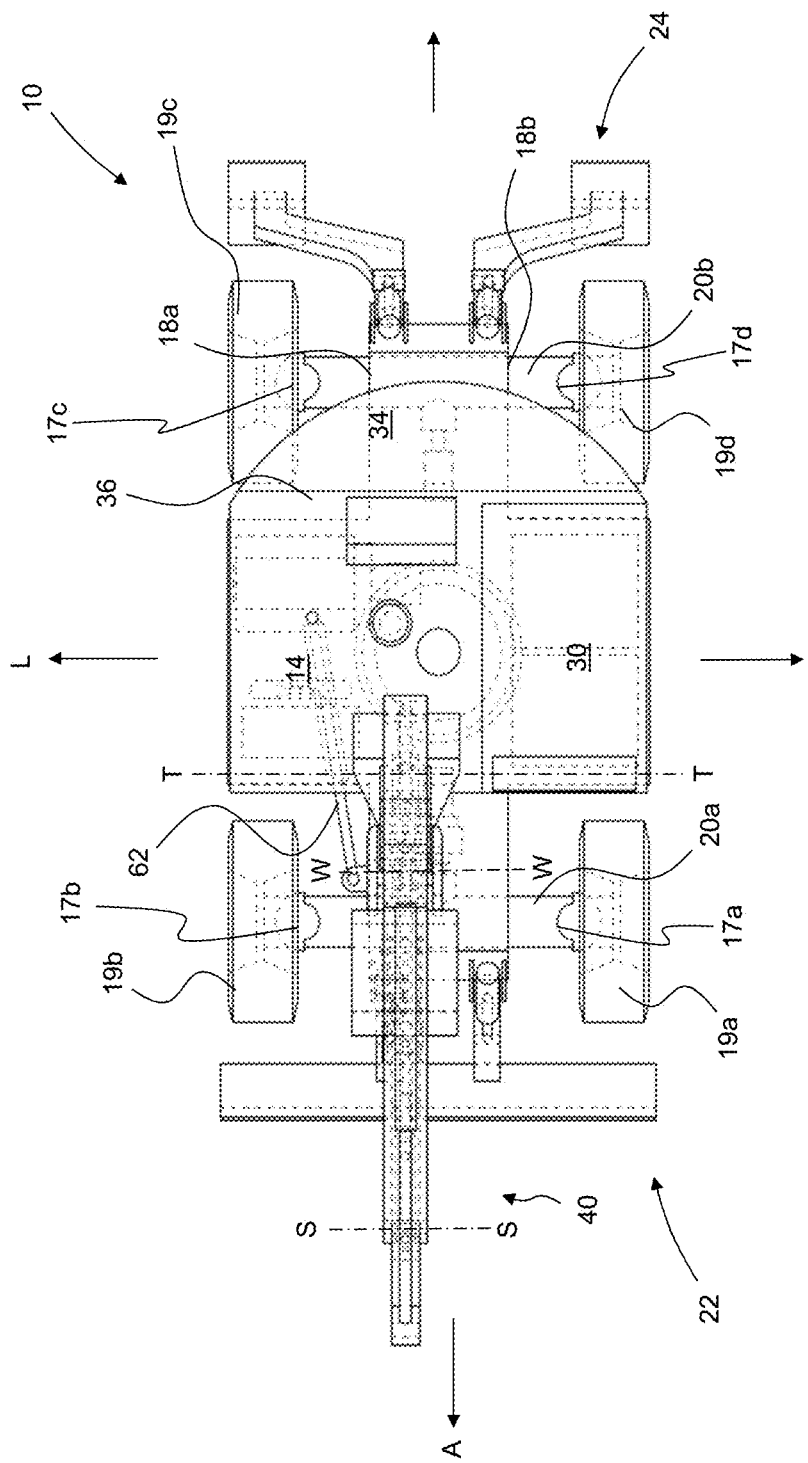
FIG. 2 is a plan view of the machine of FIG. 1.
Figure 3:
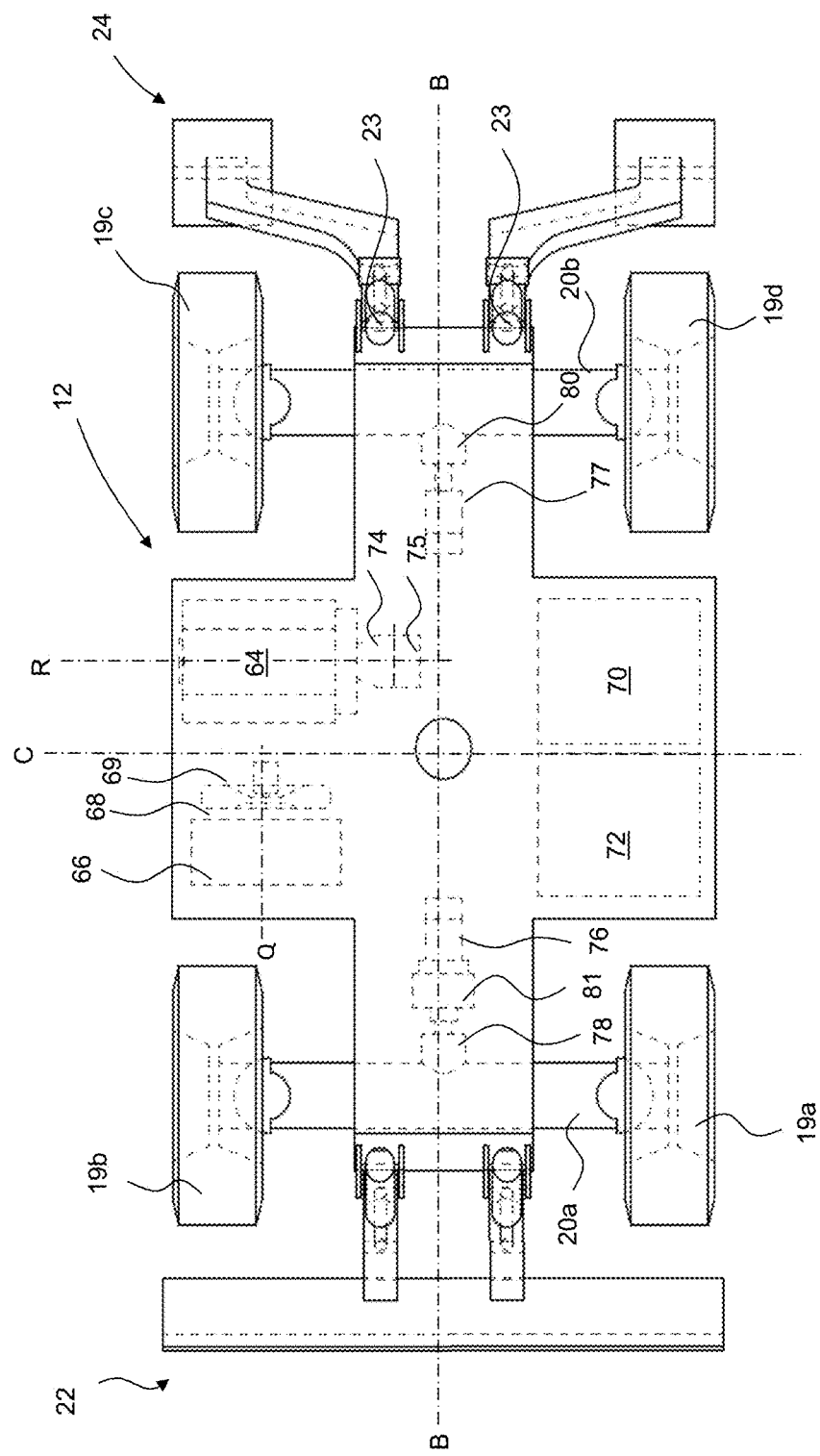
FIG. 3 is a plan view of the undercarriage of the machine of FIG. 1.

With reference to FIGS. 1, 2 and 3, there is illustrated in somewhat simplified form a working machine 10 according to an embodiment of the present invention. In the present embodiment, the working machine may be considered to be a midi excavator (operating weight between approx. 6 and 12 metric tons). In other embodiments the working machine may be a mini excavator (operating weight between 1.2 and 6 metric tons). The machine comprises a base assembly 11 that includes an undercarriage 12. A superstructure 14 is linked to the undercarriage of the base assembly by a slewing mechanism in the form of a slewing ring 16. The slewing ring 16 permits unrestricted rotation of the superstructure relative to the undercarriage 12 in this embodiment. A cab 30 from which an operator can operate the working machine is mounted to the superstructure. A working arm arrangement 40 is rotatably mounted to the superstructure and provided for performing excavating operations.

Undercarriage

The undercarriage is formed from a pair of spaced chassis rails 18a and 18b extending fore-aft, and typically but not always being parallel, or substantially so. The rails provide a majority of the strength of the undercarriage 12. The undercarriage is connected to a ground engaging structure, which in this embodiment includes first and second drive axles 20a and 20b mounted to the chassis rails 18a, 18b and wheels rotatably attached to each axle end. In this embodiment the second drive axle 20b is fixed with respect to the chassis rails 18a, 18b, whereas the first drive axle 20a is capable of limited articulation, thereby permitting the wheels to remain in ground contact, even if the ground is uneven. The wheels 19a, 19b, 19c, 19d are typically provided with off-road pneumatic tires. The wheels 19a, 19b, 19c, 19d connected to both axles 20a, 20b are steerable via a steering hub 17a, 17b, 17c, 17d. In this embodiment, the wheelbase is 2.65 m, and a typical range is 2.0 m to 3.5 m.

For the purposes of the present application, the fore-aft direction A is defined as a direction substantially parallel to the general direction of the chassis rails 18a and 18b. A generally upright direction U is defined as a direction substantially vertical when the working machine is on level ground. A generally lateral direction L is defined as a direction that is substantially horizontal when the working machine is on level ground and is substantially perpendicular to the fore-aft direction A.

In this embodiment, a dozer blade arrangement 22 is pivotally secured to one end of the chassis rails 18a and 18b, which may be raised and lowered by hydraulic cylinders 21 using a known arrangement, and also act as a stabilizer for the machine, by lifting the adjacent wheels off the ground when excavating, however this may not be provided in other embodiments.

A stabilizer leg arrangement 24 is pivotally mounted to an opposite end of the chassis rails 18a and 18b, which also may be raised and lowered by hydraulic cylinders 23 using a known arrangement, but in other embodiments this may be omitted.

Drive

Referring now to FIG. 3, contrary to known excavators, the drive arrangement, including a prime mover and transmission are housed in the undercarriage 12. In the present embodiment, the prime mover is a diesel IC engine 64. The engine 64 is mounted to one side of an axis B extending centrally through the undercarriage in a fore-aft direction. The engine 64 is mounted transverse to the axis B, i.e. an axis of rotation R of a crankshaft of the engine is transverse to the axis B in the fore-aft direction. The engine 64 is further orientated such that the pistons of the engine extend in the substantially upright direction U.

A heat exchanger 66 and cooling fan 68 are housed in the undercarriage adjacent the engine 64. The cooling fan 68 is orientated such that the axis of rotation Q of the fan extends in a fore-aft direction A, although it may be orientated differently in other embodiments.

A fuel tank 70 providing a fuel supply to the engine 64 is positioned on an opposite side of the axis B to the engine. A hydraulic tank 72 is provided adjacent the fuel tank 70 on an opposite side of the axis B to the engine.

The engine 64, heat exchanger 66, cooling fan 68, fuel tank 70 and hydraulic tank 72 are all housed in a region between the axles 20a and 20b. As can be seen in FIG. 1, the engine 64 is positioned below a level coincident with a lower extent of the superstructure 14. Indeed the majority of the engine 64, and in this embodiment the entire engine 64 is positioned below a level Q coincident with an upper extent of the wheels 19a, 19b, 19c, 19d. In the present embodiment the majority of the heat exchanger 66, cooling fan 68, fuel tank 70 and hydraulic tank 72 are below a level Q coincident with the upper extent of the wheels 19a, 19b, 19c, 19d.

Figure 4:
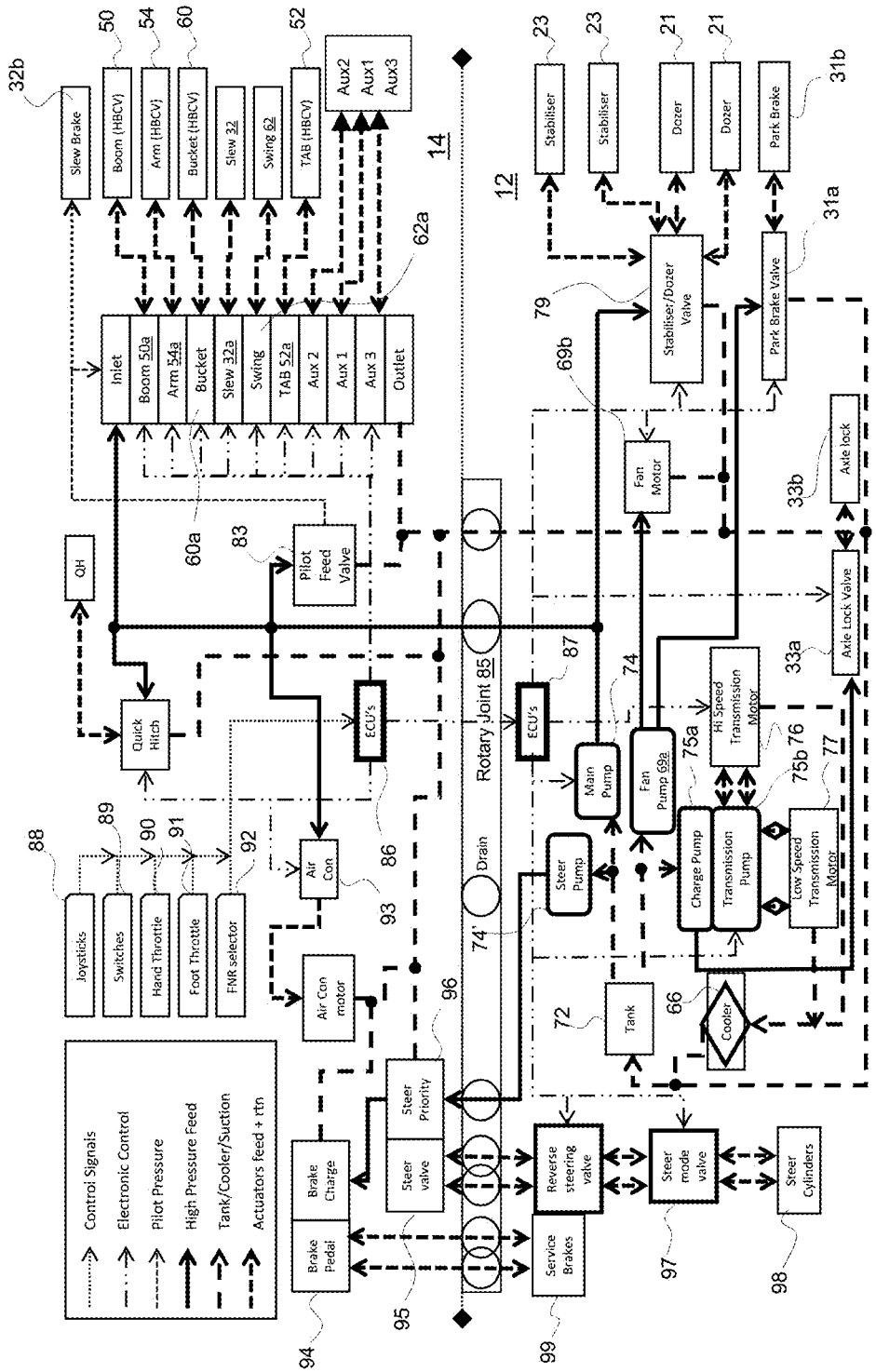
FIG. 4 is a schematic view of a hydraulic and electronic control system of the working machine of FIG. 1.

Referring to FIG. 4, in the present embodiment the transmission is a hydrostatic transmission. The transmission includes a high pressure swash plate type hydraulic transmission pump 75b as well as an associated charge pump 75a. The transmission pump in turn is capable of selectively driving two hydraulic motors 76 and 77. The transmission pump 75b has a typical operating pressure of around 350-450 bar (35-45 MPa).

The engine 64 is configured to drive the charge pump 75a, and the transmission pump 75b. The pumps 75a and 75b are configured to draw hydraulic fluid from the hydraulic fluid tank 72 as required and supply to the hydraulic motors 76 and 77 via a dedicated feed and return hoses (i.e. the flow is essentially closed loop but with hydraulic fluid drawn from and returned from the tank 72 as required). In the present embodiment, the hydraulic motor 76 is positioned towards the dozer blade arrangement 22. The engine 64, hydraulic pump 74 and hydraulic motor 77 are positioned towards the stabilizer arrangement 24.

The first hydraulic motor 76 is a high speed swash plate type motor having a large displacement range, for example of 0 to 255 cm3/revolution, and drives the front axle 20a in a normal direction of travel. The output of the motor 76 faces forwards and drives the first axle 20a via a short drive shaft 78 and differential (not shown). The second hydraulic motor 77 is a relatively low speed swash plate type motor having a smaller displacement range for example of 0 to 125 cm3/revolution. The low speed motor 77 connects to a second drive shaft 80 to drive the second (rear) axle 20b via a second differential (not shown).

In other embodiments a single hydraulic motor may provide drive to both the front and rear axles, typically with a two wheel drive/four wheel drive selector operating a clutch to disengage/engage drive to one axle.

The charge pump 75a and transmission pump 75b are positioned adjacent the engine 64 and are orientated such that an input to the pumps from the engine is axially aligned with an output from the engine to the pump.

Arranging the drive arrangement as described in the undercarriage has been found to result a reduction in the volume of components to be housed in the superstructure, in turn resulting in a line of sight over the right hand rear corner of the machine for an operator having a height of 185 cm (a 95th percentile male) when seated in the operator's seat at the left hand side of the machine in excess of 30° (33° in the embodiment of FIGS. 1 and 2) below the horizontal (compared to around 22° in conventional midi excavators of this size). This results in a significant reduction of the ground area around the machine that is obscured by parts of the superstructure, thereby improving visibility for maneuvering the machine.

A further advantage of positioning the drive arrangement in the undercarriage, compared to conventional excavators where the drive arrangement is generally positioned in the superstructure is that noise, vibration and harshness (NVH) isolation is improved between the engine and the cab to improve comfort and safety for an operator. In addition, access to the engine, fuel tank, fluid tank, etc. for maintenance and refueling is at ground level.

Superstructure

The superstructure 14 comprises a structural platform 26 mounted on the slew ring 16. As can be seen in the Figures, the slew ring 16 is substantially central to the undercarriage 12 in a fore-aft direction A and a lateral direction L, so as to mount the superstructure 14 central to the undercarriage. The slew ring 16 permits rotation of the superstructure 14 relative to the undercarriage about a generally upright axis Z.

A rotary joint arrangement 85 is provided central to the slew ring 16 and is configured to provide multiple hydraulic fluid lines, a return hydraulic fluid line, and an electrical—Controller Area Network (CAN)—signal line to the superstructure from the undercarriage, whilst permitting a full 360° rotation of the superstructure relative to the undercarriage. The configuration of such a rotary joint arrangement is known in the art.

The platform 26 mounts a cab 30. The cab houses the operator's seat and machine controls. The cab is mounted to the platform via a rotary joint arrangement 85 that connects electrical cable(s) and/or hydraulic hose(s) (not shown) between the superstructure 14 and the cab. A slack is provided in the cables and/or hydraulic hoses to permit the cables/hoses to be wound or unwound to allow for rotation of the cab relative to the superstructure about a generally upright axis Y. Rotation of the cab 30 relative to the superstructure 14 is limited to 270° in this embodiment, but may be in a range of 180° to 360°. Limiting rotation to less than 360° permits a simplified arrangement to be used to route cables and/or hoses to the cab. Alternatively, the rotary arrangement could be arranged to permit a full 360° of rotation, e.g. using a rotary joint arrangement similar to that between the undercarriage and the superstructure.

The superstructure 14 is rotated relative to the undercarriage 12 using a first hydraulic motor 32. The cab 30 is rotated relative to the superstructure 14 using a second hydraulic motor (not visible in the drawings) which is situated under the operator's seat. In alternative embodiments the superstructure and/or cab may be rotated using an electric motor.

In this embodiment axes Y and Z are offset (FIG. 5), but in other embodiments may be coincident.

The platform further mounts a kingpost 28 for a working arm arrangement 40. The kingpost 28 arrangement is known in the art, and permits rotation of the working arm about a generally upright axis X and about a generally lateral axis W.

The superstructure 14 further comprises a counterweight 34 for the working arm arrangement positioned at an opposite side of the superstructure to the kingpost 28.

In this embodiment the excavator may be considered to be a compact tail swing (CTS) excavator because the counterweight extends a minimal amount beyond the footprint of the undercarriage. In other embodiments, the working machine may be configured on a zero tail swing (ZTS) excavator where the counterweight does not project beyond the footprint of the undercarriage in any position.

Hydraulic Supply

In this embodiment illustrated in FIG. 4, the engine 64 additionally drives a main, lower pressure hydraulic pump 74 arranged in series with the charge 75a and transmission pumps 75b. In this embodiment, the main hydraulic pump has an operating pressure of around 250-300 bar (25-30 MPa) and is also of a variable displacement type.

The main pump 74 supplies hydraulic fluid to the hydraulic cylinders 50, 52, 54, 60, 62 for operating the working arm arrangement via associated valves in the superstructure 14 and denoted by the same numeral with the suffix 'a', to a slew brake 32b via a pilot feed valve 83, and to auxiliary hydraulic fluid supplies for use by certain attachments such a grabs etc. (not shown). The main pump 74 additionally supplies hydraulic cylinders 21, 23 of the dozer blade and stabilizer arrangement via a stabilizer/dozer valve 79 in the undercarriage. However, in alternative embodiments a single pump may be used for supplying hydraulic fluid to the motors and the hydraulic cylinders. The main pump 74 is further used to provide hydraulic fluid for air conditioning 93, as illustrated in FIG. 4.

In this embodiment the engine additionally drives a separate pump 74' for the steering system and a fan pump 69a to drive a cooling fan motor 69b and a park brake valve 31a for a parking brake 31b. These pumps are, in this embodiment, gear pumps operable at a lower pressure of around 200 bar (20 MPa) and without ECU control.

Further, the charge pump 75a additionally supplies hydraulic fluid to an axle lock valve 33a which selectively prevents the articulation of the front axle 20a.

Working Arm

The working arm arrangement 40 of the present embodiment is an excavator arm arrangement. The working arm arrangement includes a triple articulated boom 42 pivotally connected to a dipper 44. The triple articulated boom 42 includes a first section 46 pivotally connected to a second section 48. A hydraulic cylinder 50 is provided to raise and lower the first section 46 of the boom 42 relative to the kingpost 28 about the generally lateral axis W. A further hydraulic cylinder 52 is provided to pivot the second section 48 of the boom 42 relative to the first section of the boom about a generally lateral axis T. A yet further hydraulic cylinder 54 is provided to rotate the dipper 44 relative to the boom 42 about a generally lateral axis S. A mount 56 is provided to pivotally mount an attachment to the dipper 44, in the present embodiment the attachment is a bucket 58. A hydraulic cylinder 60 is provided to rotate the attachment relative to the dipper 44. Alternatively boom cylinder arrangements (e.g. twin cylinders) may however be utilized in other embodiments.

Shown most clearly in FIG. 2, a yet further hydraulic cylinder 62 is provided to rotate (swing/slew) the working arm arrangement 40 about the generally upright axis X. Using a hydraulic cylinder arrangement to rotate the working arm arrangement simplifies manufacture and operation of the working machine 10.

Rotatable Cab

Referring to FIGS. 5 to 14 an alternative working machine 10' is illustrated, like parts are labeled by like numerals with the suffix '. In this embodiment a cab 30' which houses the operator's seat and machine controls is rotatably mounted to the superstructure 14'. The cab 30' is mounted to the platform via a rotary arrangement 32' that connects electrical cable(s) and/or hydraulic hose(s) (not shown) between the superstructure 14' and the cab. A slack is provided in the cables and/or hydraulic hoses to permit the cables/hoses to be wound or unwound to allow for rotation of the cab relative to the superstructure about a generally upright axis Y. Rotation of the cab 30' relative to the superstructure 14' is limited to 270° in this embodiment, but may be in a range of 180° to 360°. Limiting rotation to less than 360° permits a simplified arrangement to be used to route cables and/or hoses to the cab. Alternatively, the rotary arrangement could be arranged to permit a full 360° of rotation, e.g. using a rotary joint arrangement similar to that between the undercarriage and the superstructure. In this embodiment, the working machine 10' is provided with a single motor 76'

The superstructure 14' is rotated relative to the undercarriage 12' using a first hydraulic motor 32'. The cab 30' is rotated relative to the superstructure 14' using a second hydraulic motor (not visible in the drawings) which is situated under the operator's seat. In alternative embodiments the superstructure and/or cab may be rotated using an electric motor.

In this embodiment axes Y and Z are offset, but in other embodiments may be coincident.

The platform further mounts a kingpost 28' for a working arm arrangement 40'. The kingpost 28' arrangement is known in the art, and permits rotation of the working arm about a generally upright axis X and about a generally lateral axis W.

The superstructure 14' further comprises a counterweight 34' for the working arm arrangement positioned at an opposite side of the superstructure to the kingpost 28'.

Figure 5:
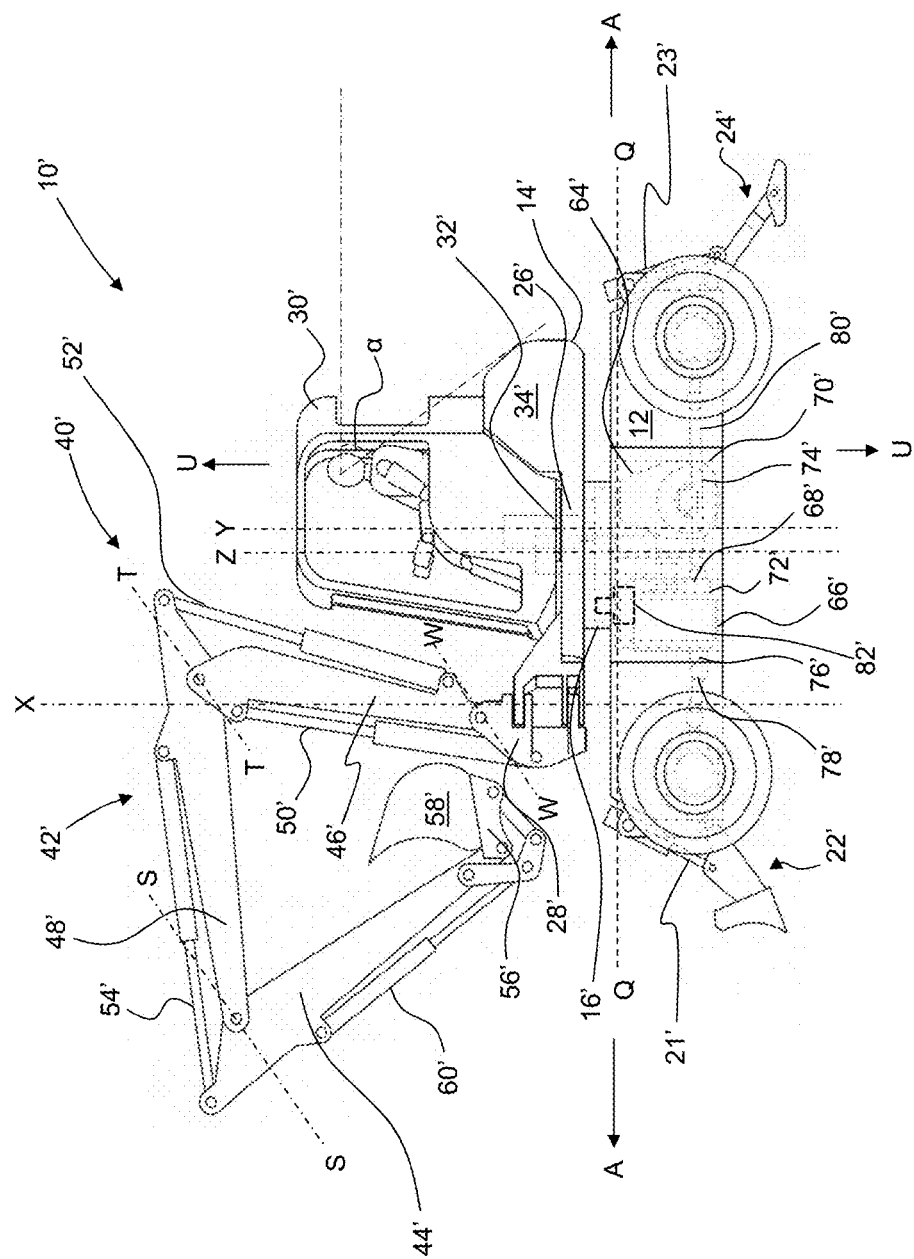
FIG. 5 is a side view of a working machine according to a second embodiment of the present invention.
Figure 6:
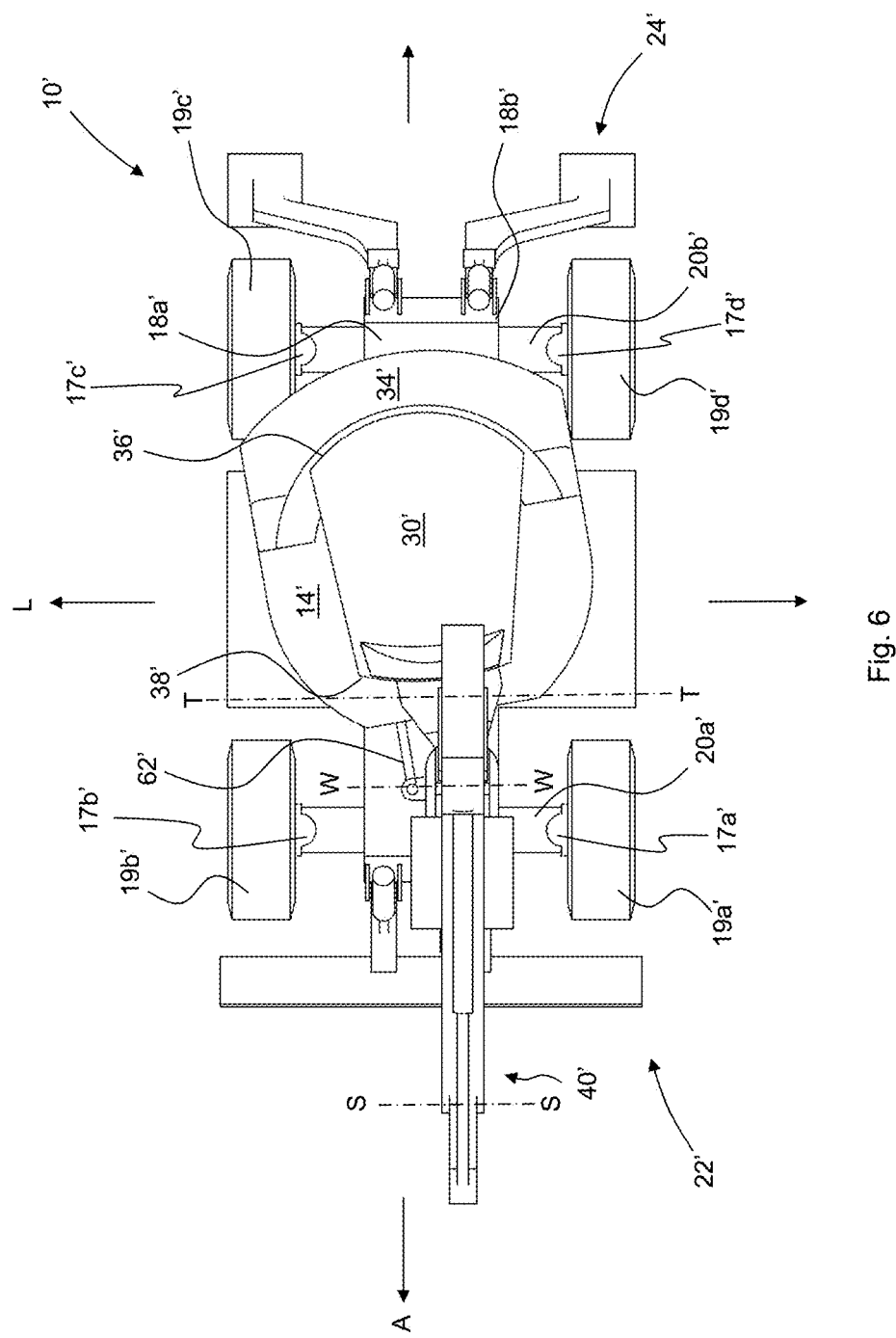
FIG. 6 is a plan view of the machine of FIG. 5.
Figure 7:
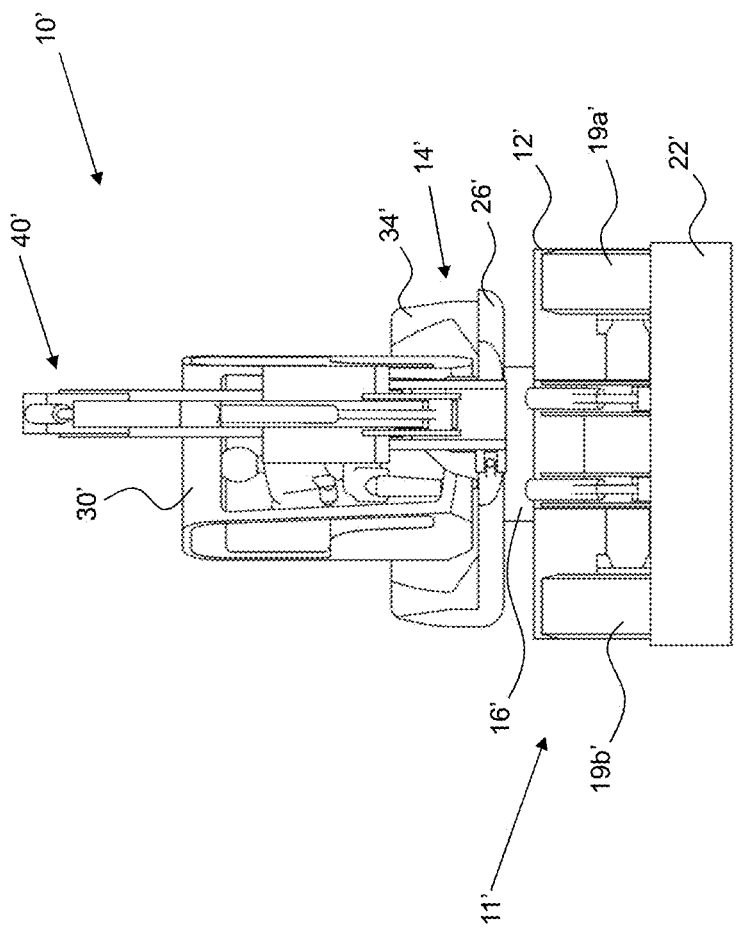
FIG. 7 is a front view of the machine of FIG. 5.

In the straight dig position shown in FIGS. 5 to 7, the counterweight 34' is behind the cab 30' to optimize the counterbalance effect, and in the roading position shown in FIGS. 11 to 14 the counterweight 34' is in front of the cab 30'.

In this embodiment, the counterweight 34' has a curved profile in a region nearest the cab. The rear 36' of the cab and the front 38' of the cab each have a curved profile that is complimentary to the curved profile of the counterweight. The complimentary curved profiles accommodate rotation of the cab relative to the superstructure 14' in a particularly compact manner. The counterweight protrudes upwardly from the platform 26' by a distance that is ¼ to ⅓ of the height of the cab 30'. Such a height has been found to have limited impedance on an operator's line of sight across a range of operating modes. That is, an operator's line of sight is improved in the straight dig position shown in FIGS. 5 to 7 when looking over their shoulder and is equally good on each lateral side of the cab when the operator is facing forwards.

In this embodiment the excavator may be considered to be a compact tail swing (CTS) excavator because the counterweight extends a minimal amount beyond the footprint of the undercarriage. In other embodiments, the working machine may be configured on a zero tail swing (ZTS) excavator where the counterweight does not project beyond the footprint of the undercarriage in any position.

Provision of a cab 30' rotatable relative to the superstructure 14', a superstructure rotatable relative to the undercarriage 12', and a working arm arrangement 40' rotatable relative to the superstructure permits said components of the working machine to be rotated relative to each other such that an operator has improved visibility compared to working machines of a similar type of the prior art and also to enable the working machine to work within a confined space.

Housing the engine in the undercarriage, as opposed to a more conventional position in the superstructure 14', improves visibility for a user. Positioning the engine in the undercarriage instead of, for example the superstructure, and positioning a majority of the engine below the level Q means that the engine does not create a barrier or at least a much lesser barrier to the line of sight of an operator. As a result the line of sight angle α (FIG. 5) over the right hand rear corner of the machine for an operator having a height of 185 cm (a 95th percentile male) when seated in the operator's seat is at least 30° below the horizontal (compared to around 20° in conventional midi excavators of this size), but for the centrally positioned cab is typically more than for the offset cab of FIGS. 1 and 2, i.e. greater than 35°, but more typically more than 40° or even up to 50°. In the present embodiment, the drive arrangement has been arranged to be compactly housed within the undercarriage, which minimizes the width, length and height of the undercarriage to further improve visibility for a user.

Figure 36:
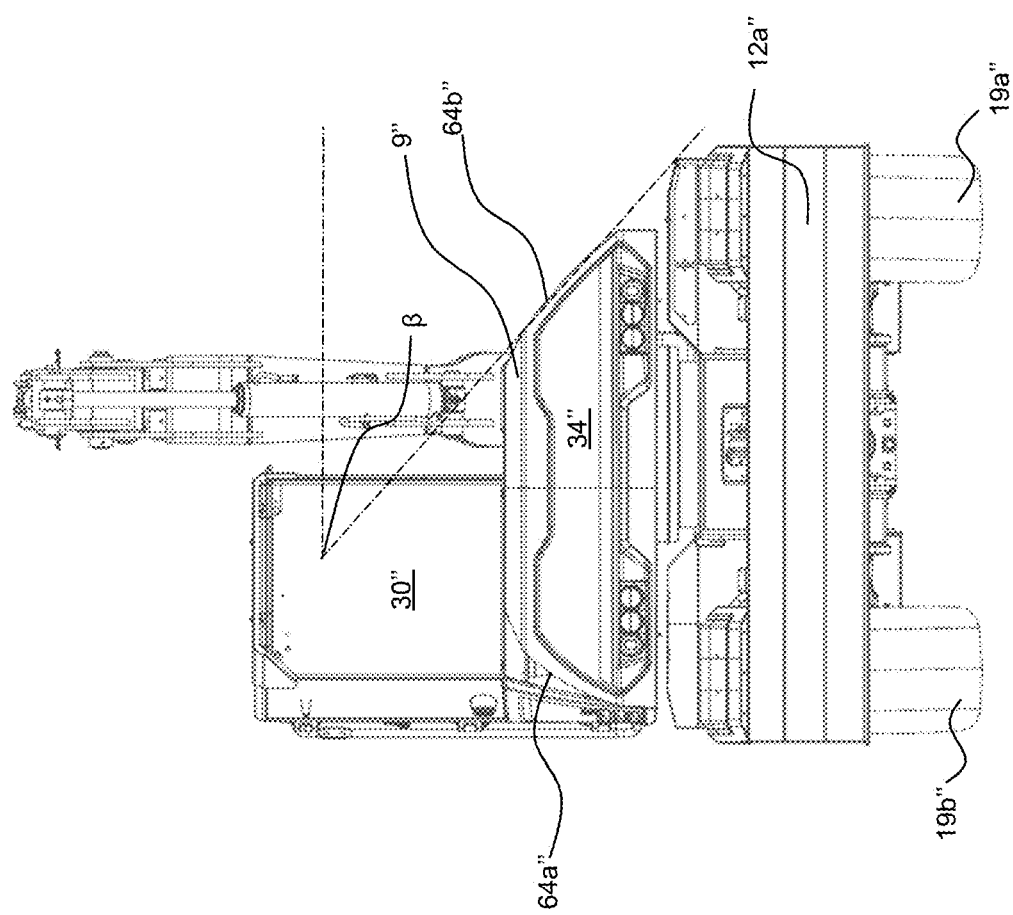
FIG. 36 is a rear elevation view of the working machine according to an embodiment of the present invention.
Figure 37:
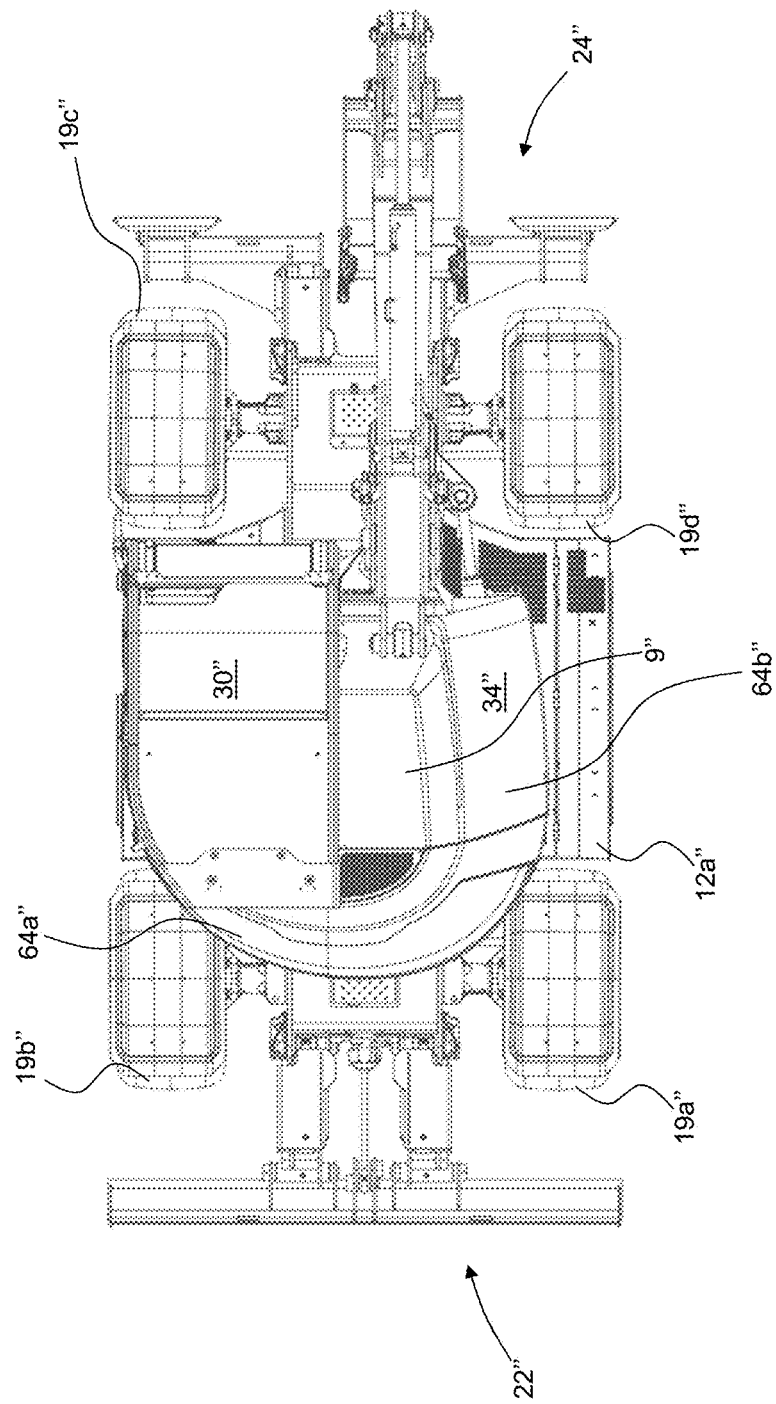
FIG. 37 is a plan view of the working machine of FIG. 36.

In an alternative arrangement, as illustrated in FIGS. 36 and 37, a working machine is illustrated generally at 10", and like parts are labeled by like numerals with reference to FIG. 5 with the suffix ". In this embodiment, the improvements to the line of sight angle β is achieved by providing the counterweight 34" and superstructure canopy/bodywork 9" with a sloped surface 64". As a result of this sloped surface 64", the line of sight angle β is improved for a user.

In the offset cab arrangement illustrated in FIGS. 36 and 37, this line of sight angle β is further improved by incorporating sloped surfaces 64a", 64b" on opposing sides of the counterweight 34" so as to define a trapezium in rear view, where the opposing sloped surfaces are asymmetric. As can be seen from FIGS. 36 and 37, the sloped surface 64a" of the counterweight 34" positioned on the same side of the working machine 10' as the cab 30" has a steeper slope that the sloped surface on the opposing side of the counterweight 34". The asymmetric arrangement of the counterweight 34" ensures that while the prime mover and drive arrangement has been arranged to be compactly housed within the undercarriage 12", the remaining systems (e.g. the air conditioning condenser, hydraulic systems) housed within the counterweight and bodywork of the superstructure can be optimally packaged so, the line of sight angle for a user is maximized to the left, right and rear of the machine, whilst machine stability is maintained. It can be seen that in the machine of FIGS. 36 and 37 the sloped sides are convex and therefore the angle of the slope varies. As such angles for these slopes as defined herein should be taken to be the angle at a mid-point of the slope or inclined portion.

As can be seen in the drawings, the present invention provides a compact working machine, and the position of the engine and transmission contributes to achieving said compactness. Referring to FIGS. 5 to 7, it can be seen that the superstructure 14' is approximately ¾ of the length of the undercarriage 12'. However, the width of the superstructure is substantially equal to the width of the undercarriage. The cab 30' is approximately ½ of the width of the undercarriage 12', measured at the widest points, and ¾ of the length of the superstructure 14', measured at the longest points. The described dimensions of the working machine have been found to further improve visibility and also provide a versatile machine capable of operating in confined spaces.

Straight Dig Operation

Referring to FIGS. 5 to 7, if an operator would like to perform a straight dig, the cab 30' is rotated about the upright axis Y so that an operator is facing a direction generally towards the dozer blade arrangement 22'. The superstructure 14' is rotated about the upright axis Z so that the working arm arrangement 40' is only slightly offset from the axis B and so that the counterweight 34' is behind the cab and the operator can see down the side of the working arm into e.g. a trench being excavated. The hydraulic ram 62' is then extended or retracted, as required, to rotate the working arm arrangement about the upright axis X such that the working arm is substantially parallel to the axis B. In this position, an operator is seated facing towards the working arm arrangement 40' and has good visibility of the region that requires excavating. Additionally, if the operation is a linear trenching operation the working machine can simply be repositioned by reversing once a portion of the trench is excavated.

The stabilizer arrangement 24' can be deployed to engage the ground for added stability. If further stability is required, the dozer blade arrangement 22' can be extended to engage the ground and lift the wheels 19a', 19b' of the front axle 20a' off the ground.

The hydraulic rams 52', 54', 60' can then be used to pivot the first and second sections of the boom 42' relative to each other, pivot the dipper 44' relative to the boom 42', and/or pivot the bucket 58' relative to the dipper, as required to perform an excavating operation.

As can be seen in FIG. 5, the configuration of the working machine 10' enables an operator to have good visibility of the area being excavated.

Offset Dig Operation

Figure 8:
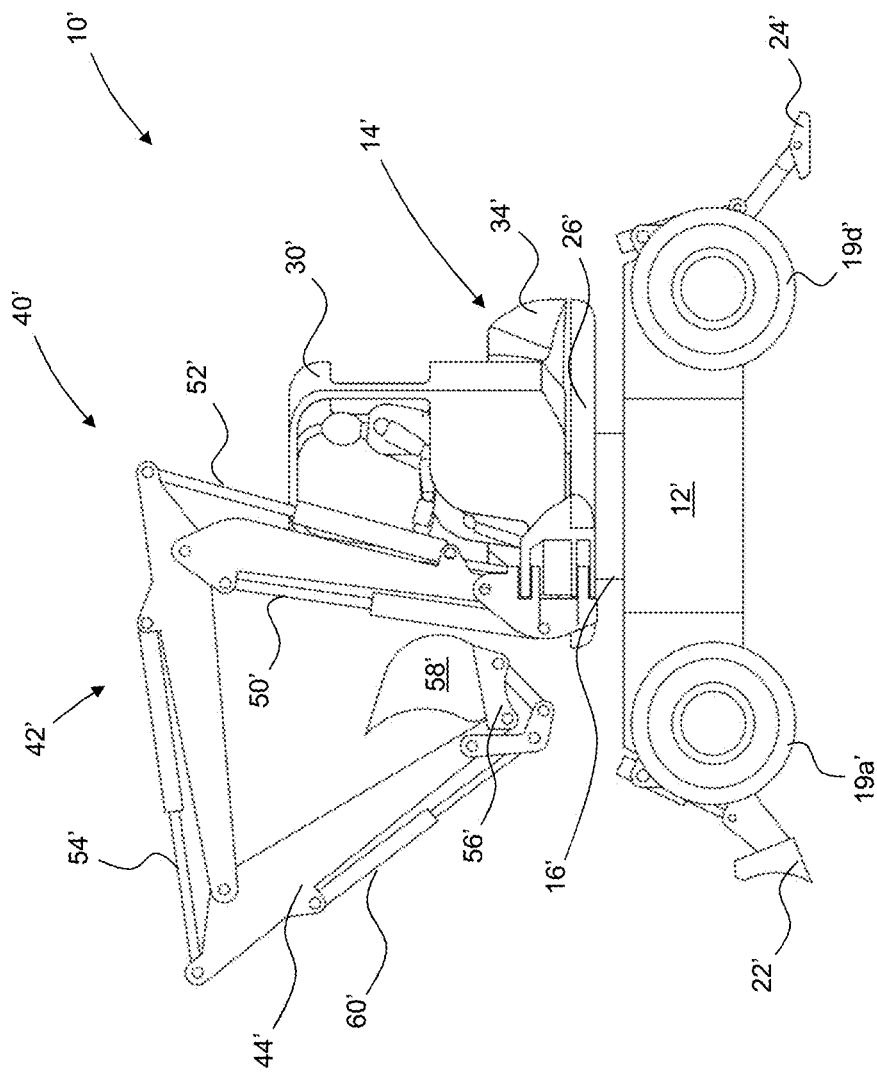
FIG. 8 is a side view of the machine of FIG. 5 in an offset dig position.
Figure 9:
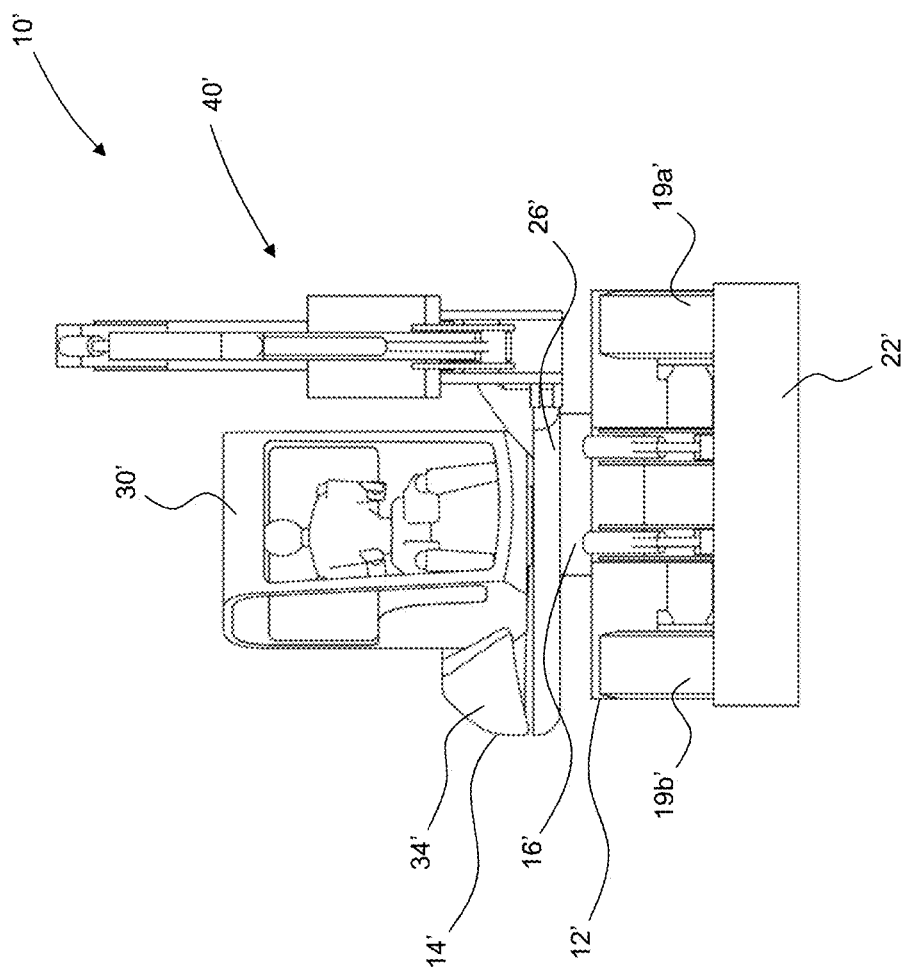
FIG. 9 is a front view of the machine of FIG. 8.
Figure 10:
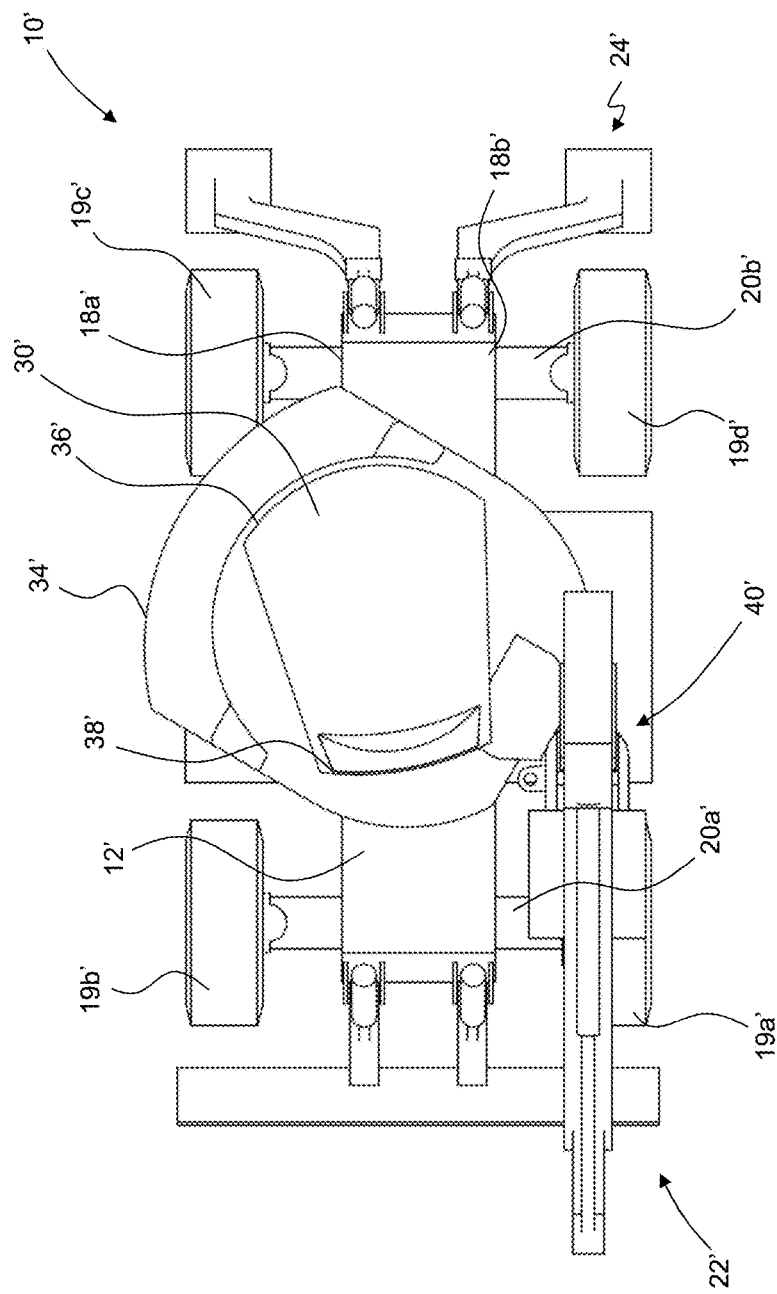
FIG. 10 is a plan view of the machine of FIG. 8.
Figure 11:
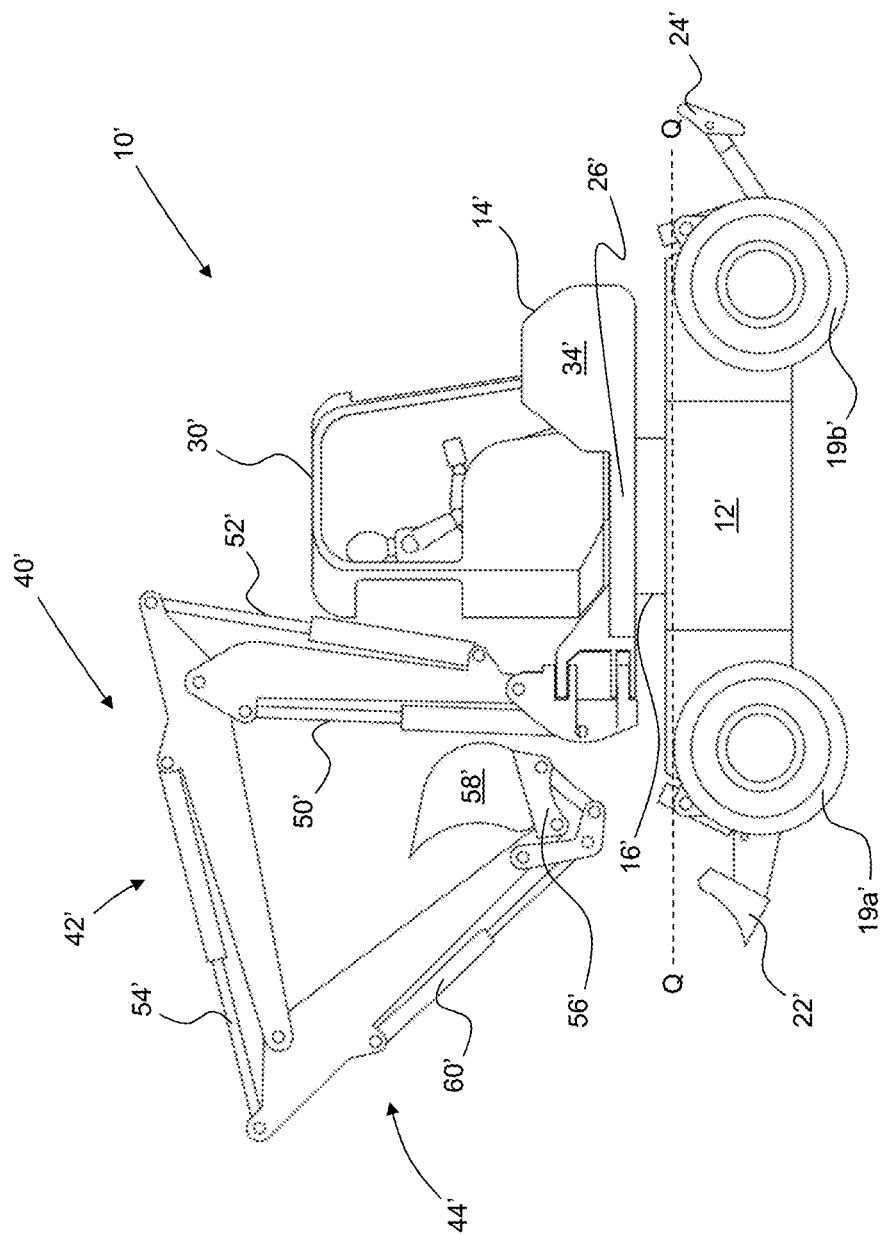
FIG. 11 is a side view of the working machine of FIG. 5 in a roading position.
Figure 12:
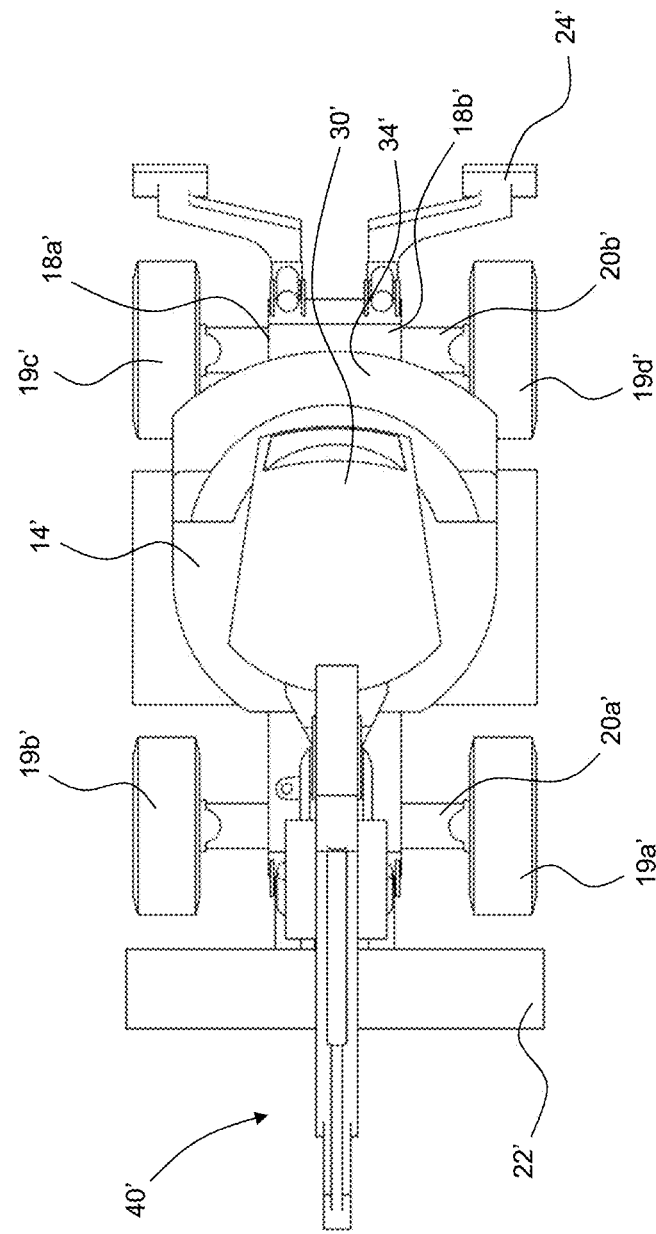
FIG. 12 is a plan view of the machine of FIG. 11.
Figure 13:
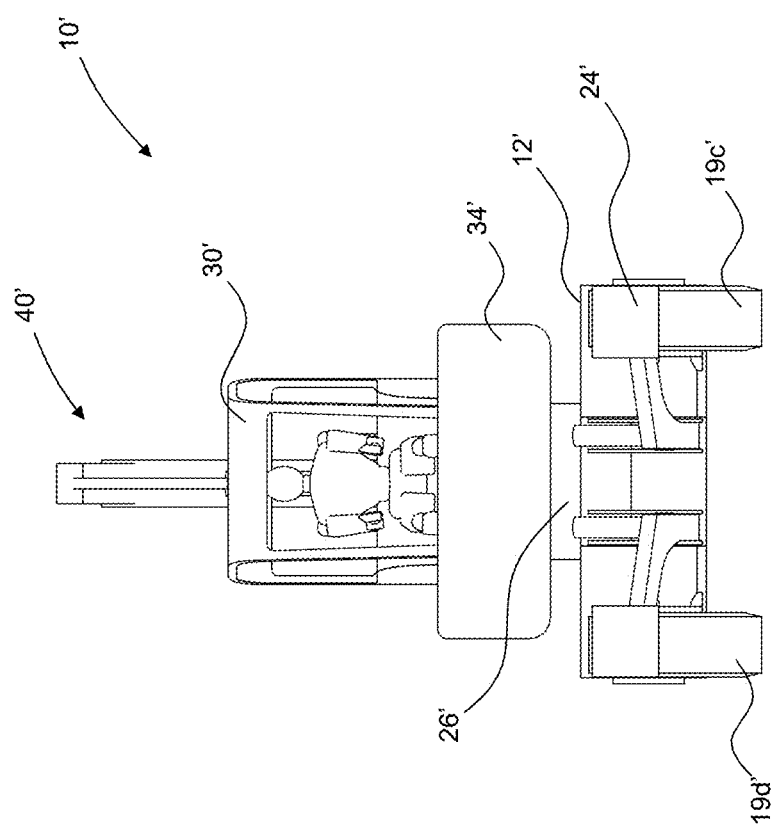
FIG. 13 is a front view of the machine of FIG. 11.

Referring to FIGS. 8 to 10, an offset mode of excavating is shown. This type of excavating may be used, for example, if the working machine 10' is being used to dig a trench near a wall. In this mode of operation the cab 30' can be rotated so as to be facing towards an end where the dozer blade 22' is positioned, but transverse to the axis B so that the operator is facing towards the trench to be dug. The superstructure is rotated so that the counterweight 34' is rearward of the cab 30' but offset to one side and the working arm arrangement 40' is forward of the cab 30' but offset to one side thereof.

The hydraulic ram 62' is then retracted to rotate the working arm arrangement 40' so as to extend in the fore-aft direction. If required, the stabilizer arrangement 24' and optionally the dozer arrangement 22' are extended for additional stability. The hydraulic rams 50', 52', 54' and 60' are then operated to move the working arm arrangement 40' to dig the trench. Further, repositioning after a digging operation may be achieved by simple reversing of the working machine.

Roading Operation

Referring to FIGS. 11 to 14, if an operator wants to drive the working machine 10', for example on the road, for a significant distance (i.e. a "roading" operation) the cab 30' is rotated so that an operator is facing a direction generally towards the stabilizer arrangement 24'. The superstructure 14' is rotated so that the counterweight 34' is at the front of the cab and the working arm arrangement 40' is to the rear of the cab.

The hydraulic rams 50', 52', 54' and 60' are extended to fold the working arm arrangement 40' into a compact configuration.

Positioning the working arm arrangement 40' behind the cab 30', the small height of the counterweight 34' and the position of the engine within the undercarriage ensures that the operator's vision during driving is optimized.

As is evidenced from the described modes of operation, the working machine of the present invention enables an operator to perform numerous different operating tasks in a confined space and with improved visibility.

Machine Controls

With reference to FIGS. 1 to 4, a number of machine control inputs are provided in the cab 30. In this embodiment the inputs (with the exception of steering and braking) are electrically transmitted via a CAN bus to one or more superstructure Electronic Control Units (ECUs) 86, incorporating a suitable microprocessor, memory, etc. to interpret the inputs to signal the various valves for controlling movement of the working arm etc. and/or one or more further undercarriage ECUs 87 to ultimately control hydraulic functions in the undercarriage, including a stabilizer/dozer valve 79, a fan motor 69b, park brake valve 31a, axle lock valve 33a, main pump 74, transmission pump 75b, steer mode valve 97.

In alternative embodiments an ECU may only be provided in base assembly (e.g. housed in the undercarriage) and signals from the machine input controls may be sent directly to the ECU 87 in the undercarriage instead of via the ECU 86 in the superstructure. The electrical connections for such an arrangement can be routed from the control inputs to the ECU 87 via the slew ring and rotary joint arrangement.

The control inputs include: joysticks 88 to control operation of the working arm 40, switches 89 for various secondary functions, a hand throttle 90 to set engine speed for working operations, a foot throttle 91 to dynamically set engine speed for roading/maneuvering, and a forward/neutral/reverse (FNR) selector 92 to engage drive in a desired direction.

Due to the safety-critical nature of steering and braking, the brake pedal and steering are hydraulically controlled by a brake pedal 94 and steer valve 95 linked to a steering wheel (not shown). Hydraulic fluid feed is from the dedicated steer pump 74' via the rotary joint 85 and a steer priority valve 96, which ensure an appropriate supply of hydraulic fluid is provided to the brake pedal 94/steer valve 95, dependent upon demand.

The steer valve 95 then feeds a steer mode valve 97 in the undercarriage 12, which controls whether the machine is operating in four-wheel steer (off road), two-wheel steer (on road) or crab steer, via another feed through the rotary joint. The steer mode valve then feeds hydraulic fluid to appropriate steering cylinders 98, dependent upon the mode chosen.

The brake pedal 94 supplies fluid to service brakes 99 at the wheel ends also via a feed through the rotary joint. A separate hydraulic fluid feed from a fan pump 69a supplies a parking brake valve 31a as well as the fan motor 69b and axle lock valve 33a under the control of the superstructure ECU(s) 86 and undercarriage ECU(s) 87.

In other embodiments, braking and steering may be affected via electronic control, provided a suitable level of fault tolerance is built into the system.

High Speed Reading Operation

When the working machine 10, illustrated in FIGS. 1 to 4 (or the machine of FIG. 5 if adapted to have high and low speed motors), is operating on road or e.g. maneuvering on a level/hard surface, speed of movement of the machine 10 is preferred ahead of traction or torque. Thus, in a first two-wheel drive operating mode, the vehicle operator selects 2WD on a 2WD/4WD selector (not shown), signaling the appropriate superstructure ECU 86, which in turn signals the transmission pump 75b via the undercarriage ECU 87 to permit the flow of hydraulic fluid to the high speed motor 76.

Thereafter, the operator selects forward or reverse from the FNR selector 92, the signal for which is fed through to the transmission pump 75b in a similar manner to direct hydraulic fluid therethrough in the correct flow direction to turn the high speed motor 76, and therefore the wheels 19a and 19b, in the desired direction.

The operator then sets the engine speed using the foot throttle 91 which in turn drives the transmission pump 75b at the desired speed. The undercarriage ECU 87 controls the swash angle of the pump 75b and high speed motor 76, resulting in rotation of the high speed motor 76 and driven rotation of the wheels 19a, 19b on the first axle 20a.

Typically, this enables travel at a maximum speed of around 40 km/h.

Low Speed Operation

For low speed, higher torque, higher traction maneuvering, typically in an off-road location such as a construction site, the operator selects a second four wheel drive operating mode from the 2WD/4WD selector. This in turn signals superstructure ECU 86, which in turn signals the transmission pump 75b via the undercarriage ECU 87 to permit the flow of hydraulic fluid to both the high speed motor 76 and low speed motor 77.

Thereafter, the operator selects forward or reverse from the FNR selector 92, the signal for which is fed through to the transmission pump 75b in a similar manner to determine the direction of flow of hydraulic fluid into the high speed motor 76 and low speed motor 77.

The operator then sets the engine speed using the foot throttle 91 which in turn drives the transmission pump 75b at the desired speed. The undercarriage ECU 87 preferably controls the swash angle of the pump 75b and high speed motor 76, ultimately resulting in rotation of the high speed motor 76, low speed motor 77 and drive to the wheels 19a, 19b, 19c, 19d on both the first and second axles 20a, 20b at compatible speeds.

Typically, this operating mode provides a lower maximum speed for off-road operation e.g. of 10 km/h or less.

The high and low speed operations are also applicable to the other working machines described below.

Repositioning During Working Operations

During working operations, such as trenching or grading, the operator sets the hand throttle to a non-zero position to set a desired engine speed for operations at an appropriate operating speed.

In this condition, the ECU 86 is programmed to control the drive of working machine 10 differently. With the hand throttle 90 at a non-zero position, inputs from the foot throttle 91 are interpreted by the ECU 86 as a wheel speed demand signal, not an engine speed demand signal. This constitutes a second mode of operation of the transmission, which may be referred to as a "site mode" or "dig mode".

Figure 15:
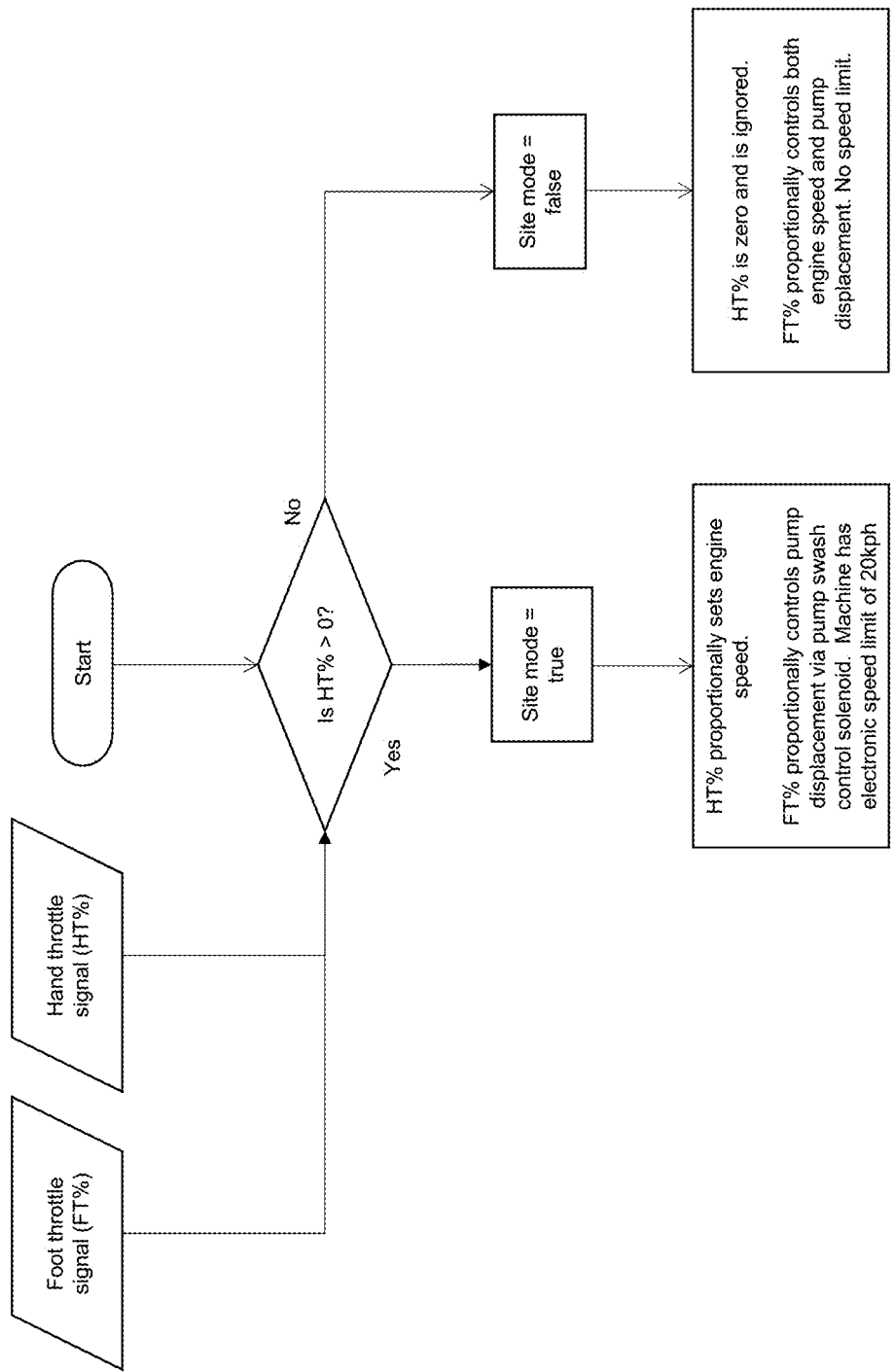
FIG. 15 is a flowchart illustrating operation of the working machine according to an embodiment of the present invention.

With reference to the flow chart of FIG. 15, to enable this, the superstructure ECU 86 interprets monitors both the hand throttle and foot throttle signals HT % and FT %, and if HT % is greater than zero, enters site mode. In this mode, the hand throttle continues to provide an engine speed demand signal (i.e. to proportionally control engine speed in a conventional manner) and to set the engine speed demand at a desired level, and keep it at that level unless there is further operator intervention. However, the foot throttle, instead of continuing to control engine speed above the level set by the hand throttle, now proportionally controls transmission pump 75b displacement. In a swash plate-type pump, this is achieved by controlling the pump swash angle using a suitable control solenoid (not shown), for example.

Thus, to carry out a slow forward repositioning maneuver, when the engine speed is set to an appropriate level for the working operation being carried out on the hand throttle 90, the operator selects Forward on the FNR selector 92 and lightly depresses the foot throttle 91. This is interpreted by the superstructure ECU 86, and transmitted via the undercarriage ECU 87 to the control solenoid (not shown) to result in a slight change of the swash angle of the pump, resulting in a relatively low forward speed despite the operating high speed of the transmission pump 75b, making the machine safe to control during the maneuver. Depressing the foot throttle by a greater amount will cause an increase in forward speed. However, in view of the fact this mode will occur on a site often with restricted space and other personnel and machinery in the vicinity whose safety needs to be maintained, an upper speed is preferably set electronically at say 20 km/h.

In order to create a substantially linear relationship between the foot throttle demand and wheel speed, independent of the load applied to the drive arrangement, suitable wheel, transmission or ground speed sensors may be provided to supply feedback to the lower ECU 87 on the pump swash angle in a closed-loop manner. The hydraulic fluid is supplied to one or both of the high and low speed motors 76, 77, dependent upon whether the 2WD or 4WD is selected.

In other embodiments, an additional solenoid proportional flow control valve in the feed or return path to the high speed motor 76, or a bypass path for the high speed motor with suitable flow control, may be provided.

As a consequence of this arrangement, the operator is able to quickly and safely reposition the working machine between or during working operations, without needing to adjust the hand throttle 90.

Figure 16:
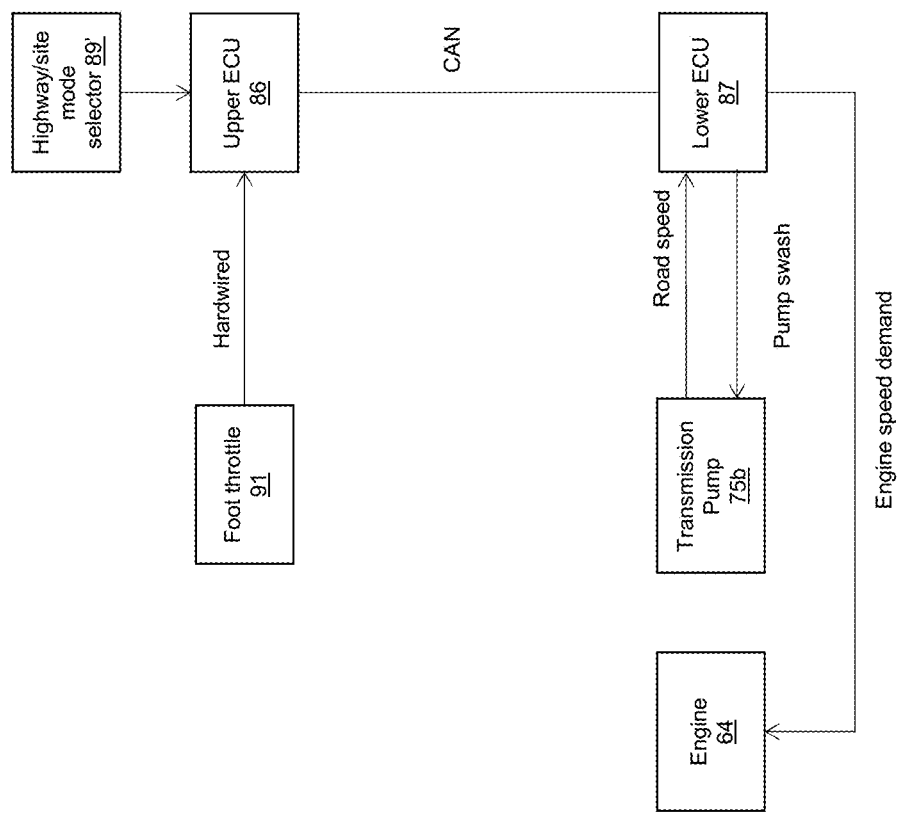
FIG. 16 is a simplified schematic view of a control system according to another embodiment of the present invention.

In a further embodiment, illustrated in FIG. 16, an additional site/highway selector input 89', e.g. a suitable switch, button or control screen icon, is provided rather than the hand throttle in effect acting in this role in the embodiment of FIG. 15.

In this embodiment, the transmission operates using a similar principle as the first embodiment. When the selector is in highway mode, the foot throttle 91 controls road speed in conventional manner i.e. via engine speed. In this embodiment, inputs to the hand throttle are ignored in highway mode.

When site mode is selected, the position of the hand throttle 90 level is used to set maximum speed up to a maximum safe site limit (e.g. 20 km/h as in the first embodiment), as well as the engine speed suitable for the working operation being carried out. Thus, for working operations requiring finer control and therefore lower revs, the maximum travel speed is lower than for operations requiring more hydraulic power (e.g. greater bucket tear-out force) and more engine revs.

In this mode, the foot throttle 91 again controls the transmission pump 75b swash angle to control wheel speed, optionally with closed loop feedback on actual wheel speed or ground speed in order that the relation between the amount the foot throttle is actuated and the wheel/ground speed is as linear as possible.

Although described in relation to an excavator having the prime mover, pumps, motors and tanks in the undercarriage, it will be appreciated that this arrangement may be applicable to conventional excavators where the prime mover, etc. are located in the superstructure, and for other working machines having a hydrostatic drive to one, two or more motors, such as certain telehandlers, skid steer loaders etc. For certain such machines, this mode may have further benefits in that it enables for finely controlled wheel speed when simultaneously performing a working operation. This may be useful, for example when using a front shovel in a grading operation or inching forward whilst tipping from a shovel.

In certain embodiments, interlocks may be incorporated into the system, e.g. to prevent drive being sent to the wheels whilst the stabilizer legs 24/dozer blade 22 are lowered, or limiting travel speed if the working arm is in certain positions.

It will be further appreciated that although the high speed and low speed operations and the site and roading throttle modes have been described with reference to the embodiment of FIGS. 1 and 2, the operations are substantially the same for the embodiment illustrated in FIGS. 5 to 14 or the other working machines described in more detail below.

Counterweight Assembly

Figure 17:
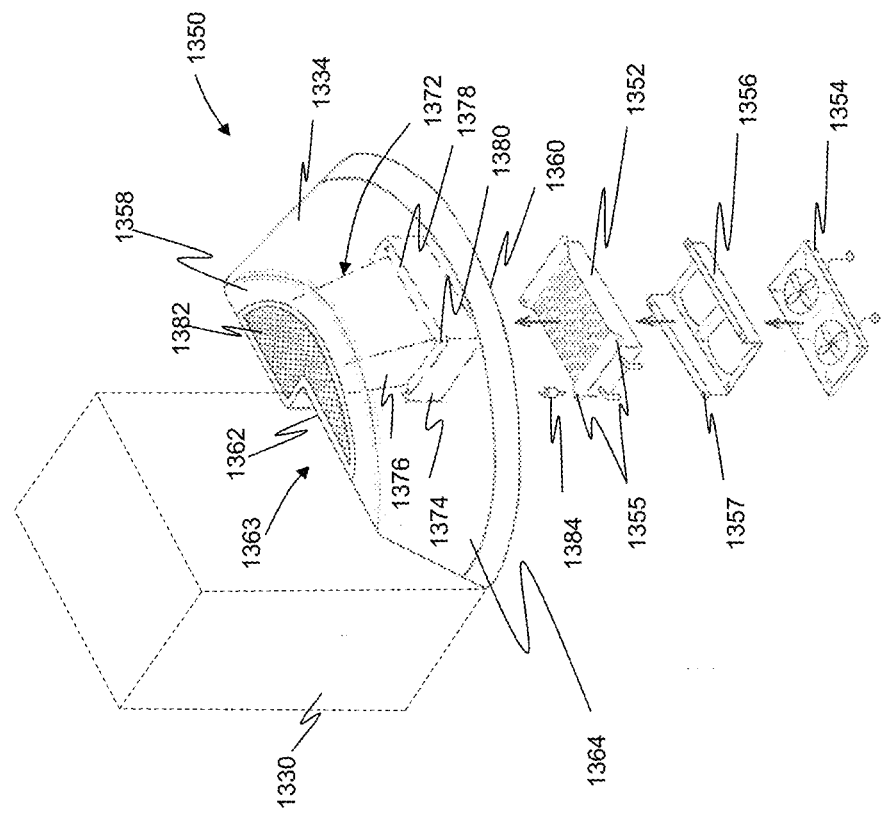
FIG. 17 is an isometric view of a counterweight assembly according to an embodiment of the present invention.

Referring to FIG. 17, the counterweight assembly 1350 incorporating the counterweight 1334 is illustrated in more detail.

The counterweight 1334 has an upper surface 1358 and a lower surface 1360 which are substantially parallel to each other, a vertical front surface 1362 configured to be positioned against the rear wall 36 of the cab 1330, and an angled surface 1364 at the point furthest from the cab. Consequently, the counterweight 1334 is substantially a right angled trapezium in side view. The counterweight 1334 defines a segment of a circle in plan view by virtue of the angled surface 1364 also being curved and in this embodiment is intended for use with the Z offset fixed cab embodiment.

This curved shape serves to minimize the overhang of the superstructure relative to the undercarriage across the full range of rotation of the superstructure such that the working machine may be considered to be a compact tail swing (CTS) or a zero tail swing (ZTS) excavator.

In this embodiment, the front surface 1362 of the counterweight 1334 is configured with a recess 1363 for a compact fit against the rear of the cab 1330 and the recess extends substantially half of the width of the counterweight 1334 and the recess of the counterweight is shown positioned against a cab in FIG. 17. The counterweight 1334 protrudes upwardly from the platform 1326 by a distance that is ¼ to ⅓ of the height of the cab 1330. Such a height has been found to have limited impedance on an operator's line of sight across a range of operating modes. That is, an operator's line of sight is improved when looking over their shoulder.

In this embodiment, the counterweight 1334 is cast a single component and is produced to define an air flow path 1372 therethrough and a mounting arrangement 1378 by using a suitable core as part of the casting process. The counterweight assembly 1350 comprises a counterweight 1334, a condenser 1352 of an air conditioning unit, a twin electric fan 1354 and a fan mounting frame 1356. In alternative embodiments the fan 1354 may be hydraulically powered.

In this embodiment, the air flow path defines a duct 1372 formed through the counterweight 1334 defining an inlet and an outlet. The duct 1372 defines two regions through the counterweight 1334, the first 1374 is substantially rectangular in shape at the inlet to conform to the shape of the condenser 1352, and the second 1376 is narrower than the first so as to provide the mounting surface 1378. In this embodiment, the mounting surface is provided in the form of a ledge 1378 at the interface between the regions which extends around all four internal side of the duct. The first region 1374 extends substantially perpendicular to the lower surface 1360 and extends a distance which is substantially equal to the height of the condenser 1352, fan 1354 and mount 1356 system.

In this embodiment, the ledge 1378 comprises four threaded bores 1380 located in the four corners of the ledge for mounting the condenser 1352 thereon. The condenser 1352 further comprises four bores 1355 located in the four corners defined by the rectangular shape of the condenser. The mounting frame 1356 further comprise four bores 1357 which are configured to align with the bores 1355 of the condenser 1352 when the condenser and frame are assembled.

Assembly of the counterweight assembly may be as follows: the electric fan 1354 is secured to the mounting frame 1356 and the fan and frame arrangement and then the condenser 1352 are inserted into the frame so as to align the bores 1357 of the mounting frame 1356 with the bores 1355 of the condenser 1354. The mounting frame 1356 and condenser 1352 are then secured to the threaded bores 1380 of the ledge 1378 via four elastomer mounts 1384.

A grille 1382 is secured to the upper surface 1358 of the counterweight 1350 to prevent debris from falling into the duct 1372 but configured to enable a sufficient air flow therethrough. In this embodiment, the electric fan 1354 configured so as to drive air to flow through the inlet located proximate the lower surface 1360 and flow through the condenser 1352 and duct 1372 and through the outlet located on the upper surface 1358 of the counterweight 1334.

Referring to FIGS. 18, 19, 20, and 21, simplified schematic diagrams of alternative embodiments of the counterweight assembly are shown.

Figure 18:
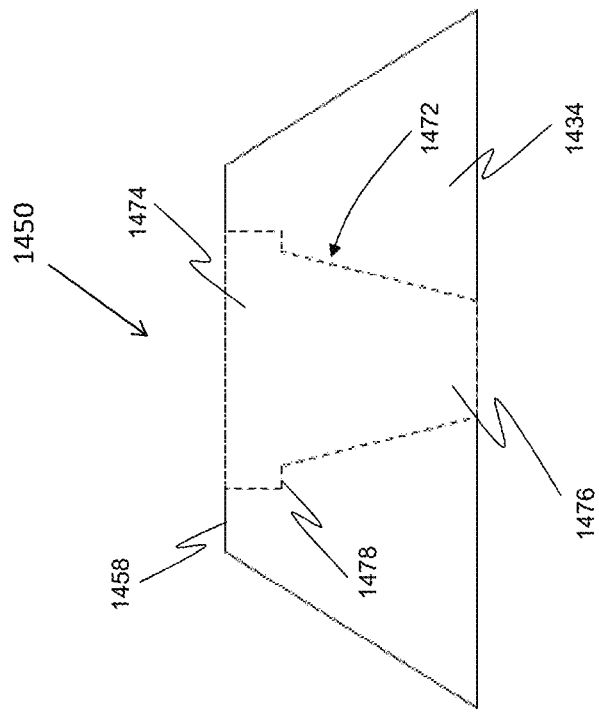
FIG. 18 is a schematic rear view of a counterweight assembly according to an alternative embodiment of the present invention.

FIG. 18 illustrates a counterweight where the condenser, fan and fan mount (not shown) are to be mounted into the upper surface 1458 of the counterweight. Corresponding components of this figure with FIG. 17 are labeled with the prefix '14' and only differences are discussed in more detail. A duct 1472 is formed through the counterweight 1434, having two regions. The first 1474 is substantially rectangular in shape, and the second 1476 is narrower so as to define a ledge 1478 at the interface between the regions. A grille (not shown) may also be mounted over the counterweight for protection.

Figure 19:
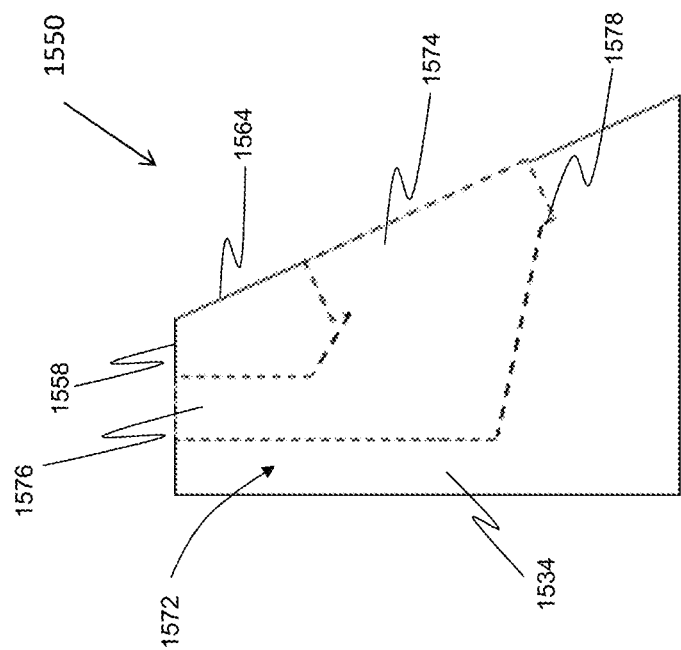
FIG. 19 is a schematic side view of a counterweight assembly according to an alternative embodiment of the present invention.

FIG. 19 illustrates a counterweight where the condenser, fan and fan mount are to be mounted into the angled and curved surface of the counterweight, corresponding components of this figure are labeled 100 higher with respect to FIG. 16. Only differences are discussed in more detail. A duct 1572 is formed through the counterweight 1534, having two regions. The first region 1574 is substantially rectangular in shape, and the second region 1576 is narrower so as to define a ledge 1578 at the interface between the regions. The first region 1574 extends substantially perpendicular to the curved surface 1564. The duct 1572 extends into the angled surface 1564 counterweight 1534 and is configured to extending a general L-shape through the counterweight and provide an outlet on the upper surface 1558 of the counterweight.

Figure 20:
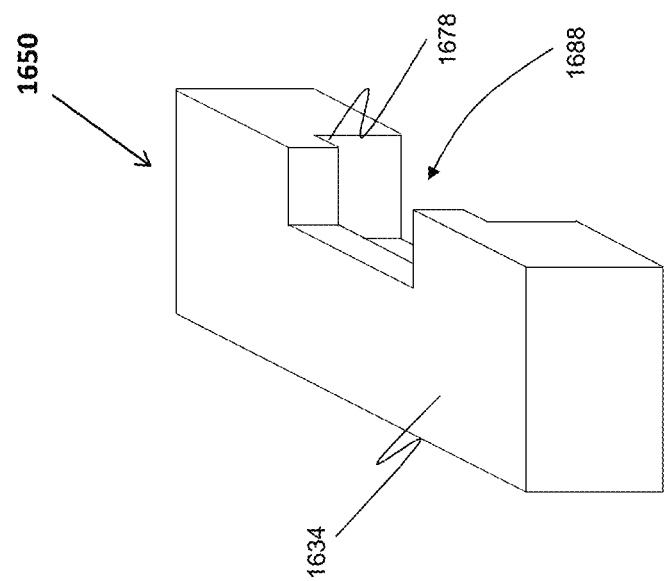
FIG. 20 is a schematic isometric view of a counterweight assembly according to an alternative embodiment of the present invention.

FIG. 20 illustrates a counterweight according to an alternative embodiment of the present invention, corresponding components of this figure are labeled 100 higher with respect to FIG. 19. The counterweight 1634 is generally a U-shape in plan view so as to define a channel 1688 on one side of the counterweight, rather than an enclosed duct of the previous embodiments. In this embodiment, the condenser (not shown) will be surrounded by three sides of the counterweight 1634. In this embodiment the mounting arrangement 1678 is provided in the form of a ledge extending around the three internal faces channel 1688. The condenser is then able to be mounted to the underside of the ledge 1678. The top and/or open side of the channel 1688 may be covered by a grille (not shown). A protective plate (not shown) may be secured to the counterweight to protect the condenser etc. from impact damage.

Figure 21:
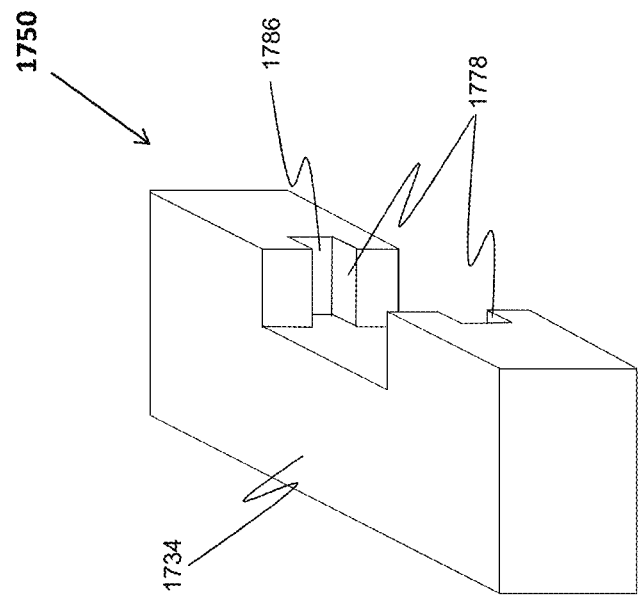
FIG. 21 is a schematic isometric view of a counterweight assembly according to an alternative embodiment of the present invention.

FIG. 21 illustrates a counterweight assembly according to an alternative embodiment of the present invention, corresponding components of this figure are labeled 100 higher with respect to FIG. 20. The arrangement is similar to FIG. 20 except that the mounting arrangement 1778 is provided by recesses 1786 in two opposing sides of the channel 1788. In this embodiment, the condenser (not shown) are inserted into the counterweight 1734 substantially horizontally and may be suitably retained with fasteners (not shown).

Figure 14:
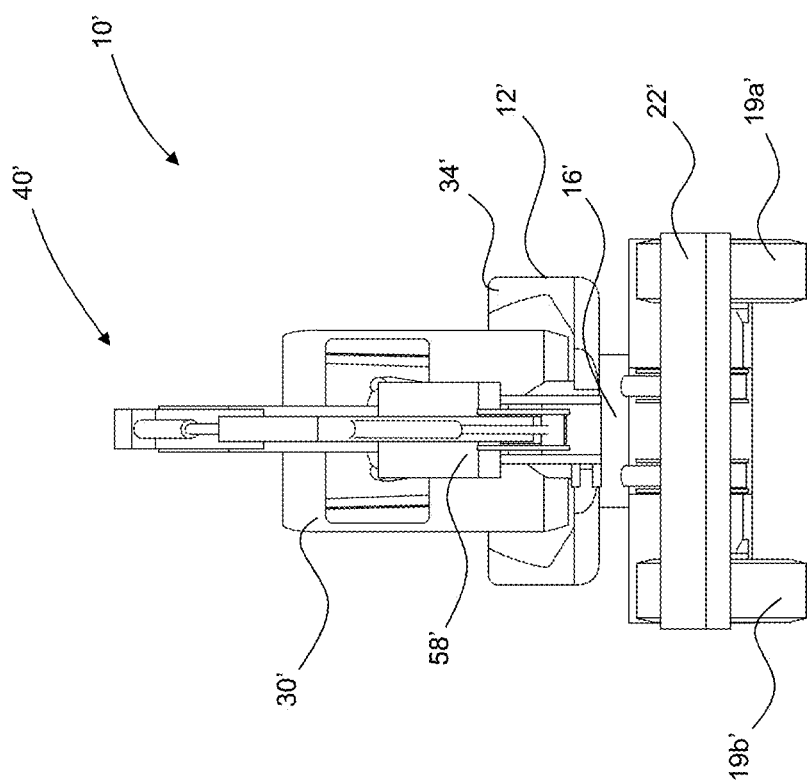
FIG. 14 is a rear view of the machine of FIG. 11.

In an alternative embodiment, as illustrated in FIGS. 5 and 14, the counterweight has a curved profile in a region nearest the cab. The front and rear surfaces of the cab each have a curved profile that is complimentary to the curved profile of the counterweight to allow for rotation of the cab. The complimentary curved profiles accommodate up to 360° rotation of the cab relative to the superstructure in a particularly compact manner and such a counterweight may also be adapted to mount a condenser using one of the arrangements discussed above.

The counterweight assembly 1350, 1450, 1550, 1650, 1750 is suitable for use with any of working machines 10, 110, 510, 910, 1010, 1210 of the present invention and other working machines.

Modular Undercarriage Assembly

Figure 22:
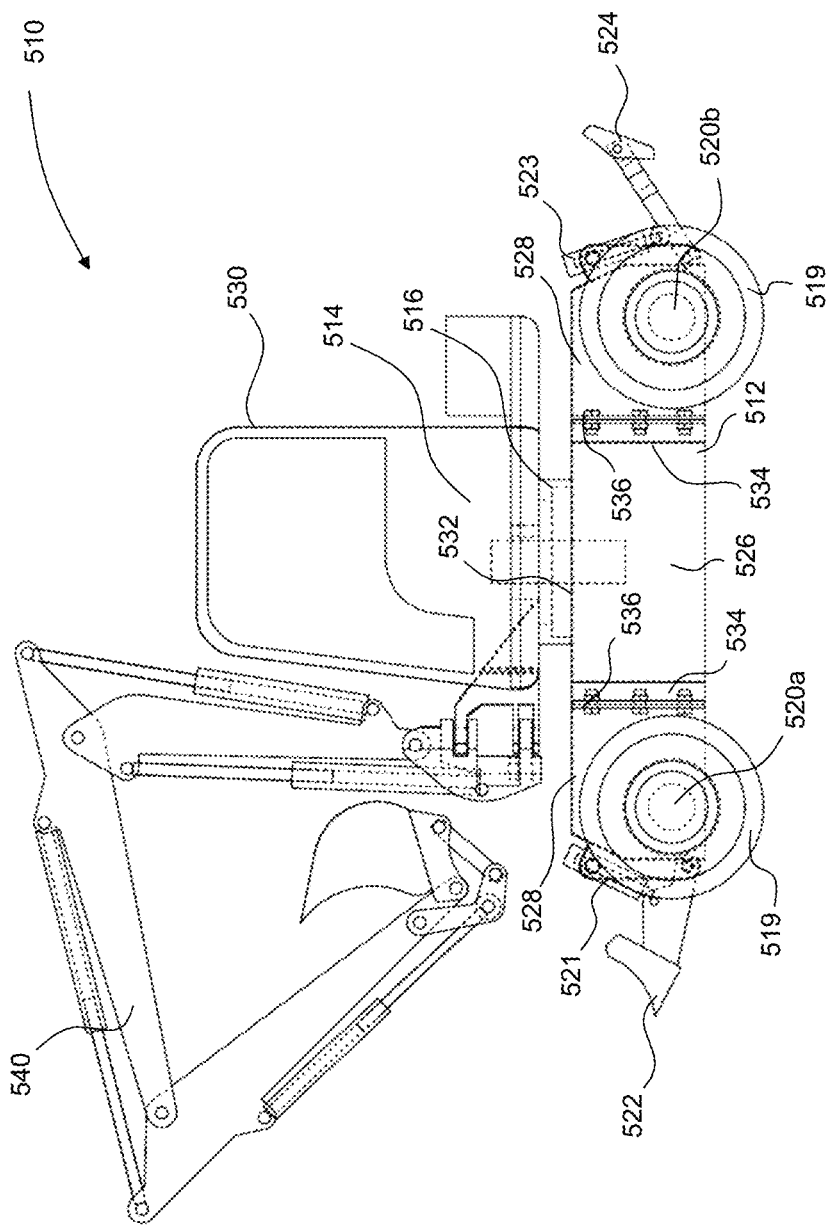
FIG. 22 is a side view of a working machine according to a further embodiment of the present invention.
Figure 23:
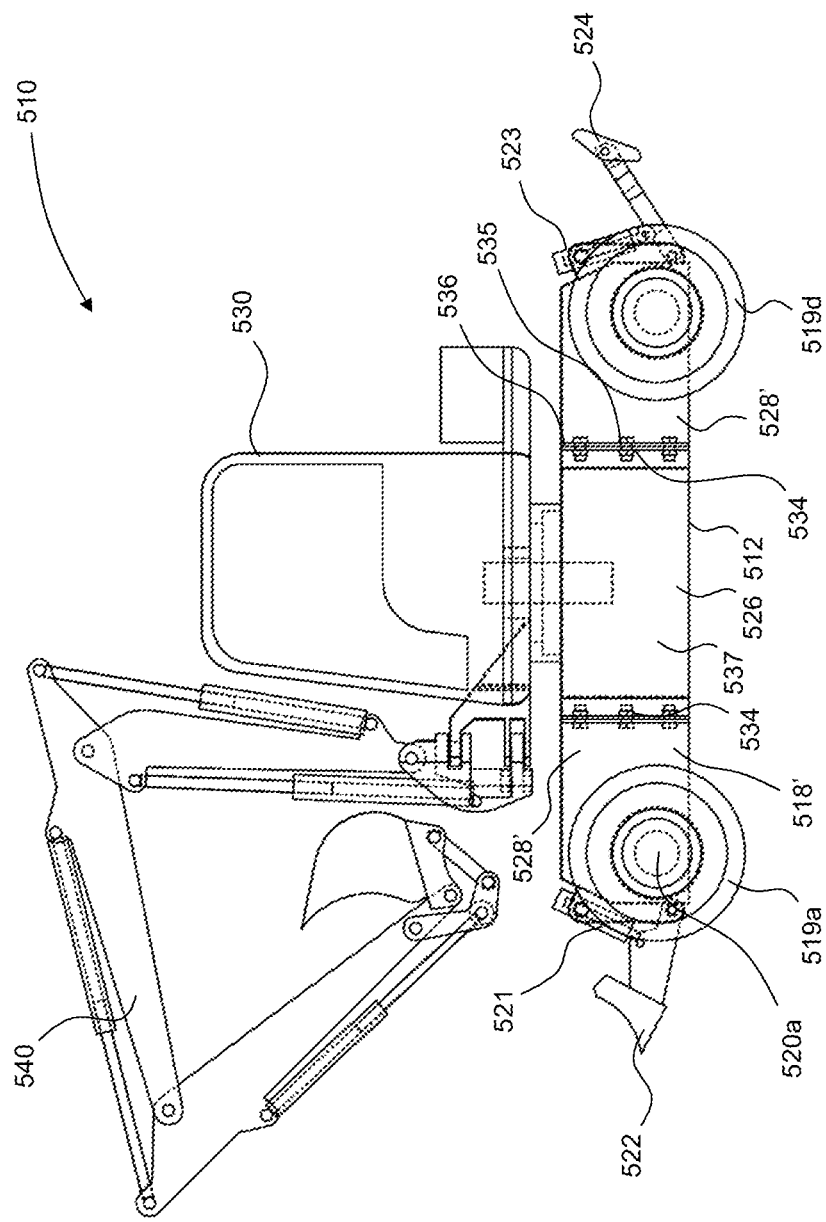
FIG. 23 is a side view of a working machine according to a further embodiment of the present invention.

Referring to FIGS. 22 and 23, there is illustrated in somewhat simplified form a working machine 510 according to an embodiment of the present invention. The drive arrangement of the present embodiment can be considered to be substantially the same as described above, with the drive arrangement housed in the undercarriage assembly 512.

The undercarriage assembly 512 comprises a main chassis 526 having a mounting arrangement 532 so as to mount the superstructure 514 thereon via a slew ring 516 to allow rotation of the superstructure with respect to the undercarriage. In other embodiments, the mounting arrangement 532 may be configured so that the orientation of the superstructure is fixed with respect to the undercarriage 512. The main chassis 526 comprises a front and rear end and two side plates 537 extending therebetween, and which act as part of the chassis rails. The front and rear ends each have a mounting interface 534 for mounting a subsidiary chassis 528 thereon. The mounting interface 534 consists of three bores (not visible) on flanges at each corner of the front and rear surface, to secure the subsidiary chassis 528 to the main chassis 526 with bolts 535 or other suitable fasteners. The side plates 537 of the main chassis 526 are fabricated from sheet steel with suitable cut-outs (not visible) to allow drive shafts, hoses etc. to pass through. In other embodiments, the mounting interface 534 may comprise a surface suitable for welding the subsidiary chassis 528 to the main chassis 526 (see FIGS. 24 to 26 below).

The subsidiary chassis 528 have a front and rear end and two side plates 518' extending longitudinally therebetween where a mounting interface 536 is located at either the front or rear end of the subsidiary chassis 528. The mounting interface 536 of each subsidiary chassis 528 are in the form of flanges with three bores which are complimentary to the bores 534 of the main chassis 526. In other embodiments the number of bores may be altered as required, and may also be provided on flanges extending transversely on top and/or bottom edges of the main and subsidiary chassis.

The subsidiary chassis 528 have either a stabilizer leg arrangement 524 or a dozer blade arrangement 522 pivotally mounted to an opposing end of the subsidiary chassis 528 to the mounting interface 536. The stabilizer leg arrangement 524 or a dozer blade arrangement 522 can be raised or lowered by hydraulic cylinders 523, 521 respectively using a known arrangement. The dozer blade arrangement 522 may also act as a stabilizer for the machine 510, by lifting the adjacent wheels off the ground when excavating.

Each subsidiary chassis 528 is connected to a ground engaging structure, which in this embodiment includes one of drive axles 520a and 520b mounted to the subsidiary chassis and wheels 519 rotatably attached to each axle end. The length between the front and rear end of the subsidiary chassis 528 can be selected to suit the function of the working machine 510. FIG. 22 shows two short subsidiary chassis 528 resulting in a working machine 510 with a relatively short length and short wheel base, which is suitable for working machines which require a smaller turning circle and to work in confined spaces, such as an excavator. Conversely, FIG. 23 illustrates a working machine 510 with two long subsidiary chassis 528' resulting in a long wheel base which may be more suitable for working machines requiring a more stable undercarriage such as a crane or rotating telehandler. In other embodiments a combination of a long and a short subsidiary chassis may be used.

Figure 24:
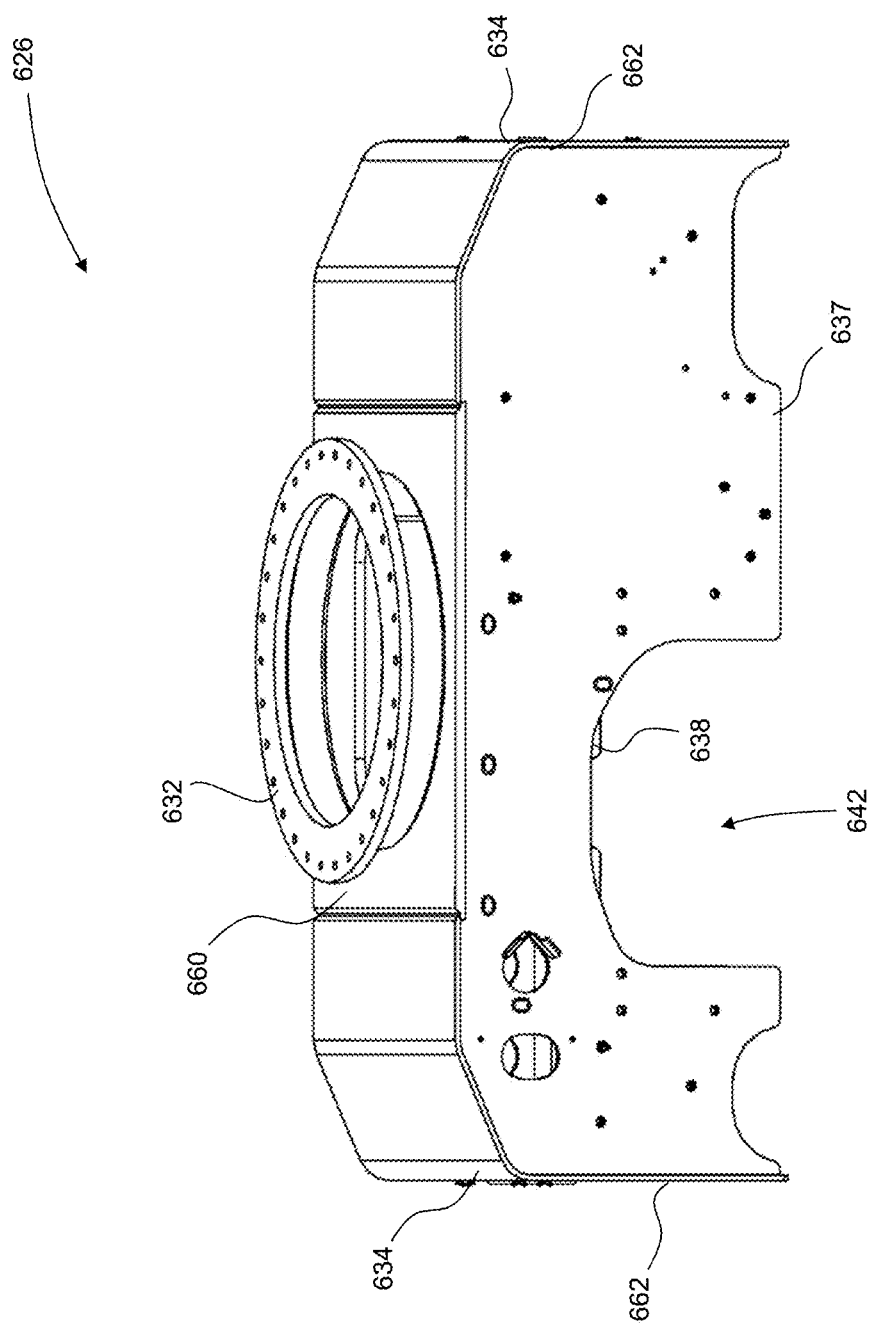
FIG. 24 is an isometric view of a main chassis according to an embodiment of the present invention.
Figure 25:
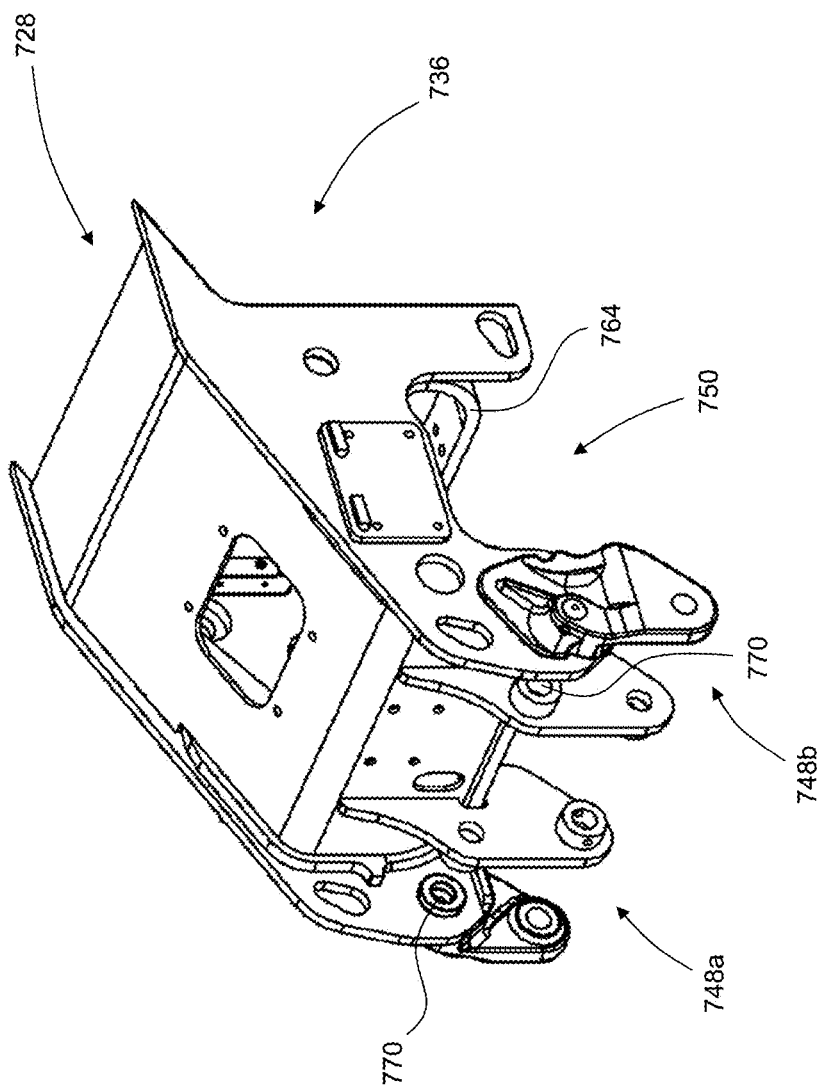
FIG. 25 is an isometric view of a subsidiary chassis according to an embodiment of the present invention.
Figure 26:
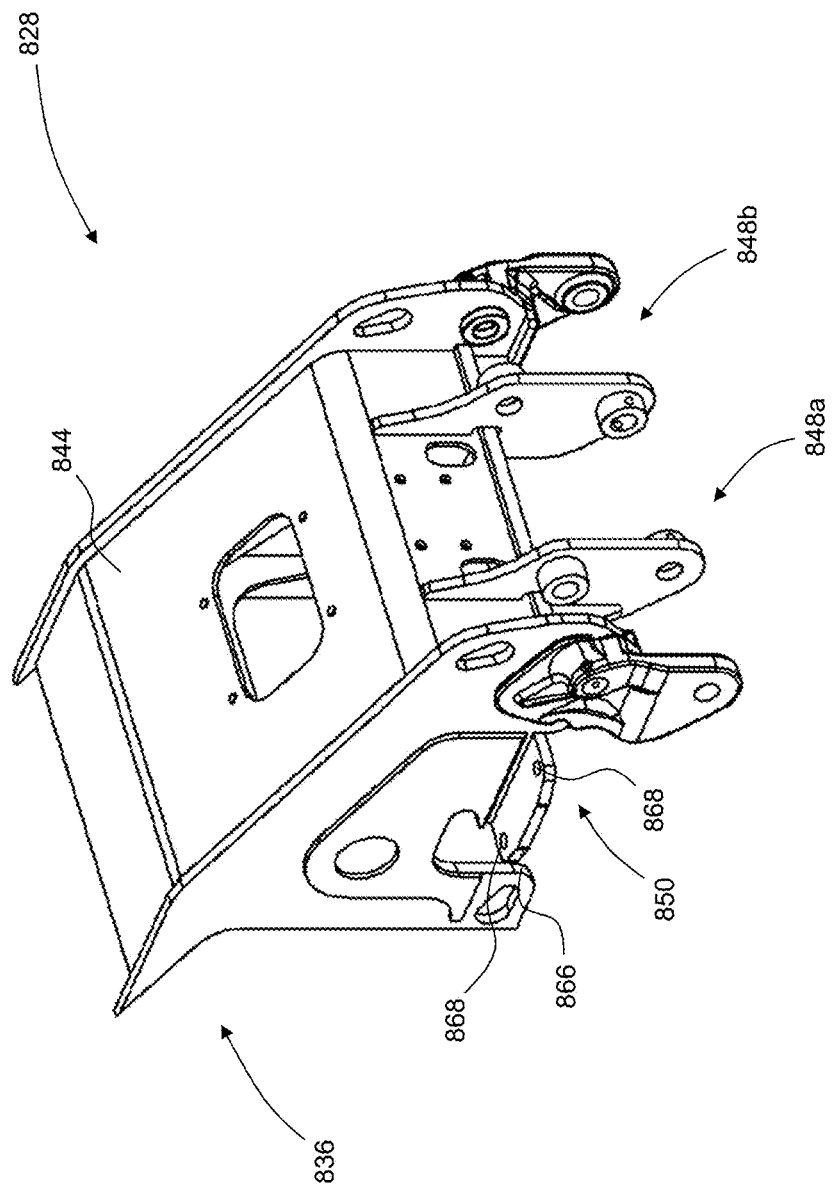
FIG. 26 is an isometric view of a subsidiary chassis according to an embodiment of the present invention.

Referring to FIGS. 24, 25 and 26, an alternative main chassis 626 and subsidiary chassis 728 are illustrated. The main chassis 626 is fabricated from two metal side plates 637, 638 and a top plate 660 which is welded to the side plates at their top edges. The top plate 660 includes a mounting arrangement 632 in the form of a slew ring located substantially in the center of the top plate. The main chassis 626 further includes two end plates 662 which are bent around the upper corners and are welded to the side plates 637, 638. The end plates 662 extend to meet the edges of the top plate 660 to define a generally rectangular space for the transmission components.

The main chassis 626 comprises two mounting interfaces 634 defined by the end plates 662. In this embodiment, the mounting surfaces 634 are configured so as to enable a subsidiary chassis 728, as shown in FIGS. 24 and 25, be offered up to conform to the mounting surface of the main chassis 626 and then be welded thereon.

The main chassis 626 has a recess indicated at 642 in one of the side surfaces 637 configured so as to enable the output from the engine (not shown) to pass into the main chassis. The side surface 638 also has multiple perforations in its surface for the mounting of ancillary components or structural components of a side pod, in which the engine is housed, onto the main chassis or to allow pipework and cabling to pass through.

Referring to FIG. 25, the subsidiary chassis 728 has a mounting arrangement indicated generally at 736 which is shaped to conform to the corresponding mounting arrangement 634 of the main chassis 626 (as shown in FIG. 24) and to be welded thereon.

The subsidiary chassis includes two arm mounting arrangements 748a and 748b provided at the lowermost point of the surface opposite of the mounting arrangement 736. The arm mounting arrangements 748a, 748b are each in the form of a pair axially aligned bores which allow for a stabilizer leg arrangement, dozer blade arrangement etc. to be pivotally mounted onto the subsidiary chassis 728 so as to be activated by hydraulic cylinders (not shown) mounted to pivots 770 to perform a work function.

The subsidiary chassis 728 has a recess 750 defining an inverted U-channel extending laterally through its side surfaces configured to allow a drive axle (not shown) to be mounted to the chassis. In this embodiment the subsidiary chassis 728 includes a first 764 and a second (not visible) mounting frame extending between the side surfaces of the subsidiary chassis. In this embodiment, the mounting frames are welded to the inside of the subsidiary chassis 728. The drive axle is secured to the subsidiary chassis 728 via a pivot member (not shown) extending between the first and second mounting frame, this arrangement allows the drive axle to be capable of limited articulation, thereby permitting the wheels to remain in ground contact, even if the ground is uneven.

Referring to FIG. 26, an alternative subsidiary chassis 828 is illustrated. Corresponding components of the figure are labeled 100 higher with respect to FIG. 25 and only differences are discussed. The metal frame of the subsidiary chassis 828 is substantially the same as described in FIG. 25. In this embodiment, a plate 866 is welded to both sides of the subsidiary chassis so as to secure the plate along the recess 850. The plate 866 includes a number of bores 868 at each end to enable the attachment of a drive axle (not shown), in order to fix the drive axle with respect to the subsidiary chassis 828 and prevent articulation.

Stabilizer/Dozer Linkage

Figure 27:
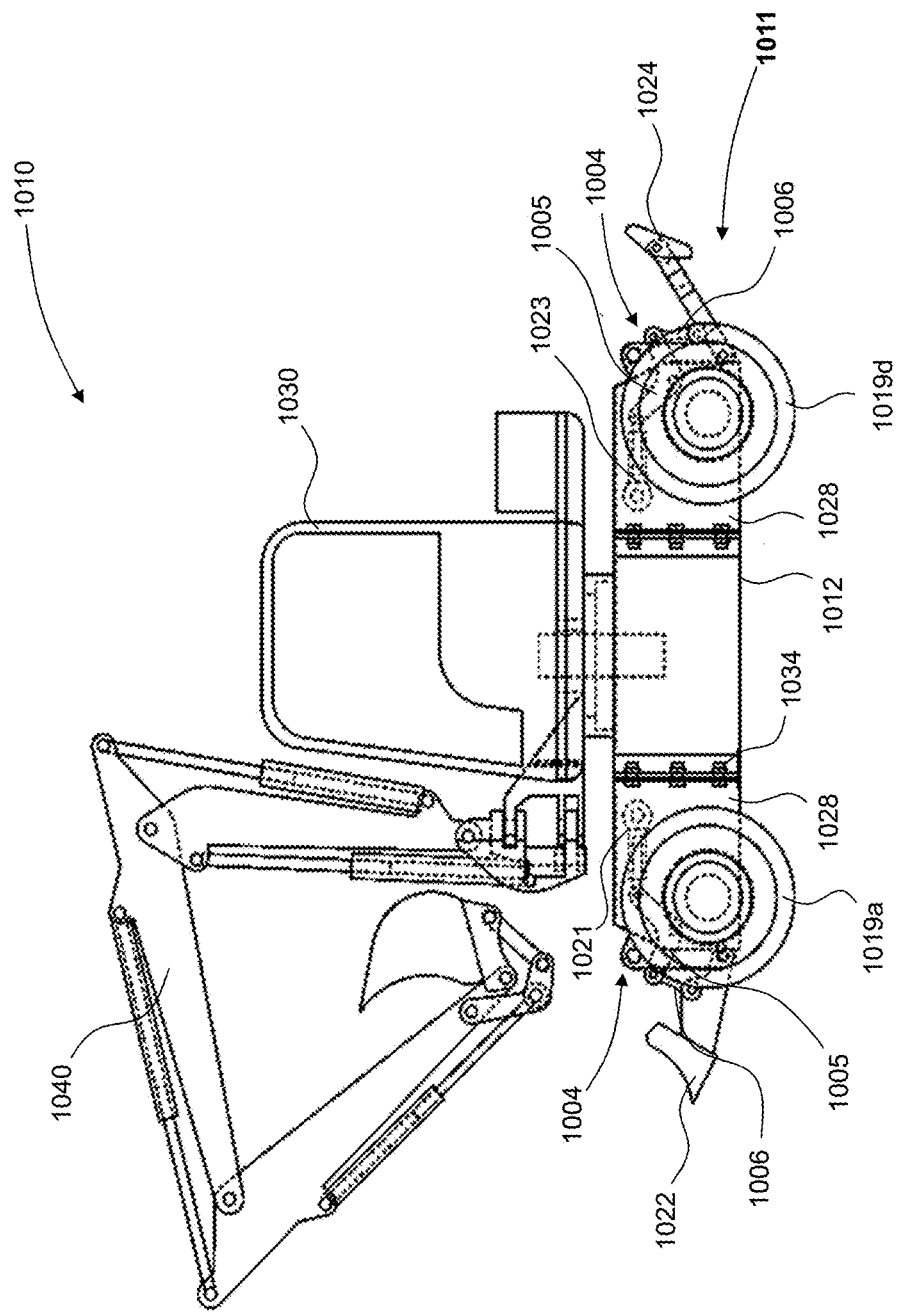
FIG. 27 is a side view of a working machine according to an embodiment of the present invention.
Figure 28:
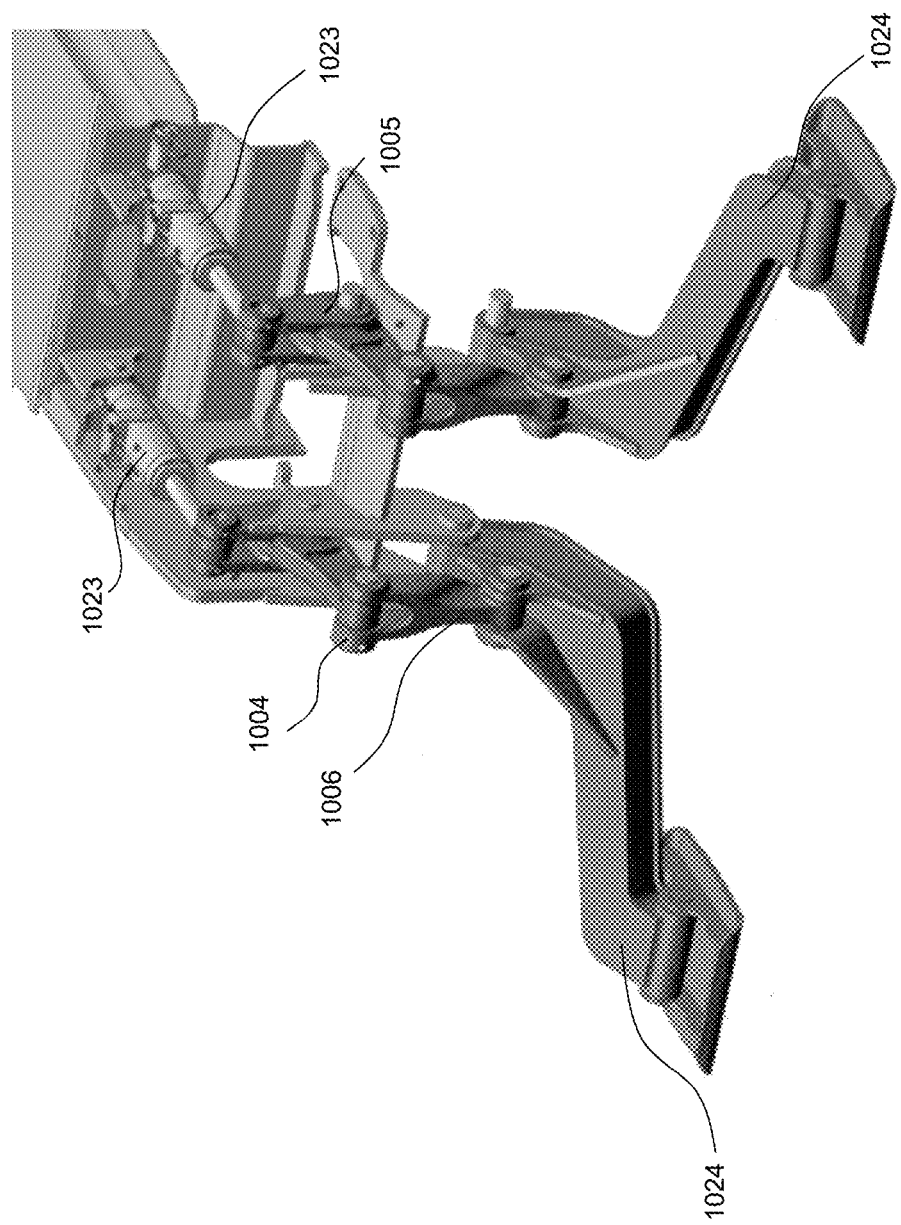
FIG. 28 is an isometric partially cut-away view of a portion of a working machine according to an embodiment of the present invention.
Figure 29:
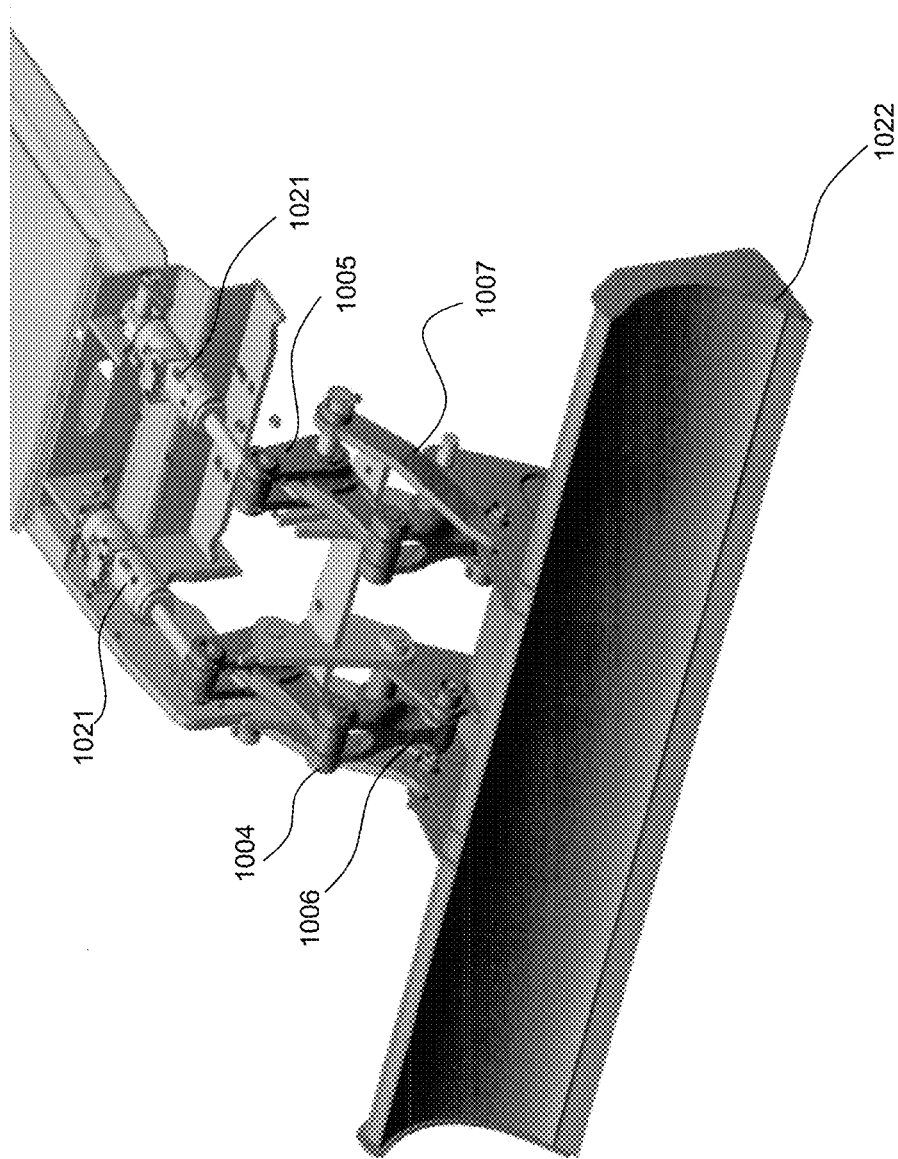
FIG. 29 is an isometric partially cut-away view of a portion of a working machine according to an embodiment of the present invention.

Referring to FIGS. 27, 28 and 29 an alternative working machine 1010 is shown. The drive arrangement of the present embodiment can be considered to be substantially the same as any of those described above, corresponding components of the figure are labeled with the prefix '10' with respect to FIGS. 22 and 23 and only differences are discussed.

In the embodiment, illustrated in FIGS. 27, and 28, the linear actuators in the form of hydraulic cylinders 1021, 1023 1023 are enclosed within the undercarriage by at least three sides of the undercarriage, where one of the at least three sides is located substantially above the space, i.e. on the side of the undercarriage substantially opposing the superstructure in an assembled working machine. This can be seen in FIG. 10. However, this upper surface of the undercarriage has been removed from FIGS. 11 and 12 to illustrate the actuators. In the illustrated embodiment, the hydraulic cylinders are mounted within the subsidiary chassis 1028 and extend out of openings in the subsidiary chassis so as to actuate a dozer blade arrangement 1022 or a stabilizer leg arrangement 1024 respectively via a linkage 1004. It can be seen that both linkages 1004 are substantially identical, despite connecting to differing arms, and comprise a generally L-shaped lever 1005 pivotally mounted to the subsidiary chassis 1028 at the apex of the two arms forming the L. One free end of the "L" pivotally connects to the hydraulic cylinders 1021, 1023 and the other free end pivotally connects to an end of a link arm 1006. A second end of the link arm 1006 pivotally connects to the dozer blade 1022 or stabilizer leg 1024. This linkage effectively converts generally horizontal extension and contraction of the cylinders 1021, 1023 into generally vertical arcuate movement of the dozer blade or stabilizer legs.

As is illustrated in FIG. 29, a further substantially linear linkage 1007 is provided when mounting a dozer blade arrangement 1022. This linkage 1007 is pivotally mounted to the subsidiary chassis at the same pivot point as the apex of the L-shaped lever 1005. The linkage 1007 is further pivotally connected to the dozer blade 1022 or stabilizer leg 1024 at the same pivot point as the link arm 1006. This linkage 1007 maintains the upright orientation of the dozer blade 1022 during movement.

Providing the hydraulic cylinders within the subsidiary chassis 1028 minimizes the overall size of the undercarriage and may improve visibility of the operator. Furthermore, this arrangement will provide the hydraulic cylinders with protection from damage.

Providing a main chassis which can be substantially the same across a variety of working machines, such as a crane (see below), a telehandler (see below) or an excavator, may reduce the number of parts and allows for a single production line to produce multiple machines thereby reducing cost. The modular arrangement may also save cost by making transport of the main and subsidiary chassis more efficient if manufactured and assembled at different locations, as it may be possible to pack more chassis into a given volume for shipping if split into multiple assemblies as described above.

Providing a subsidiary chassis which can be substantially the same with the exception of the drive axle mount may allow for economies of scale to provide for the lower cost manufacture of the undercarriage components.

Telehandler

Figure 30:
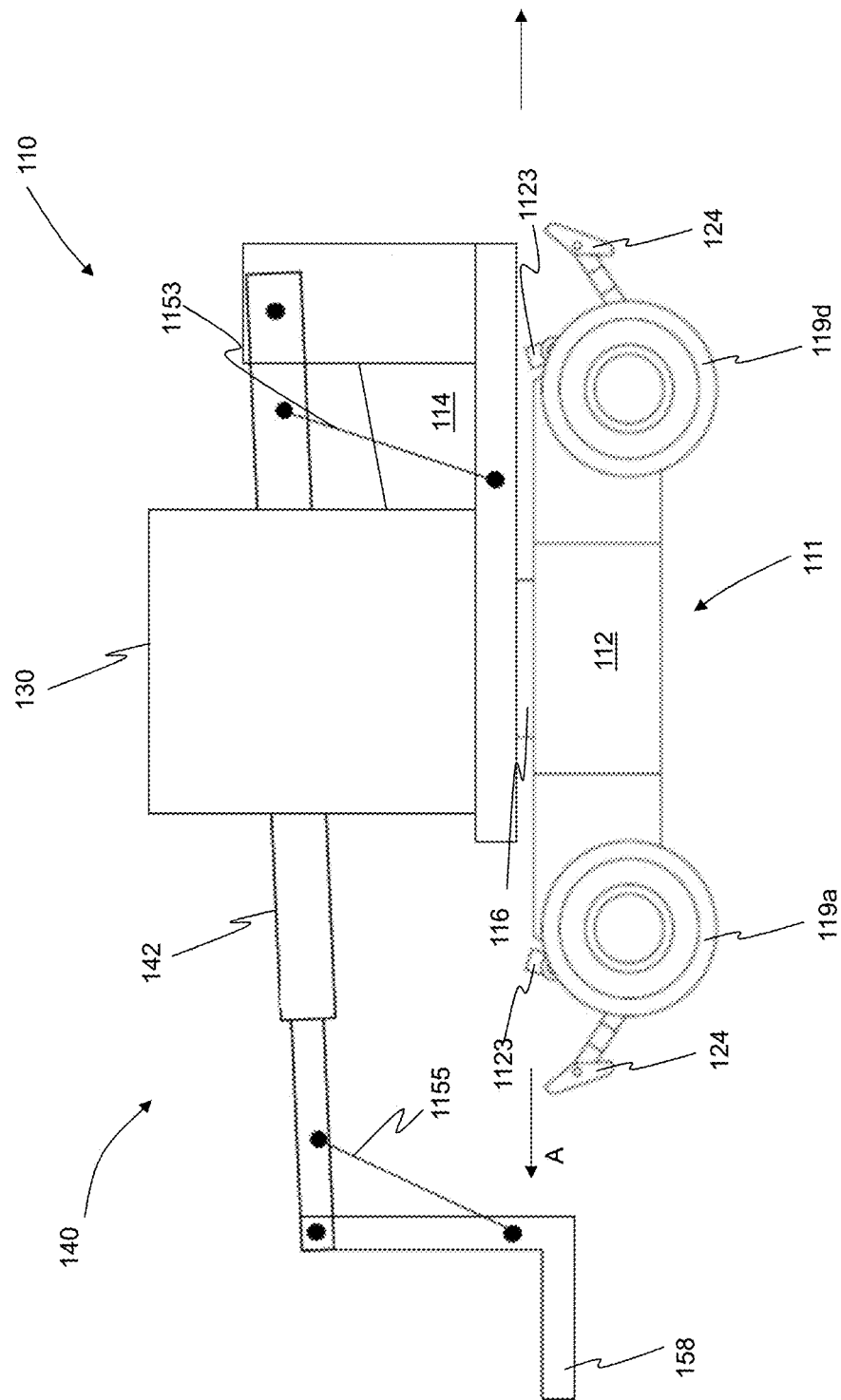
FIG. 30 is a side view of a working machine according to an embodiment of the present invention.
Figure 31:
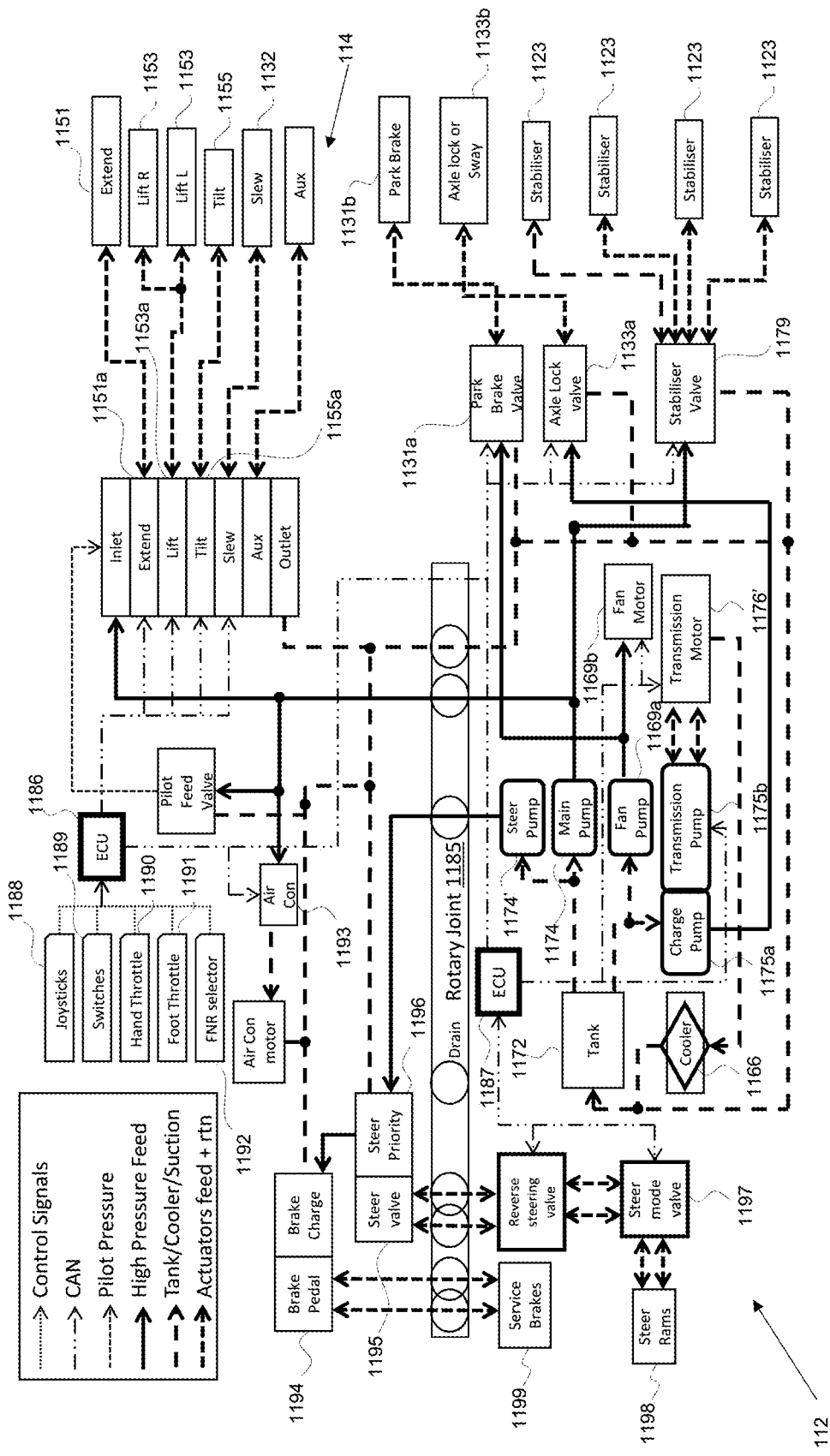
FIG. 31 is a schematic view of a hydraulic and electronic control system of the working machine of FIG. 30.

Referring now to FIGS. 30 and 31, an alternative working machine 110 is shown in simplified form. In this embodiment the working machine may be considered a telehandler (also known as a telescopic handler, specifically a rotating telescopic handler). The working machine 110 has a similar base assembly 111 to that of the working machine 10 of FIGS. 1 to 4 (although in this embodiment it has a longer wheelbase to aid stability), but the superstructure 114, working arm arrangement 140 and cab 130 are different.

In the present embodiment, the superstructure 114 is mounted to the undercarriage 112 via a slew ring 116 and rotary joint (not shown) as described previously, such that the superstructure 114 and working arm arrangement 140 can rotate relative to the undercarriage 112.

The superstructure 114 mounts a cab 130 offset to one side of the undercarriage 112 in the lateral direction L. The cab 130 is positioned towards a fore of the superstructure 114 in the fore-aft direction A when the working machine is in a roading position. The superstructure 114 mounts the working arm arrangement 140 centrally or near centrally in the lateral direction L and towards the aft of the superstructure 114 in a fore-aft direction when the working machine 110 is in a roading position.

In the present embodiment the working arm arrangement 140 includes a telescopic boom 142. An attachment is removably attachable to a free end of the boom 142. In the present embodiment the attachment is a set of pallet forks 158. When the telescopic boom 142 is in its lowest position, e.g. when commencing loading of an object from the ground, the boom is angled at approximately 4° to the ground (i.e. below the horizontal if the working machine is on flat level ground). The counterweight provided with the superstructure 114 is larger than that for the working machine 10 so that the working machine 110 has an increased loading capacity to working machine 10.

The layout of the hydraulic system is similar to that described in FIG. 4 for the working machine 10 of FIGS. 1 and 2. Like features with respect to FIG. 4 are labeled with the prefix '11', and only differences are discussed.

In this embodiment, the transmission comprises a single transmission motor 1176' which is able to be selectively driven by the transmission pump 1175b. Therefore, the charge pump 1175a and transmission pump 1175b are configured to draw fluid from the hydraulic tank 1172 as required to supply this to the transmission motor 1176'. In other embodiments, two hydraulic motors may be provided in a similar arrangement to FIG. 12.

In this embodiment, the main pump 1174 supplies hydraulic fluid from the hydraulic tank 1172 to the hydraulic cylinders 1151, 1153, 1155 for operating the working arm arrangement 140 via associated valves in the superstructure 114 and denoted by the same numeral with the suffix 'a', and to a single auxiliary hydraulic fluid supply for use by certain attachments (not shown). The main pump 1174 is able to selectively supply hydraulic fluid to the hydraulic cylinder 1151 in order to telescopically extend or retract the boom 142 and is able to control the lift of the boom 142 by selectively supplying hydraulic fluid to the right and left lift cylinders 1153. In addition to this, the tilt angle of the forks 158 is able to be adjusted via the tilt hydraulic cylinder 1155.

In the present embodiment the superstructure 114 is rotatable relative to the undercarriage by the main pump 1174 supplying hydraulic fluid to the slewing motor 1132, but in alternative embodiments the superstructure 114 may be fixed relative to the undercarriage 112 or provided with a slew cylinder providing a more restricted range of slewing motion instead of the full 360° provided by the motor 1132.

The base assembly 111 differs from the previously described base assembly 11 in that it includes a stabilizer arrangement 124 at both a fore and aft of the undercarriage 112. Stabilizer legs of the stabilizer arrangement 124 can be lowered before a loading operation to lift the wheels 19a, 19b, 19c and 19d off the ground.

The hydraulic and electronic control system of working machine 110 is configured differently to that of working machine 10. One reason for the different configuration is the alternative working arm arrangement 140. In the present embodiment, the main control valve of the superstructure 114 feeds different cylinders to that of the working machine 10, i.e. the main control valve feeds a cylinder for lifting/lowering the telescopic boom, a cylinder to extend the boom, and a cylinder to tip/crowd the fork attachment 158.

As will be appreciated by the person skilled in the art, technical and safety requirements of a telehandler differ from those of an excavator. In the present embodiment, similarly to the working machine 10 of FIG. 1, an ECU 1186 is provided in the superstructure 114 for controlling movement of the working arm etc. The ECU 1186 transmits signals to the ECU 1187 in the undercarriage 112 to control hydraulic functions in the undercarriage, including a stabilizer valve 1179, a fan motor 1169b, park brake valve 1131a, axle lock valve 1133a, main pump 1174, transmission pump 1175b, and steer mode valve 1197. This includes mapping the inputs from the operator cab 130 to correspond to the correct functionality of the superstructure 114, e.g. an input is mapped to a particular valve opening of the main control valve so as to control for example one of the operations of lifting/lowering the boom 142 via lift valve 1153a and lift cylinders 1153, extending the boom 142 via extend valve 1151a and boom extend cylinder 1151, or tipping/crowding the fork attachment 158 via tilt valve 1155a and tilt cylinder 1155. Further, to meet with different safety requirements imposed on a telehandler, a different safety protocol may be required.

In an alternative embodiment, a single ECU may be provided in the undercarriage. In such embodiments, at the point of manufacture the ECU 1187 may be programmed e.g. by "flashing" the ECU with different features so as to operate correctly as a telehandler instead of, for example, an excavator, in a similar manner to that described when an ECU is provided in the superstructure 114.

Crane

Figure 32:
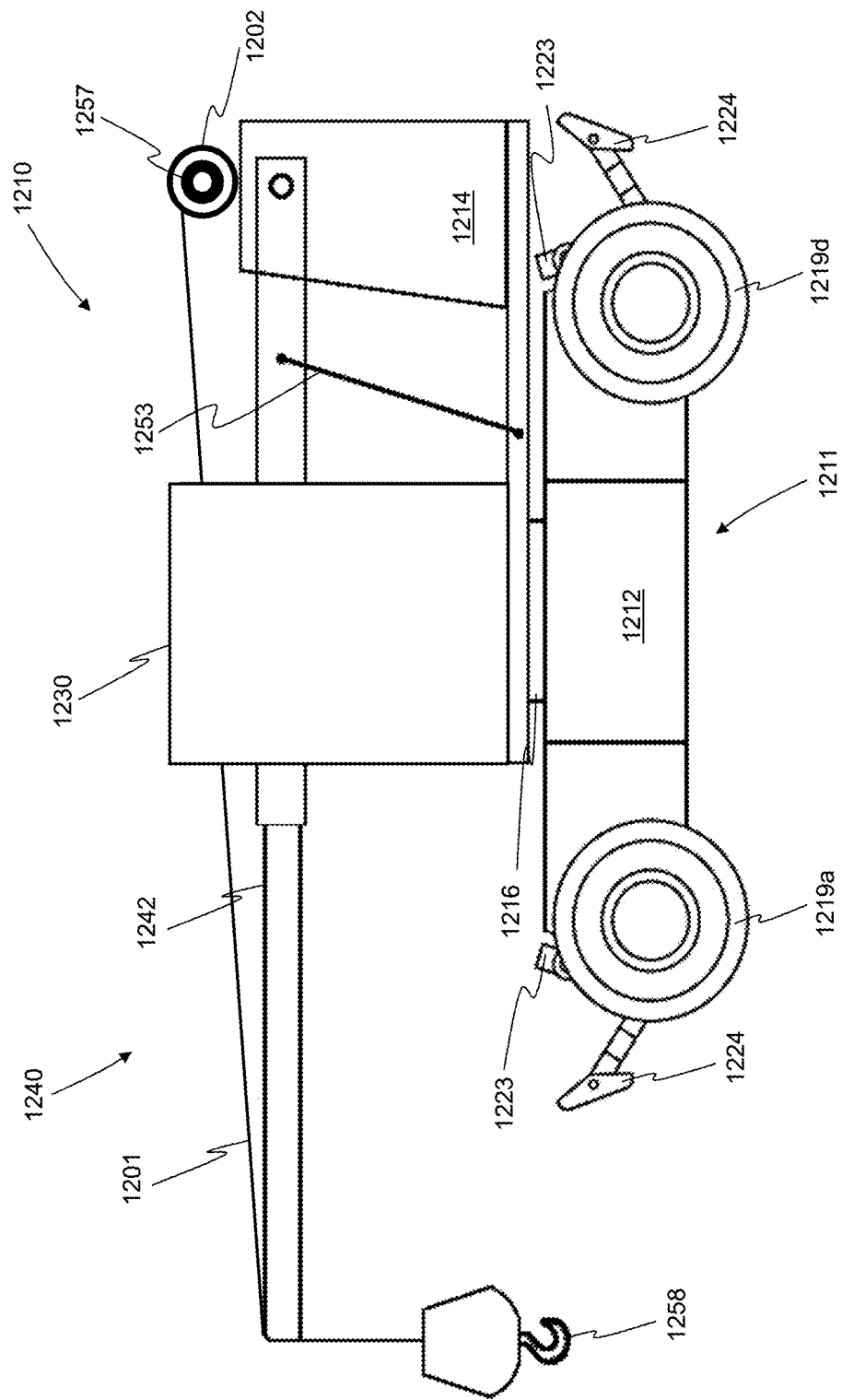
FIG. 32 is a side view of a working machine according to an embodiment of the present invention.
Figure 33:
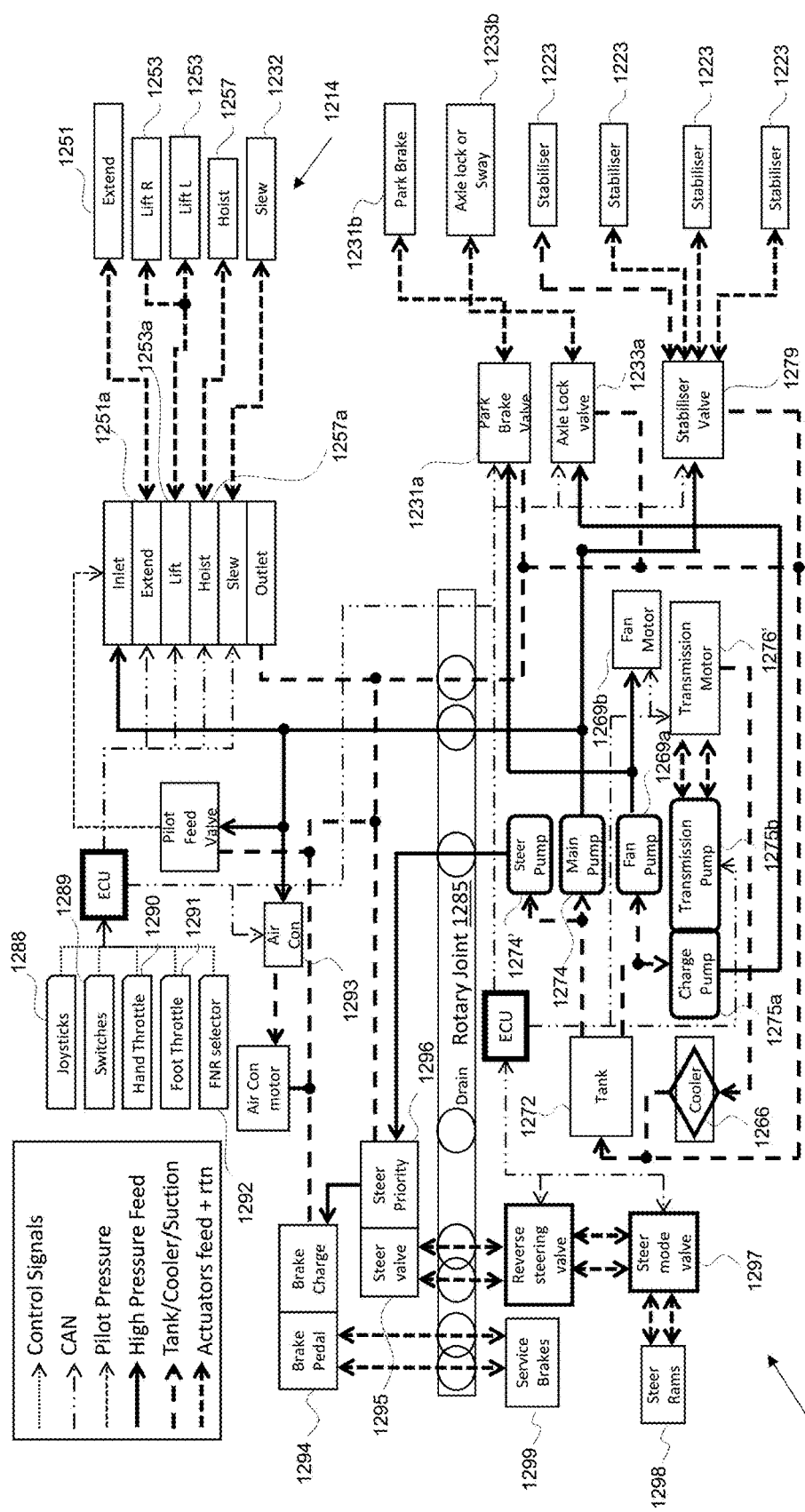
FIG. 33 is a schematic view of a hydraulic and electronic control system of the working machine of FIG. 32.

Referring now to FIGS. 32 and 33, an alternative working machine 1210 is shown and is again shown in somewhat simplified form. In this embodiment, the working machine may be considered to be a crane. The working machine 1210 has a similar cab 1230 and base assembly 1211, to the working machine 110 of FIG. 30 but the working arm arrangement 1240 is different.

In this embodiment, the hydraulic control system is similar to that described in FIG. 31 in relation to the working machine 110 of FIG. 30 although the control system is not provided with a hydraulic cylinder to provide a tilt function of the working attachment.

When the connected superstructure 1214 has a crane working arm 1240, the boom 1242 and superstructure may be similar to that of the telehandler arrangement of FIG. 30. However, in this embodiment the boom 1242 may be positioned horizontally in its lowest position instead of being angled towards the ground as there is not a requirement for attachments pivotably mounted at the end thereof to be able to contact the ground.

Further, a motor 1257 may be provided in or proximate the rear of the boom 1242 to drive the hoist, this arrangement improves lift capacity and forward stability of the crane 1240. In the present embodiment, the hoist includes a wire rope 1201 and a winch 1202. In this embodiment, the main pump 1274 supplies hydraulic fluid from the hydraulic tank 1272 to the hydraulic motor 1257 in order wind the winch 1202. The winch 1202 is provided at the base of the boom 1242. A hook 1258 is provided at the free of the wire rope 1201 and hangs from a fore end of the boom 1242 where it can be connected to articles to be lifted and be raised and lowered by winding in and out of the winch 1202.

In the illustrated embodiment, the base assembly has four stabilizer legs 1224 connected thereto and lowered by stabilizer hydraulic cylinders 1223. During a lifting operation the stabilizer legs 1224 are fully extended to lift the wheels 1219*a*, 1219*b*, 1219*c*, 1219*d* of the base assembly off the ground. The ECU may be configured to include safety features to prevent lifting operations until the working machine 1210 is secure to do so. For example, the ECU may be configured to check that for example the stabilizer legs 1224 are fully lowered before operation of the crane 1240 is permitted and control rotation, lifting, etc. in accordance with crane safety standards.

Figure 34:
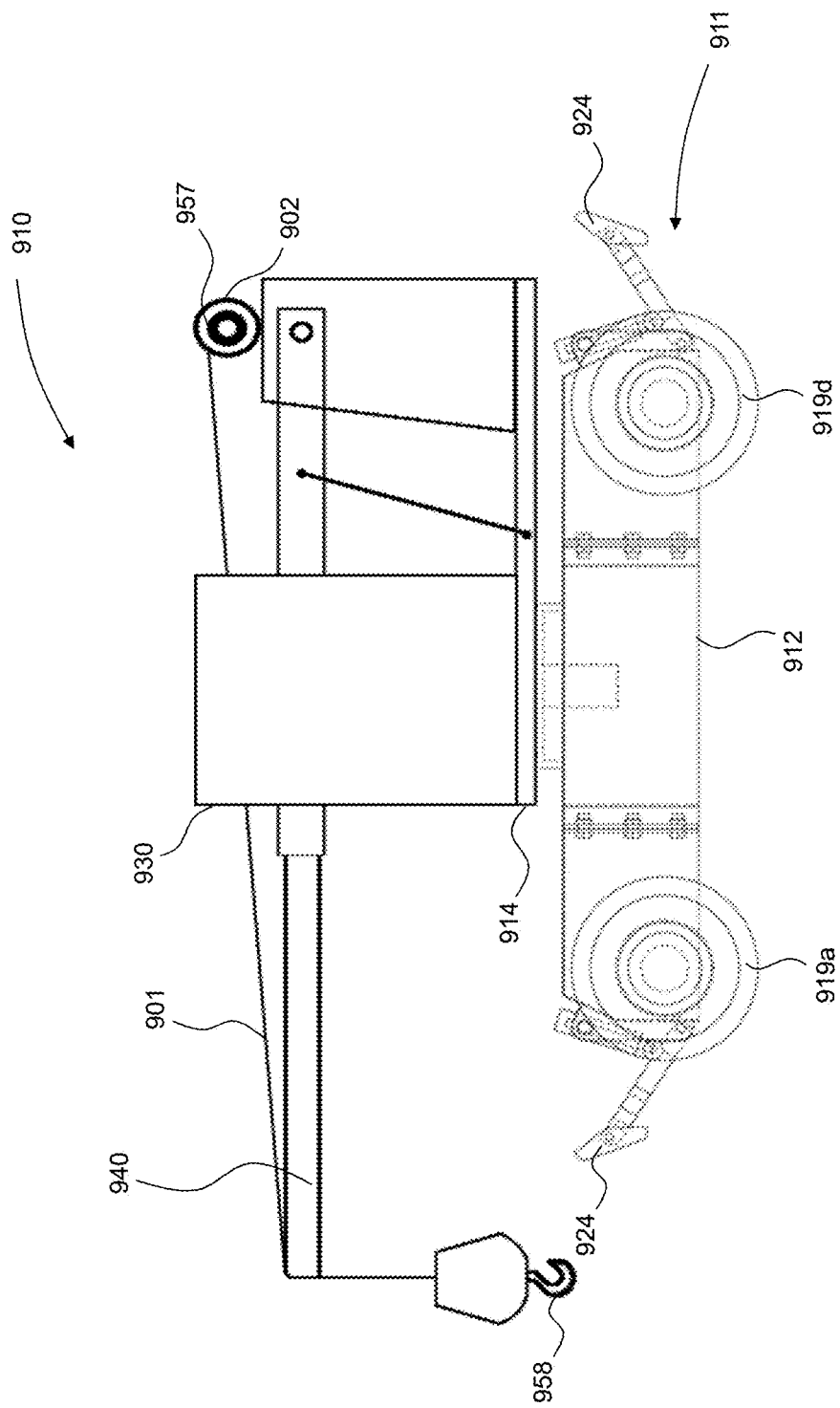
FIG. 34 is a side view of a working machine according to an embodiment of the present invention.

Referring now to FIG. 34, an alternative working machine 910 is shown, in this embodiment the working machine is a crane. The working machine 910 has a similar undercarriage assembly 912 to that of the working machine 510 of FIGS. 22 and 23, with the long subsidiary chassis. Corresponding components of the figure are labeled with the prefix '9' instead of '5' with respect to FIGS. 22 and 23 and only differences are discussed.

The superstructure 914 is mounted to the undercarriage 912 via a slew ring 916 as described previously, such that the superstructure and working arm arrangement 940 can rotate relative to the undercarriage.

The connected superstructure 914 has a crane working arm 940 in the form of a telescopic boom which may be positioned horizontally in its lowest position, as illustrated. In the present embodiment, the hoist includes a cable 901 and a winch 902, where the winch is provided at the base of the boom. Positioning the motor 957 and the winch 902 at the rear of the boom 940, as opposed to the front, improves lift capacity and forward stability of the crane.

In such an embodiment the undercarriage 912 has four stabilizer legs 924 connected thereto and during a lifting operation the stabilizer legs are fully extended to lift the wheels 919 of the undercarriage off the ground.

MEWP

In a further alternative embodiment, no cab may be mounted on the superstructure and the working arm may be a scissor lift or a telescopic boom having a platform mounted at its free end so as to form a mobile elevated work platform (MEWP). When the working arm is a telescopic boom the superstructure may slew, but when the working arm is a scissor lift the superstructure may be fixed relative to the undercarriage. Again, similarly as previously described, the ECU in the undercarriage will be programmed (e.g. by flashing the ECU or by the ECU receiving signals from an ECU in the superstructure) to extend/retract, lift/lower, or rotate the boom or to extend/retract the scissor arms as applicable and also to perform the appropriate operational protocols to meet safety requirements for an MEWP.

Dump Truck

In a yet further embodiment, the working machine may be a dump truck. In such an embodiment the superstructure is fixedly mounted to the undercarriage such that there is no rotation of the superstructure relative to the undercarriage. The working arm is the tipping mechanism/dump body that is tipped using one or more hydraulic cylinders, and in some embodiments one or more hydraulic cylinders coupled to a lever arrangement.

Production Process

Advantageously, the commonality of the base assembly 11, 111, 511, 911, 1011, 1211 between the working machines 10, 110, 510, 910, 1010, 1210 can reduce production time and costs, e.g. the commonality reduces the variation in stock components required for the manufacture of the two or more different working machines. It may also reduce the capital costs of setting up productions lines for multiple working machine types by enabling a single production line to produce multiple machines types.

In certain embodiments, the base assembly 11, 111, 511, 911, 1011, 1211 may be provided in the form of a central main chassis with a subsidiary chassis provided as a separate subassemblies mounted at one or each of the front and rear ends of the main chassis (schematically illustrated in the undercarriages of FIGS. 22, 23, 27 and 34 by the vertical lines dividing the chassis). In these embodiments, a single ECU, along with the engine, transmission pump and main pump, are provided in the main chassis. Advantageously, the commonality of the main chassis between working machines can further facilitate the use of a single production line to produce multiple machine variants or types in a modular and therefore cost-effective fashion. The variant subsidiary chassis may be selected depending on the functionality required i.e. dozer arm, stabilizer leg arrangement, two wheel steer, four wheel steer etc., or wheelbase length/overall length required.

The base assembly 11 of excavator 10, base assembly 111 of telehandler 110 and base assembly 1211 of crane 1210 are substantially identical, save for easily interchangeable components such as stabilizers and dozers, or save for different subsidiary chassis to provide a different wheelbase and/or overall length. This means that the base assembly excluding the stabilizer and/or dozer blade arrangement or main chassis can be continuously manufactured (maintenance and demand permitted) with no or minimal tooling change over or assembly change over required to e.g. change from manufacturing an excavator to a telehandler to a crane.

Figure 35:
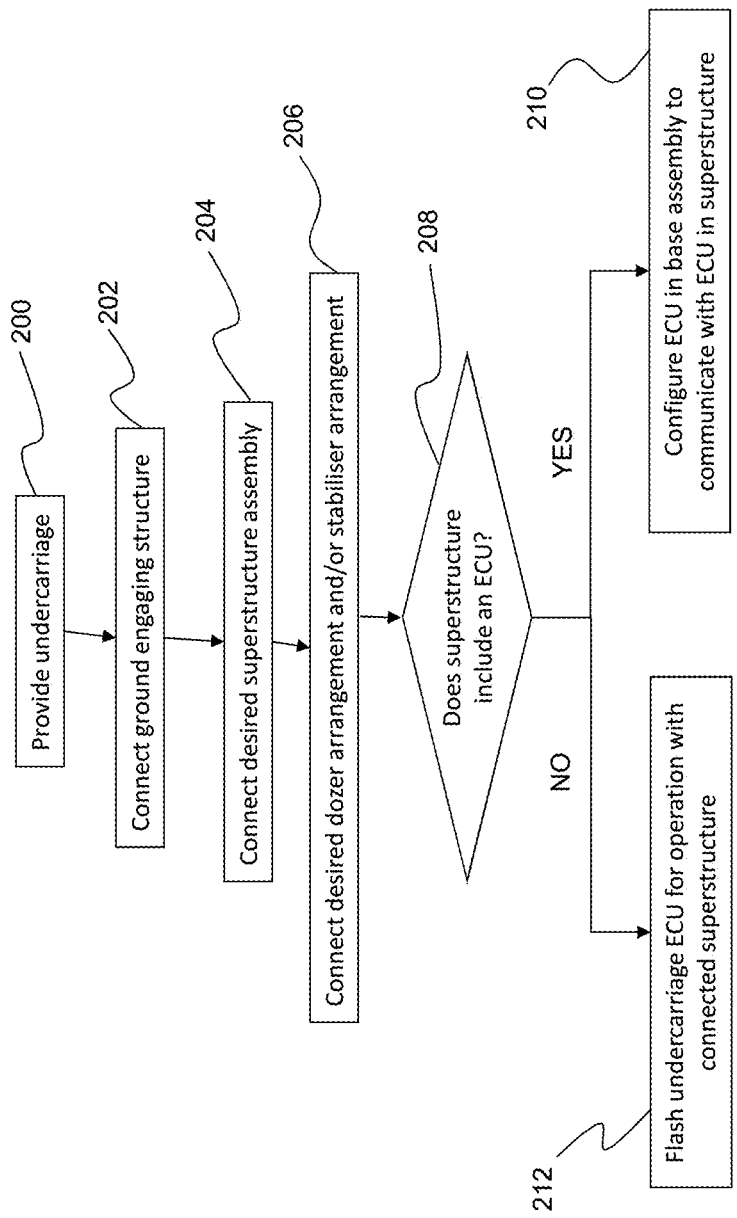
FIG. 35 is a flow diagram of a method of manufacturing two different working machines according to an embodiment of the present invention.

Once the undercarriage is manufactured and assembled the ground engaging structure can be connected to the undercarriage (or the ground engaging structure may already be assembled to the subsidiary chassis). Referring to FIG. 35, the assembled undercarriage is provided to the assembly line at 200. Then at 202, the ground engaging structure is connected to the undercarriage.

At 204, depending on the type of working machine being manufactured a superstructure that mounts a cab and working arm similar to that shown in either FIGS. 1 to 3 is connected to the slew ring of the undercarriage. The superstructure can then be connected to the undercarriage either with the cab and working arm arrangement attached, or features such as the working arm and cab may be added after connection of the superstructure to the undercarriage.

Then at 206, depending on the type of working machine being assembled either a stabilizer arrangement and/or a dozer blade arrangement is connected to the undercarriage. A complimentary interlocking arrangement may be provided on the undercarriage and the stabilizer and/or dozer blade arrangement to simplify connection to the undercarriage and provide inter-changeability either at the point of manufacture or optionally in the field.

In alternative embodiments, the undercarriage may be provided in the form of a central main chassis with a subsidiary chassis, as described above, mounted at each of the fore and aft ends of said main chassis. In this embodiment, a range of subsidiary chassis are provided each with differing attachments such as dozer blades, stabilizer arms etc. and so at 206 the required subsidiary chassis are mounted to the main chassis.

As described above, in some embodiments the superstructure will have an ECU associated with it and in other embodiments there will only be a single ECU provided and positioned in the base of the working machine. Decision box 208 of FIG. 35 indicates this step.

If there is an ECU associated with the superstructure, the ECU in the base assembly is configured to communicate with the ECU in the superstructure, such that the base assembly can be operated in a manner suitable for the superstructure connected thereto. This is indicated by method step 210.

If there is no ECU associated with the superstructure the ECU in the base assembly is configured to control the base assembly, and in many embodiments the superstructure, cab and/or working arm connected thereto. This is indicated by method step 212.

As will be appreciated by a person skilled in the art, the steps of the described method may be performed in an alternative order. For example, the stabilizer/dozer arrangement may be attached after the superstructure is connected to the undercarriage and/or the ground engaging structure may be connected to the undercarriage after the remainder of the working machine is assembled, or for example the axles may be assembled with the undercarriage and the wheels added at a later stage in the production.

Variants

Although the invention has been described above with reference to one or more preferred embodiments, it will be appreciated that various changes or modifications may be made without departing from the scope of the invention as defined in the appended claims.

Although the present invention has been described in the context of particular machine layouts, for which it is considered particularly advantageous, certain advantages of the present invention may be achieved if it is used in more conventional machines such as conventional wheeled slew excavators having engines and hydraulic pumps in the superstructure thereof, or telehandlers, rough terrain cranes etc. having hydrostatic or other types of transmissions. In addition, in other embodiments, the prime mover may be located within either the main or subsidiary chassis, instead of within a side pod.

In an alternative embodiment, the main chassis may have mounts for an axle, a hydraulic cylinder and one of a dozer blade arrangement, a stabilizer leg arrangement or a tractor-type hydraulic three-point linkage. In this embodiment, the main chassis may be configured to mount only one subsidiary assembly to the main chassis.

For example, the superstructure could have a pilot control of the hydraulic functions routed through the slew ring or direct to the main control valve instead of using the CAN bus.

The pressure and/or flow of hydraulic fluid may be directed to the high and low speed motors 77, 76 in the low speed operating mode in order to shift the balance of power to either motor. For example, in response to the machine sensing loss of traction on one axle through the use of suitable sensors, hydraulic flow may be diverted to the other axle.

The low speed and/or high speed motors may be connected directly to the or each axle they drive, or a pair of high speed motors may drive individual wheels on one axle and low speed motors individual wheels on the second axle.

In other embodiments, an alternative transmission arrangement may be used, such as a conventional gearbox, powershift gearbox and/or torque converter gearbox. An alternative prime mover may also be used instead of or in conjunction with an IC engine, for example an electric motor.

Although in an embodiment, the main pump is illustrated as providing hydraulic fluid for the pilot feed valve, and therefore for the various hydraulic cylinders and motors, in other embodiments the supply to the pilot feed valve may be provided by the charge and transmission pumps.

In other embodiments, the main pump and the charge and transmission pumps may be driven in parallel rather than in series via a bevel gearbox, for example and a clutch mechanism may be provided to disengage drive to the pumps if not required for a particular operation.

The present invention may also be suitable for use with tracked vehicles and those with bodies formed of two mutually articulated portions for steering, each with a fixed axle.

In the presently described embodiment the engine is positioned perpendicular to the axis B so as to reduce the packaging size of the engine and transmission of the present embodiment, but advantages of the invention can be achieved in alternative embodiments where the engine may be positioned at an alternative transverse position, for example between 30 and 70° to axis B measured in a clockwise direction.

In the presently described embodiment the engine is positioned such that a longitudinal axis of the pistons is orientated substantially upright, but in alternative embodiments the pistons may be alternatively orientated, for example the pistons may be substantially horizontal. In further alternative embodiments, the prime mover may not be a diesel engine, for example the engine may be a petrol engine.

The arrangement of the fuel tank, hydraulic fluid tank, heat exchanger, fan and engine of the present invention is advantageous because of its compact nature, but advantages of the invention can be achieved in alternative embodiments where these components may be positioned in alternative locations, for example the fuel tank and hydraulic fluid tank may not be positioned between the axles.

The repositioning mode for the foot throttle may be entered by means other than the non-zero position—this could be a predetermined higher setting (e.g. above 1500 rpm). In further embodiments, working operations could be sensed from usage of the working arm(s) of the machine, or in some instances operator seating position (i.e. it would be entered if the seat is rotated to face a working arm, rather than facing in a different direction for roading, in order to switch to site mode from highway mode.

The switch between site mode and highway mode may also enable/disable other machine systems, such as a layout on any displays provided to the operator, hydraulic functions etc.

The undercarriage ECU 87 may include the logic for interpreting the foot throttle 91 demand signals and controlling the oil flow to the motor(s) in the repositioning mode instead of the superstructure ECU 86.

The described excavator includes a dipper and a triple articulated boom, but in alternative embodiments the boom may only be articulated at the connection to the superstructure and the dipper. In further alternative embodiments a section of the boom or the dipper may be telescopic.

The working machine may be operated using manual hydraulic or electro-hydraulic controls.

In a further alternative embodiment, the main chassis may be configured so as to define a recess at its front and rear ends (e.g. by having chassis rails in the form of opposed C-beams). The members may be configured so as to enable a subassembly to be inserted into the recess in the main chassis and be releasably secured to the main chassis. In this embodiment, the subassembly may be a stabilizer leg arrangement, a dozer arm arrangement, a three-point linkage etc. In alternative embodiments, the subassembly may also mount a drive axle to the main chassis, where the axle may or may not be fixed with respect to the subassembly in a similar way to that described in FIGS. 26 and 26.

In other embodiments the counterweight may be formed via a plurality of complimentary sections which, when stacked and secured together, form a counterweight defining an air flow path therethrough and a mounting arrangement.

In the present invention the working machine may be considered to be a midi excavator. In other embodiments, the counterweight assembly may be fitted to other working machines for example a telehandler, a loader or a crane.

In other embodiments, a different form a heat exchanger, such as a radiator for cooling the engine, transmission, steering or hydraulic system for example, may be secured to the counterweight. Further, more than one heat exchanger may be mounted to the counterweight.

In other embodiments, the mounting arrangement for the heat exchanger may be in a different form, such as providing a ledge on two opposing sides of the duct with two threaded bores located in each ledge, or providing a protruding surface in each of the four corners of the duct with each ledge comprising a threaded bore therein.

In the present embodiment, the wheels on both axles are steerable (i.e. the working machine is configured for four wheel steer), but in alternative embodiments only the wheels on one of the axles may be steerable (i.e. the working machine is configured for two wheel steer).

The invention claimed is:

1. A working machine comprising:
a base assembly including a ground engaging structure;
an undercarriage connected to the ground engaging structure;
a superstructure connected to the undercarriage, wherein the superstructure comprises a bodywork portion having a first angled perimeter surface thereof, an angle of the first angled perimeter surface being greater than 0° below a horizontal and less than 90° below the horizontal;
a working arm mounted to the superstructure;
a connector connecting the undercarriage to the superstructure; and
a drive arrangement comprising a prime mover and a transmission, wherein an entirety of the prime mover is positioned below a level coincident with a lowermost extent of the superstructure, the drive arrangement for moving the ground engaging structure to propel, in use, the working machine, and
a counterweight, wherein the counterweight forms at least a part of the first angled perimeter surface,
wherein the working machine has a cab in a position offset from a center of the superstructure and the first angled perimeter surface is on a side of the machine remote from the cab.

2. The working machine according to claim 1, wherein the working arm is mounted to the superstructure using a kingpost arrangement in order to pivot relative to the superstructure about a vertical axis.

3. The working machine according to claim 1, wherein the machine has a cab and has a line of sight angle over a right hand rear corner of the machine for an operator seated in the cab having a height of 185 cm is at least 30° below the horizontal.

4. The working machine according to claim 1, wherein the connector is a rotary connector to permit rotation of the superstructure relative to the undercarriage.

5. The working machine according to claim 1, further comprising a linkage for connection to a working implement, wherein the linkage is configured to convert a substantially horizontal movement of an actuator into a substantially vertical arcuate motion of the working implement.

6. The working machine according to claim 1, wherein the first angled perimeter surface thereof comprises an angle greater than 10° below the horizontal and less than 80° below the horizontal.

7. The working machine according to claim 1, wherein the first angled perimeter surface thereof comprises an angle greater than 30° below the horizontal and less than 60° below the horizontal.

8. The working machine according to claim 1, wherein the superstructure comprises a second angled perimeter surface thereof positioned on an opposing side of the superstructure to the first angle upper surface, an angle of the second surface being greater than 0° below the horizontal and less than 90° below the horizontal.

9. The working machine according to claim 8, wherein the angles of the first and second angled perimeter surfaces differ, wherein the angle of the first surface below the horizontal is less than the angle of the second surface below the horizontal.

10. The working machine according to claim 8, wherein the counterweight forms at least a part of the second angled perimeter surface.

11. The working machine according to claim 1, wherein the undercarriage is at least formed in part from sheet metal material to define a space enclosed on at least three sides, wherein one of the at least three sides is located substantially above the space.

12. The working machine according to claim 11, wherein the undercarriage further comprising a mount for a first end of a linear actuator located within the space, such that the linear actuator is at least partially housed within the space, preferably wherein the linear actuator is configured to extend through an opening in a side of the undercarriage.

13. The working machine according to claim 1, wherein the undercarriage comprises a main chassis and at least one subsidiary chassis.

14. The working machine according to claim 13, wherein the main chassis comprises a mounting arrangement to mount the superstructure thereon and a mounting interface to mount the at least one subsidiary chassis thereon.

15. The working machine according to claim 13, wherein the subsidiary chassis further comprises an actuator to perform a work function, further wherein the actuator is housed within the subsidiary chassis.

16. A working machine comprising:
   a base assembly including a ground engaging structure;
   an undercarriage connected to the ground engaging structure;
   a superstructure connected to the undercarriage;
   a working arm mounted to the superstructure;
   a connector connecting the undercarriage to the superstructure; and
   a drive arrangement comprising a prime mover and a transmission, wherein an entirety of the prime mover is positioned below a level coincident with a lowermost extent of the superstructure, the drive arrangement for moving the ground engaging structure to propel, in use, the working machine; and
   further comprising an operator's cab rotatably mounted on the superstructure by a rotary connection, wherein the superstructure is rotatable about a first generally upright axis and the operator's cab is rotatable about a second generally upright axis; and
   wherein the transmission comprises a hydraulic pump driven by the prime mover, a first high speed hydraulic motor to be supplied with hydraulic fluid from the hydraulic pump to drive a first axle to permit the working machine to be driven at relatively high speeds, and a second relatively low speed motor to be supplied with the hydraulic fluid from the hydraulic pump to drive a second axle at relatively low speeds.

17. A working machine comprising:

a base assembly including a ground engaging structure;

an undercarriage connected to the ground engaging structure;

a superstructure connected to the undercarriage, wherein the superstructure comprises a cab in a position offset from a center of the superstructure, a bodywork portion having a first angled perimeter surface thereof, an angle of the first angled perimeter surface being greater than 0° below the horizontal and less than 90° below the horizontal, a second angled perimeter surface thereof positioned on an opposing side of the superstructure to the first angled perimeter surface, an angle of the second angled perimeter surface being greater than 0° below the horizontal and less than 90° below the horizontal, wherein the angle of the first angled perimeter surface below the horizontal is less than the angle of the second angled perimeter surface below the horizontal, and wherein the first angled perimeter surface is on a side of the machine remote from the cab;

a working arm mounted to the superstructure;

a connector connecting the undercarriage to the superstructure; and a drive arrangement comprising a prime mover and a transmission, wherein an entirety of the prime mover is positioned below a level coincident with a lowermost extent of the superstructure, the drive arrangement for moving the ground engaging structure to propel, in use, the working machine.

18. The working machine according to claim 17, wherein the first angled perimeter surface thereof comprises an angle greater than 30° below the horizontal and less than 60° below the horizontal.

* * * * *